United States Patent [19]

Kunishige et al.

[11] Patent Number: 5,557,363
[45] Date of Patent: Sep. 17, 1996

[54] CMOS-ANALOG IC FOR CONTROLLING CAMERA AND CAMERA SYSTEM USING THE SAME

[75] Inventors: Keiji Kunishige; Azuma Miyazawa, both of Tokyo, Japan

[73] Assignee: Olympus Optical Co., Ltd., Tokyo, Japan

[21] Appl. No.: 213,960

[22] Filed: Mar. 16, 1994

[30] Foreign Application Priority Data

Mar. 16, 1993 [JP] Japan ................................. 5-080292
Jun. 7, 1993 [JP] Japan ................................. 5-136149

[51] Int. Cl.⁶ .............................. G03B 13/36; G01J 1/20
[52] U.S. Cl. ...................... 354/402; 354/425; 354/426; 354/427; 354/428
[58] Field of Search .............................. 354/403, 425, 354/426, 427, 428

[56] References Cited

U.S. PATENT DOCUMENTS

| | | | |
|---|---|---|---|
| 4,792,749 | 12/1988 | Kitagawa et al. | 323/314 |
| 5,148,211 | 9/1992 | Kotami et al. | 354/403 |
| 5,185,517 | 2/1993 | Inamori et al. | 250/201.4 |
| 5,260,592 | 11/1993 | Mead et al. | 257/291 |
| 5,324,958 | 6/1994 | Mead et al. | 257/291 |
| 5,384,548 | 1/1995 | Sakurai et al. | 330/253 |

FOREIGN PATENT DOCUMENTS

| | | |
|---|---|---|
| 62-191702 | 8/1987 | Japan . |
| 1-150809 | 6/1989 | Japan . |
| 1-224617 | 9/1989 | Japan . |
| 1-260309 | 10/1989 | Japan . |
| 3-216523 | 9/1991 | Japan . |
| 4-339208 | 11/1992 | Japan . |
| 5-280973 | 10/1993 | Japan . |

OTHER PUBLICATIONS

"Shasin Kogyo", Camera Test, 1988, vol. 46; No. 5, pp. 80–88.

Primary Examiner—Michael L. Gellner
Assistant Examiner—D. P. Malley
Attorney, Agent, or Firm—Frishauf, Holtz, Goodman, Langer & Chick

[57] ABSTRACT

In a camera controller using a CMOS-analog IC, a microcomputer, logarithmic compression type distance measuring and photometric circuits, each constituted by a CMOS device having a parasitic bipolar transistor having a p- or n-type well as a base and an n⁺-type layer in the p-type well or p⁺-type layer in the n-type well as an emitter, and the like are arranged on the same chip.

8 Claims, 31 Drawing Sheets

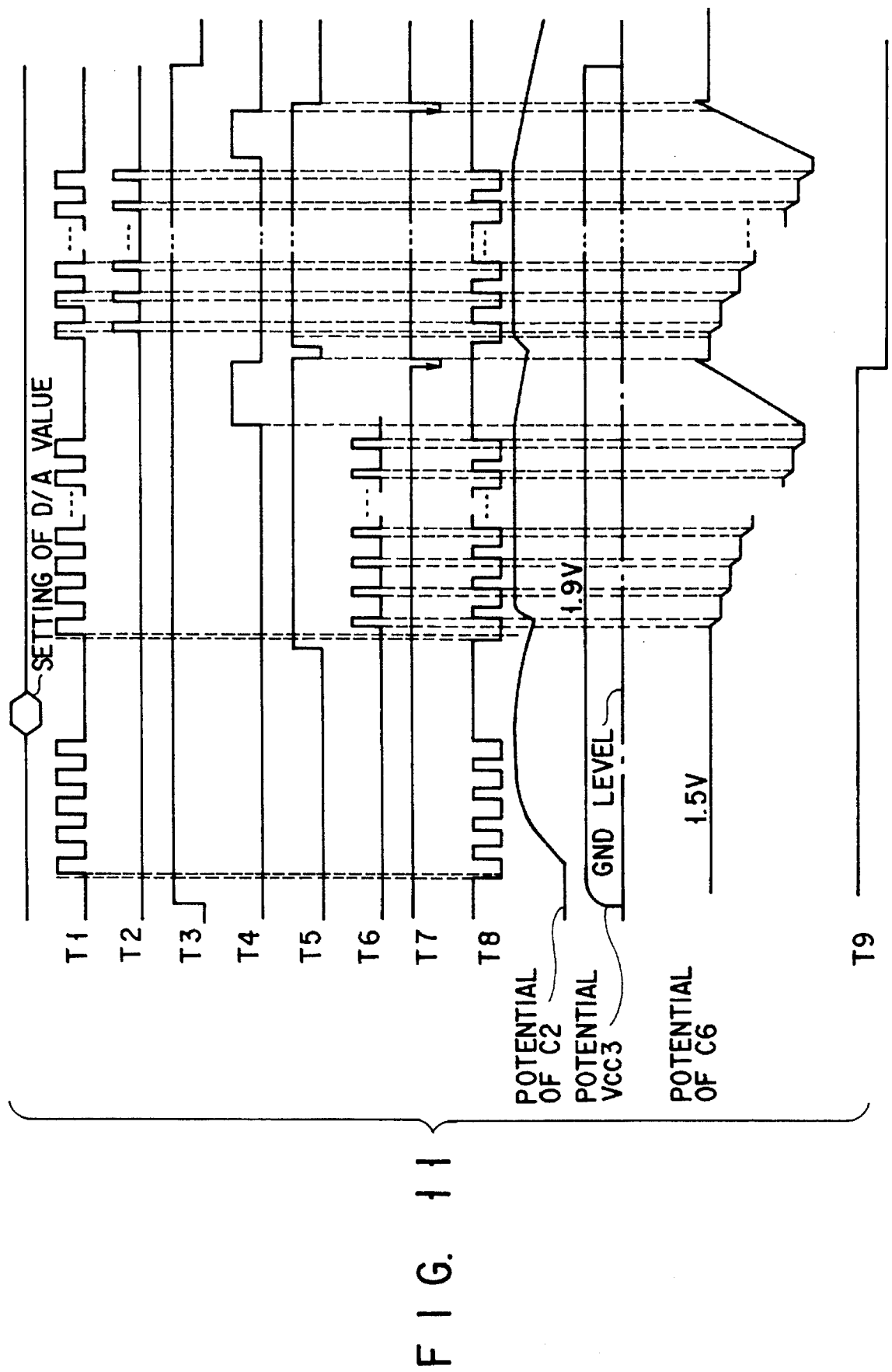
F I G. 11

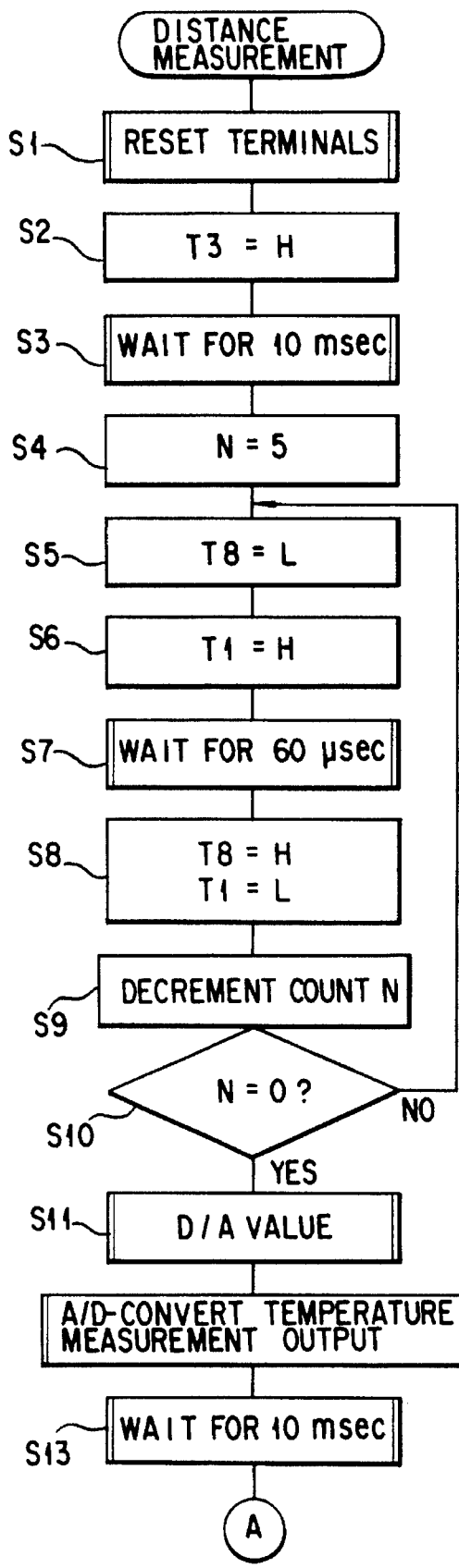
F I G. 12A
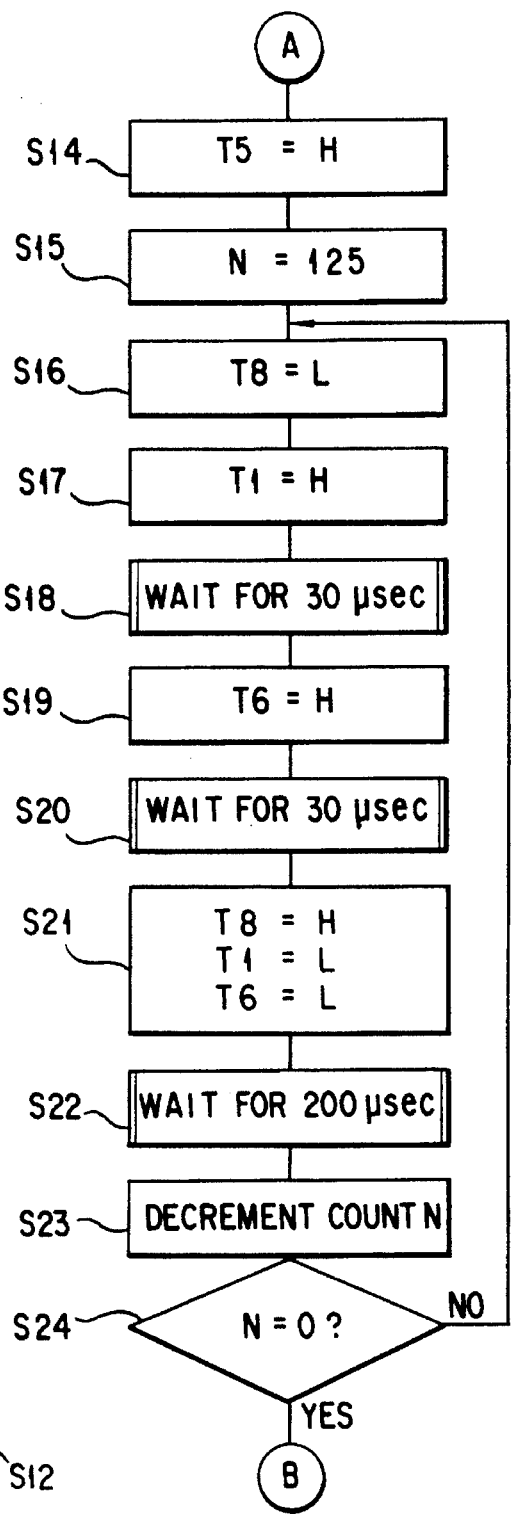
F I G. 12B

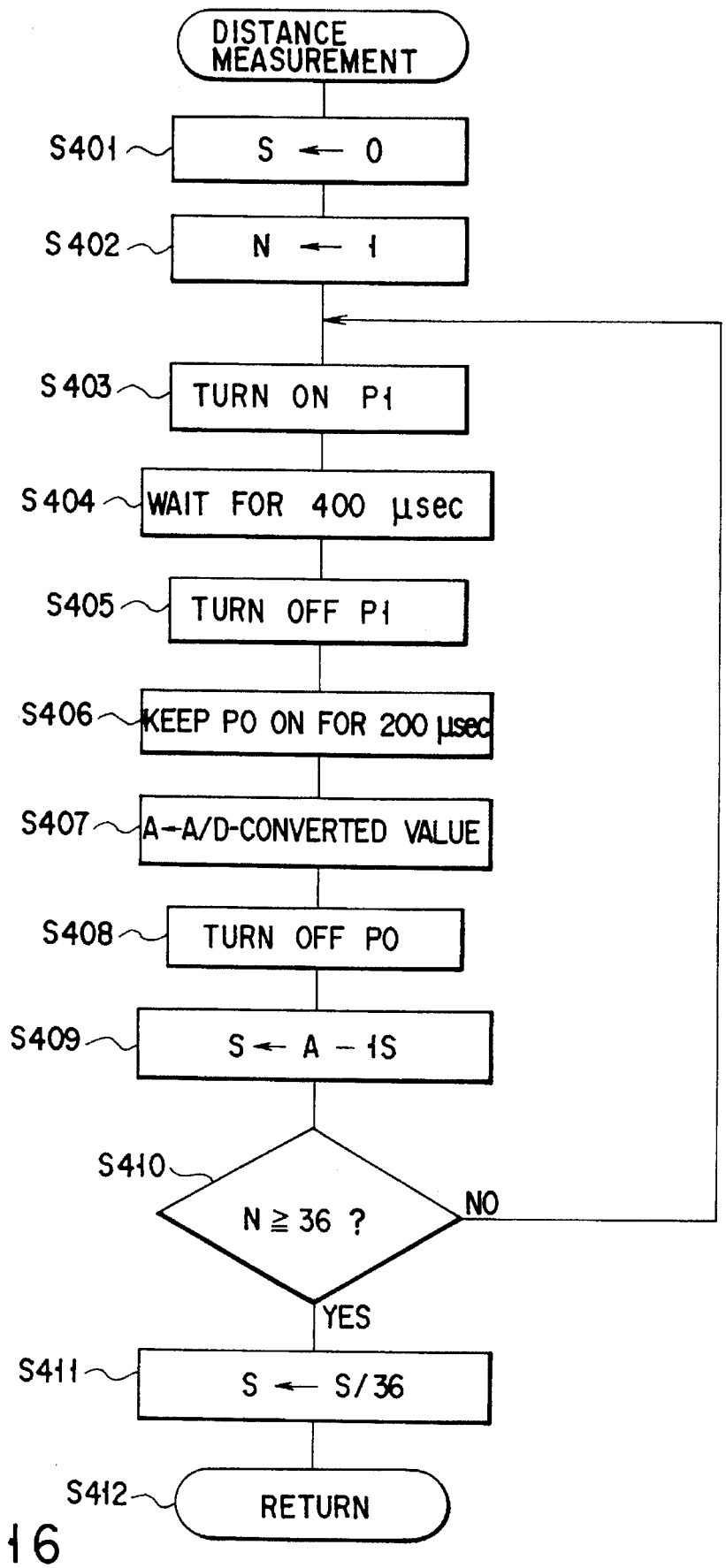
F I G. 16

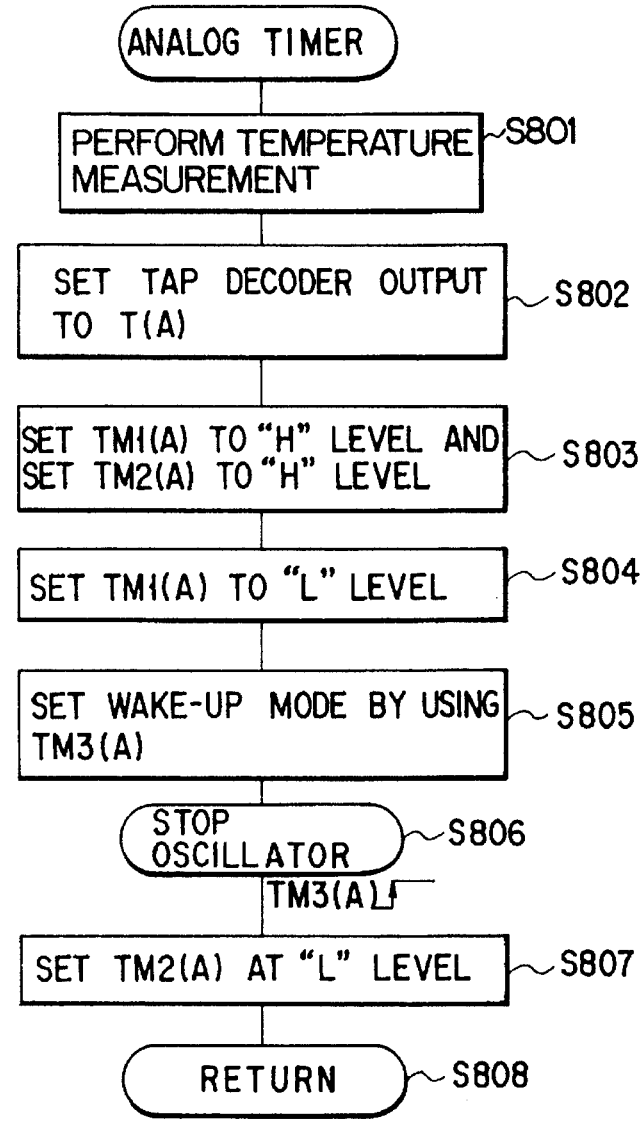
F I G. 23
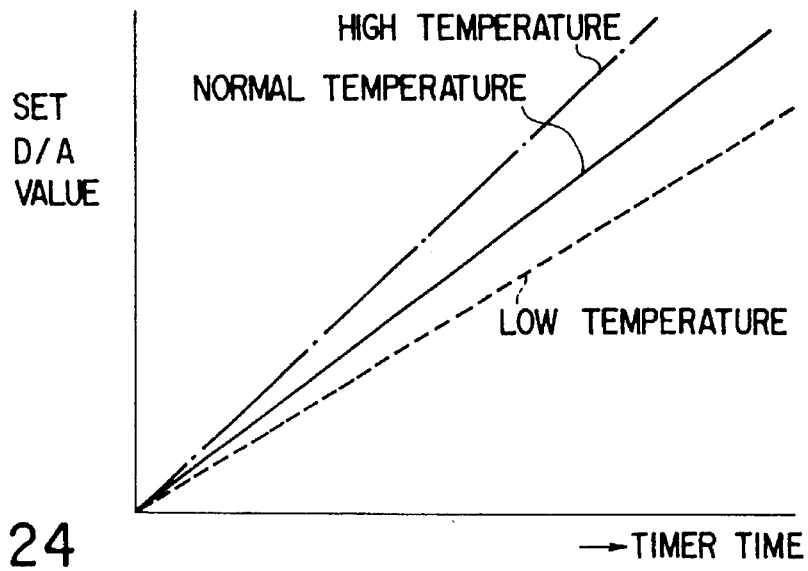
F I G. 24

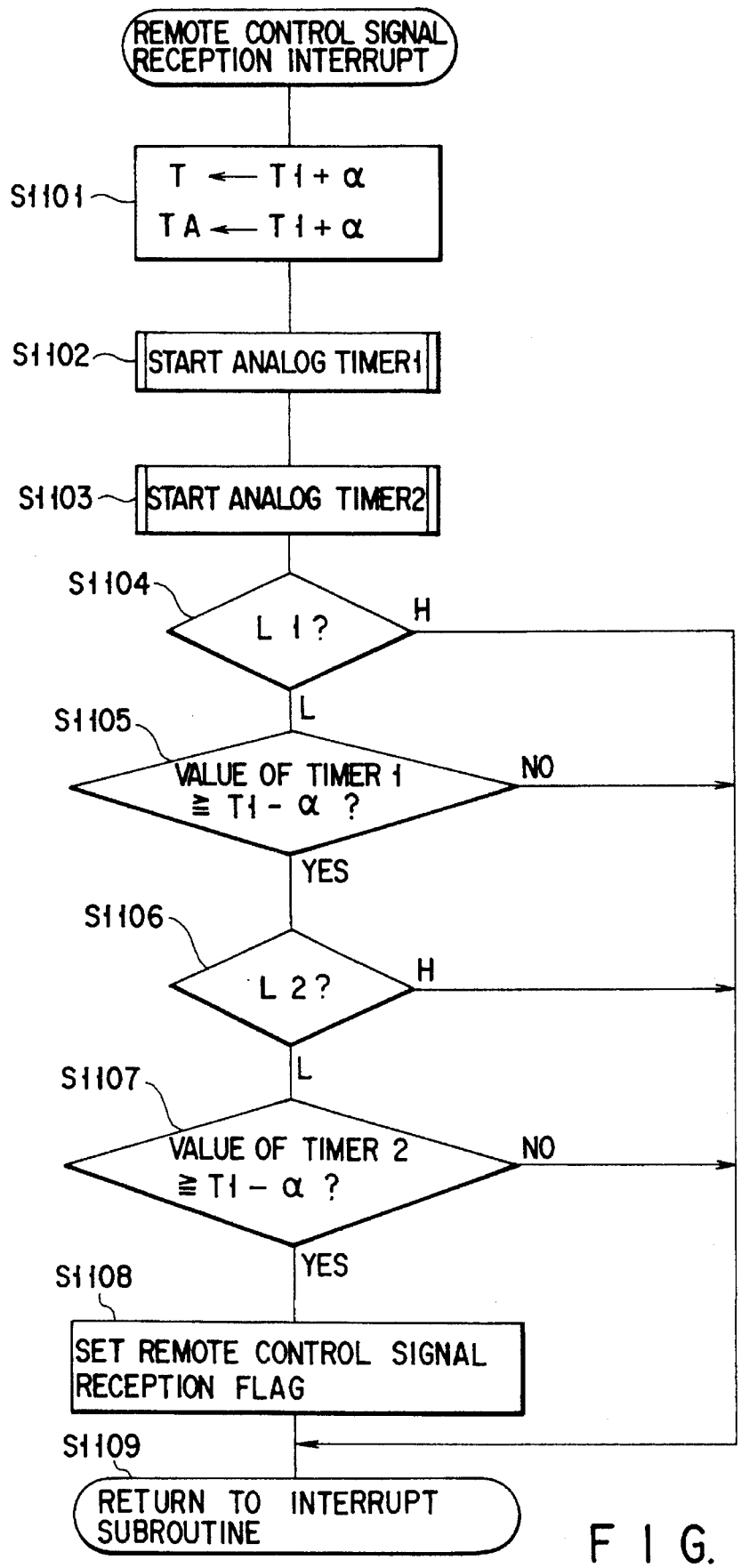
F I G. 28

CMOS-ANALOG IC FOR CONTROLLING CAMERA AND CAMERA SYSTEM USING THE SAME

BACKGROUND OF THE INVENTION

1. Field of the Invention

The present invention relates to a CMOS (Complementary Metal Oxide Silicon-Field Effect Transistor)-analog IC (Integrated Circuit) for controlling a camera and a camera system using the same.

2. Description of the Related Art

Consider the progress of technology associated with the structures of the electric systems of cameras in general. At the first stage, a sequence control circuit constituted by a CMOS-IC, an automatic exposure (to be referred to as AE hereinafter) circuit constituted by a bipolar (to be referred to as Bip hereinafter) device, an automatic focusing (to be referred to as AF hereinafter) circuit, and the like are connected to a camera body. At the second stage, a microcomputer (to be referred to as a CPU hereinafter) constituted by a CMOS-IC, AE and AF circuits constituted by Bip devices, and the like are connected to a camera body.

As an advanced technique, a technique of integrating a CPU constituted by a CMOS-IC, an AE circuit constituted by Bip devices, and the like into one chip by a $Bi_p$-CMOS process has been developed as shown in, e.g., the May 1988 issue of "Photographic Industry", p. 88. Circuits constituted by Bip devices are used for AE and AF circuits and the like for the following reasons. First, logarithmic compression techniques, which are frequently used in cameras, can be easily used. Second, analog circuits can be easily designed by using Bip devices. Third, large currents can be easily caused to flow by using Bip devices.

In addition, as an AF circuit using a CMOS device, a reflected light amount integral circuit is generally used, as disclosed in Jpn. Pat. Appln. KOKAI Publication No. 5-280973. Furthermore, in recent years, a display technique based on a liquid crystal display device (LCD) has been widely used. In consideration of the influence of an ambient temperature on the LCD, a technique of changing the voltage of a digital/analog (D/A) converter (DAC) as an LCD driving source in accordance with temperatures has also been proposed.

However, the integration of a CMOS device and a Bip analog circuit into one chip requires a Bip-CMOS process in the manufacturing process, resulting in prolonging the lead time (manufacturing time) and increasing the cost. In addition, since the analog circuit is constituted by Bip devices, the current consumption increases.

The reflected light amount integral device used as the AF circuit using the above CMOS device cannot use a logarithmic compression technique and has no dividing function. For this reason, in order to obtain a high-precision distance measuring unit using such a circuit, the circuit size inevitably increases.

Furthermore, since the AF circuit, AE circuit, remote control circuit, and the like of a camera handle small signals, the resistance of these circuits to noise is low. Conventionally, the only measure against such a drawback is to change the arrangement or pattern of components.

Various techniques associated with cameras use digital timers. Such a digital timer, however, requires clocks, and the noise of the clocks adversely affects various types of measuring circuits required for photographic operations of the cameras.

If the above-described sensor for measuring temperatures is arranged in a chip including a driving circuit for a power supply system, correct temperature measurement cannot be performed at some timing. If temperature measurement is performed at this timing, a proper voltage may not be applied to an LCD for display.

A camera incorporating a distance measuring unit of an active triangulation scheme is generally known. In this scheme, when a photographic operation is to be performed, an infrared-emitting diode (IRED) is caused to instantaneously emit infrared rays to radiate the rays on an object to be photographed through a lens having high directivity. The reflected light is received by a semiconductor position detecting element disposed at a place separated from the IRED in a direction perpendicular to the optical axis by a predetermined baseline length, and an output current corresponding to the light-receiving position is detected, thereby detecting the distance to the object.

This distance measuring unit requires a wide dynamic range because the intensity of reflected light greatly varies depending on the reflectance of an object and the distance thereto. In addition, since the ratio between reflected photocurrents needs to be detected, processing using logarithmic compression/expansion function is required.

For example, Jpn. Pat. Appln. KOKAI Publication Nos. 1-260309 and 62-191702 disclose distance measuring operation circuits each using a collector current supplied from a differential amplifier constituted by a pair of transistors, which current is obtained by supplying two detected currents from a semiconductor position sensor to a logarithmic compression diode and connecting the two logarithmically compressed outputs to the bases of the transistors.

Variations of the above-described distance measuring operation circuit are disclosed in Jpn. Pat. Appln. KOKAI Publication Nos. 1-150809 and 1-224617.

The above distance measuring circuits have been conventionally constituted as bipolar transistor integrated circuits. In a bipolar structure, bipolar transistors and diodes can be freely used, and a functional circuit based on the above-described diode characteristics such as logarithmic compression and logarithmic expansion can be relatively easily formed.

In contrast to this, if the above distance measuring unit is purely constituted by a MOS structure, a MOS transistor generally has the following current-voltage (I-V) characteristics. That is, in the case of an NMOS type, (1) OFF region: $V_{GS} < V_{TN}$, $I_D = 0$ (2) ON region: $V_{GS} \geq V_{TN}$ (2-1) linear region: $V_{DS} < V_{GS} - V_{TN}$ $$I_D = \beta_N \left\{ (V_{GS} - V_{TN}) \cdot V_{DS} - \frac{V_{DS}^2}{2} \right\}$$

$$\beta_N = \mu_N C_{OX} \frac{W_{\mathit{eff}}}{L_{\mathit{eff}}}$$

(2-2) saturation region: $V_{DS} \geq V_{GS} - V_{TN}$ $$I_D = \frac{\beta_N}{2} (V_{GS} - V_{TN})^2$$

In the case of a PMOS type, (i) OFF region: $V_{GS} > V_{TP}$, $I_D = 0$ (ii) ON region: $V_{GS} < V_{TP}$ (1) linear region: $V_{DS} < V_{GS} - V_{TP}$ $$I_D = \beta_P \left\{ (V_{GS} - V_{TP}) \cdot V_{DS} - \frac{V_{DS}^2}{2} \right\}$$

$$\beta_P = \mu_P C_{OX} \frac{W_{eff}}{L_{eff}}$$

(2) saturation region: $V_{DS} \leq V_{GS} - V_{TP}$ $$I_D = \frac{\beta_P}{2} (V_{GS} - V_{TP})^2$$

where $I_D$ is the drain current, $V_{TN}$ is the NMOS threshold voltage, $V_{TP}$ is the PMOS threshold voltage, $V_{GS}$ is the gate-source voltage, $V_{DS}$ is the drain-source voltage, $\mu_n$ is the electron mobility, $\mu_p$ is the hole mobility, $W_{eff}$ is the effective channel width, $L_{eff}$ is the effective channel length, and $C_{OX}$ is the gate capacitance per unit area.

In addition, a bipolar transistor has the following I-V characteristics:

$$I_C = \beta \cdot I_S \exp\left(\frac{V_{BE}}{V_T}\right)$$

where $\beta$ is the DC amplification factor, $I_C$ is the collector current, $I_S$ is the saturation current, $V_{BE}$ is the base-emitter voltage, and $V_T$ is the thermal voltage.

It is known that the MOS transistor does not have the I-V characteristics based on the logarithmic characteristics of the bipolar transistor in a normal operation range.

For the above-described reasons, it has been considered that it is difficult to form all integrated circuits demanding logarithmic compression/expansion functions as element functions, such as a distance measuring circuit and a photometric circuit, by using elements having MOS structures, and such a manner of forming integrated circuits is not suitable in terms of circuit arrangement.

The MOS transistor, however, has the following advantages over the bipolar transistor which has been conventionally used: (1) a high impedance can be obtained, (2) matching with a logic system can be effectively performed, and (3) shrinkage is basically allowed to an extent greater than that of the bipolar transistor, and a reduction in chip size and cost can be achieved.

SUMMARY OF THE INVENTION

It is, therefore, an object of the present invention to provide a new and improved CMOS-analog IC for controlling a camera and a camera system using the same which includes at least one of the following circuits and devices: first, AE and AF circuits based on a CMOS device, which can be manufactured with substantially the same lead time and cost as those of a general CPU; second, a CPU which can be manufactured at a low cost within a short term of delivery and includes an analog circuit with low current consumption; third, a logarithmic compression type distance measuring circuit which can be formed in a CMOS device of a general CPU; fourth, a logarithmic compression type photometric circuit which can be formed in a CMOS device of a general CPU; fifth, a CPU capable of eliminating the influence of clock noise produced by a clock oscillator for driving a CPU; and sixth, an LCD drive temperature correcting circuit which can obtain a clear display even if the temperature of an integrated circuit increases owing to heat generated by itself.

It is another object of the present invention to provide a distance measuring apparatus having a MOS structure, which is constituted by a distance measuring operation circuit such as a logarithmic compression/expansion circuit using a parasitic bipolar transistor formed in a MOS structure.

In order to achieve the first object, in a camera controller using a CMOS-analog IC according to the first aspect of the present invention, a microcomputer and a logarithmic compression type distance measuring or photometric circuit, constituted by a CMOS device having a parasitic bipolar transistor having a p- or n-type well as a base and an n$^+$-type layer in the p-type well or p$^+$-type layer in the n-type well as an emitter, are arranged on the same chip.

In a camera controller using a CMOS analog IC according to the second aspect of the present invention, a camera microcomputer having a camera control microcomputer core, a measuring circuit required for a photographic operation of the camera, and a large-current source circuit for directly driving a bipolar transistor arranged on the same chip, comprises a first power supply terminal directly connected to the battery, and a second power supply terminal connected to a power supply backup capacitor connected in parallel to the battery, wherein the camera control microcomputer core and the camera measuring circuit receive power from the second power supply terminal, and the large-current source circuit receives power from the first power supply terminal as at least a large-current source.

In a camera controller using a CMOS-analog IC according to the third aspect of the present invention, a camera one-chip microcomputer having a camera control microcomputer, a camera measuring circuit, and a large-current sink circuit for directly driving a bipolar transistor arranged on the same chip, comprises a first ground pad for the camera control microcomputer, a first IC lead connected to the first ground pad, a second ground pad for the camera measuring circuit, a second IC lead connected to the second ground pad, a third ground pad for the large-current sink circuit, and a third IC lead connected to the third ground pad.

In a camera controller using a CMOS-analog IC according to the fourth aspect of the present invention, the first and second ground pads are commonly used.

In a camera having a one-chip microcomputer having a CMOS-analog IC arranged on the same chip as that of the microcomputer, the CMOS-analog IC includes at least one of an automatic focusing circuit, an automatic exposure circuit, a remote control circuit, and a temperature measuring circuit, and power is supplied to at least one of the circuits when the camera can perform a photographic operation.

According to the sixth aspect of the present invention, there is provided a camera controller using a CMOS-analog IC, comprising light-emitting means for emitting pulse light onto an object to be measured, light-receiving means, constituted by a semiconductor position detecting element located at a position separated from the light-emitting means by a baseline length, and a light-receiving lens, for receiving light reflected by the object, a MOS transistor circuit for inputting a pulse photocurrent from the semiconductor position detecting element to a base as a p- or n-type well of a parasitic bipolar transistor having an n$^+$- or p$^+$-type layer in the p- or n-type well as an emitter, and distance calculating means for calculating a distance to the object on the basis of an output from the MOS transistor circuit.

According to the seventh aspect of the present invention, there is provided a camera controller using a CMOS-analog IC, comprising first and second parasitic bipolar transistors, each having an n$^+$-type region in a p-type well or a p$^+$-type region in an n-type well in a CMOS structure as an emitter, a photosensitive element which changes in accordance with an object brightness, and A/D conversion means for A/D-converting an emitter potential of the first parasitic bipolar transistor, wherein the photosensitive element is electrically connected to an emitter of the first parasitic bipolar transistor, a base of the first parasitic bipolar transistor is electrically connected to a base of the second parasitic bipolar transistor, and a constant-current source is connected to an emitter of the second parasitic bipolar transistor.

According to a camera controller using a CMOS-analog IC of the eighth aspect of the present invention, in a camera including a one-chip microcomputer having an analog circuit portion arranged on the same chip as that of the microcomputer, the analog circuit portion includes at least one of an automatic focusing circuit, an automatic exposure circuit, and a remote control circuit, a clock oscillator of the microcomputer is stopped when at least one of the circuits is to be operated, and the oscillator is operated again in response to a measurement or reception completion signal.

According to the ninth aspect of the present invention, there is provided a camera controller using a CMOS-analog IC, comprising a reference current source, a charge portion charged by a current output from the reference current source, a reference voltage setting portion, a comparing portion for comparing a charged voltage with a reference voltage, and an oscillation control portion for starting oscillator in accordance with an output from the comparing portion.

In a camera controller using a CMOS-analog IC according to the tenth aspect of the present invention, the analog timer includes correction means for performing correction in accordance with a temperature.

According to the eleventh aspect of the present invention, there is provided a camera controller using a CMOS-analog IC, comprising a power system circuit for controlling a large current, an LCD display power supply D/A converter, a storage portion for storing data indicating whether a power system is driven, a timer for checking whether a predetermined period of time has elapsed after the power system is driven, clear means for clearing the storage portion upon the elapse of the predetermined period of time, a temperature measuring circuit, and setting means for setting an output of the D/A converter in accordance with an output from the temperature measuring circuit, wherein when the storage portion is not cleared, an operation of the setting means is inhibited.

In the camera controller using the CMOS-analog IC according to the first aspect of the present invention, the microcomputer and the logarithmic compression type distance measuring or photometric circuit, constituted by a CMOS device having a parasitic bipolar transistor having a p- or n-type well as a base and an $n^+$-type layer in the p-type well or $p^+$-type layer in the n-type well as an emitter, are arranged on the same chip.

In the camera controller using the CMOS-analog IC according to the second aspect, the camera microcomputer core and the camera measuring circuit receive power from the second power supply terminal, and the large-current source circuit receives power from the first power supply terminal as at least a large-current source.

In the camera controller using the CMOS-analog IC according to the third aspect, the first IC lead is connected to the first ground pad for the camera control microcomputer, the second IC lead is connected to the second ground pad for the camera measuring circuit, and the third IC lead is connected to the third ground pad for the large-current sink circuit.

In the camera controller using the CMOS-analog IC according to the fourth aspect, the first and second ground pads are commonly used.

In the camera controller using the CMOS-analog IC according to the fifth aspect, the CMOS-analog IC includes at least one of the automatic focusing circuit, the automatic exposure circuit, the remote control circuit, and the temperature measuring circuit, and power is supplied to at least one of the circuits when the camera can perform a photographic operation.

In the camera controller using the CMOS-analog IC according to the sixth aspect, when the light-emitting means emits pulse light onto an object to be measured, light reflected by the object is received by the light-receiving means constituted by the semiconductor position detecting element, located at the position separated from the light-emitting means by the baseline length, and the light-receiving lens. When the MOS transistor circuit inputs a pulse photocurrent from the semiconductor position detecting element to the base of the parasitic bipolar transistor having the p- or n-type well in the CMOS structure as the base, and the $n^+$-type region in the p-type well or the $p^+$-type region in the n-type well as the emitter, the distance measuring operation means calculates the distance to the object on the basis of an output from the MOS transistor circuit.

In the camera controller using the CMOS-analog IC according to the seventh aspect, the photosensitive element is electrically connected to the emitter of the first parasitic bipolar transistor, the base of the first parasitic bipolar transistor is electrically connected to the base of the second parasitic bipolar transistor, and the emitter of the second parasitic bipolar transistor is connected to the constant-current source.

In the camera controller using the CMOS-analog IC according to the eighth aspect, the analog circuit includes at least one of the automatic focusing circuit, an automatic exposure circuit, and a remote control circuit, the clock oscillator of the microcomputer is stopped when at least one of the circuits is to be operated, and the clock oscillator is operated again in response to a measurement or reception completion signal.

The camera controller using the CMOS-analog IC according to the ninth aspect comprises the reference current source, the charge portion charged by a current output from the reference current source, the reference voltage setting portion, the comparing portion for comparing a charged voltage with a reference voltage, and an oscillation control portion for starting oscillation in accordance with an output from the comparing portion.

In the camera controller using the CMOS-analog IC according to the tenth aspect, the analog timer includes the correction means for performing correction in accordance with a temperature.

In the camera controller using the CMOS-analog IC according to the eleventh aspect, when the storage portion is not cleared, an operation of the setting means is inhibited.

In addition, in order to achieve the second object, according to the present invention, there is provided a distance measuring apparatus comprising light-emitting means for emitting a light beam onto an object to be measured, light-receiving means for receiving reflected light of the light beam from the object and outputting a pair of signal currents corresponding to a distance to the object, logarithmic compression means for supplying the pair of signal currents to base-emitter paths of two first parasitic PNP or NPN transistors in a CMOS structure, and outputting logarithmically compressed signals, logarithmic expansion means for logarithmically expanding the two compressed signals by using two second parasitic PNP or NPN transistors in a CMOS structure, and distance detecting means for obtaining a distance to the object on the basis of an output from the logarithmic expansion means.

Furthermore, according to the present invention, there is provided a distance measuring apparatus of a CMOS structure comprising light-emitting means for emitting a light beam onto an object to be measured, light-receiving means for receiving reflected light of the light beam from the object and outputting a pair of signal currents corresponding to a distance to the object, logarithmic compression means for supplying the pair of signal currents to base-emitter paths of two first parasitic PNP or NPN transistors in a CMOS structure, and outputting logarithmically compressed signals, difference calculating means for calculating a difference between the two logarithmically compressed signals, and distance detecting means for obtaining a distance to the object on the basis of an output from the difference calculating means.

In the distance measuring apparatus of the MOS structure, which has the above-described arrangement, when the light-emitting means emits a light beam onto an object to be measured, the light-receiving means receives reflected light and outputs a pair of signal currents corresponding to the distance to the object. The logarithmic compression means supplies the pair of signal currents to the base-emitter paths of the two first parasitic PNP or NPN transistors in the CMOS structure, and outputs logarithmically compressed signals. The logarithmic expansion means logarithmically expands the two compressed signals by using the two second parasitic PNP or NPN transistors in the CMOS structure. The distance detecting means obtains the distance to the object on the basis of an output from the logarithmic expansion means.

In addition, with the distance measuring apparatus of the MOS structure, when the light-emitting means emits a light beam onto an object to be measured, the light-receiving means receives reflected light and outputs a pair of signal currents corresponding to the distance to the object. The logarithmic compression means supplies the pair of signal currents to the base-emitter paths of the two first parasitic PNP or NPN transistors in the CMOS structure, and outputs logarithmically compressed signals. The difference calculating means then calculates a difference between the two logarithmically compressed signals. The distance detecting means obtains the distance to the object on the basis of an output from the difference calculating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 11 is a timing chart showing the operation of the distance measuring unit according to the second embodiment;

FIGS. 12A and 12B are flow charts showing the operation of the distance measuring unit according to the second embodiment;

FIG. 16 is a flow chart for explaining the sequence of distance measurement performed by a distance measuring circuit block 4;

FIG. 23 is a flow chart showing the operation of the analog timer circuit;

FIG. 24 is a graph showing the relationship between the timer time and the set D/A value;

FIG. 28 is a flow chart showing the operation of the circuit using the analog timers to evaluate a remote control reception signal;

DETAILED DESCRIPTION OF THE PREFERRED EMBODIMENTS

Figure 1A:
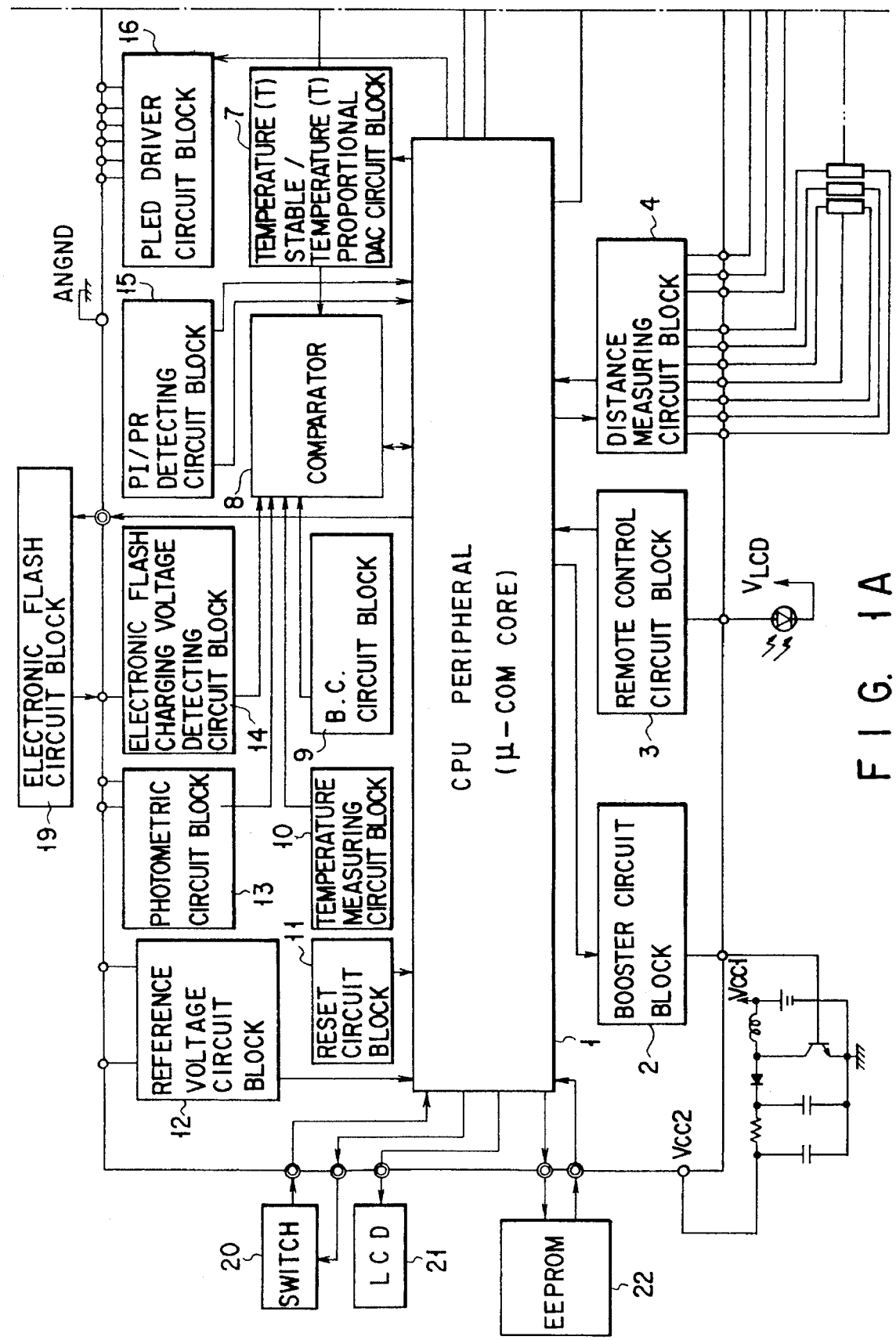
FIGS. 1A and 1B are block diagrams showing the arrangement of a camera controller using a CMOS-analog IC according to the first embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

Figure 1B:
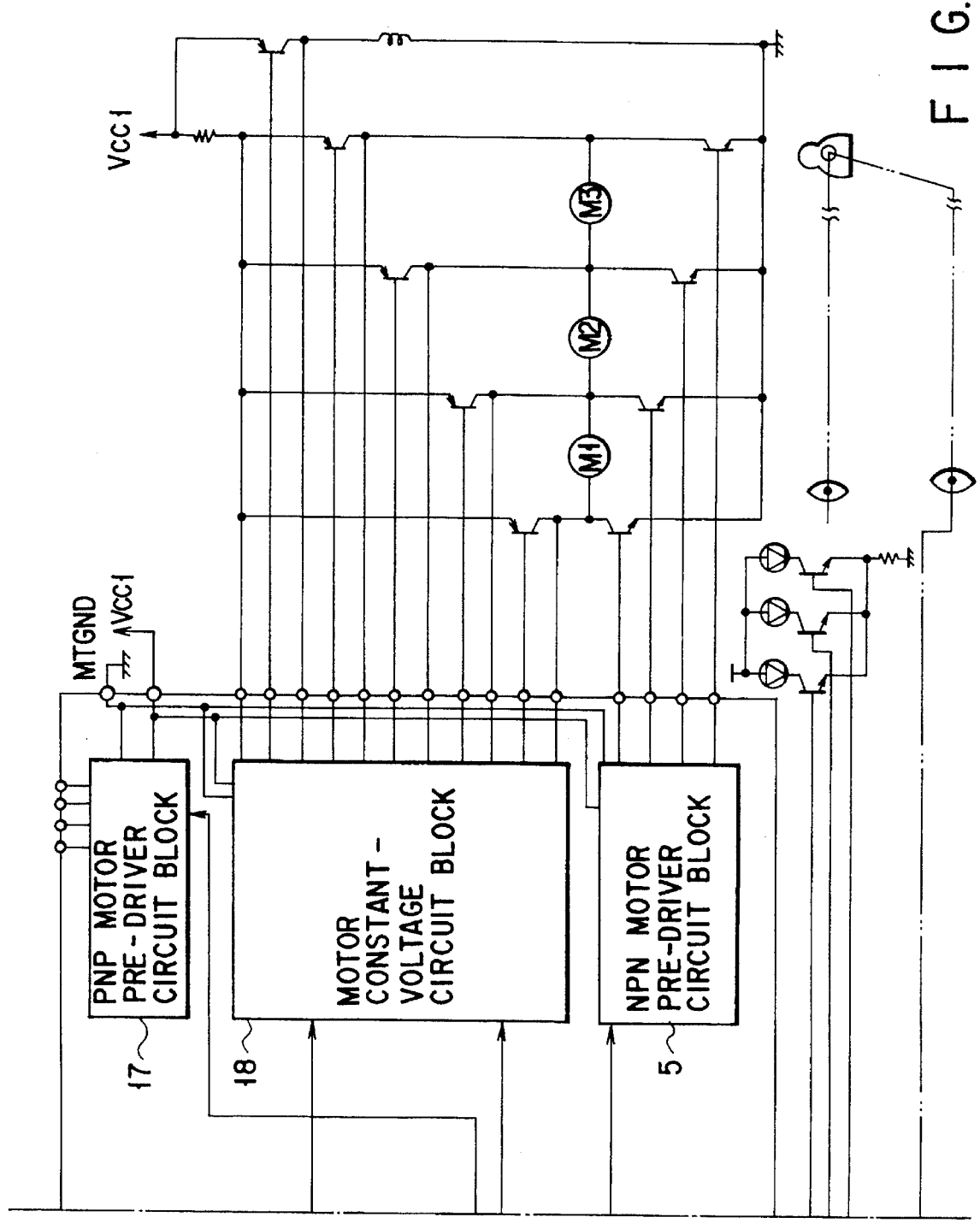

FIGS. 1A and 1B are diagrams showing the arrangement of a camera controller using a CMOS-analog IC according to the first embodiment of the present invention. In the first embodiment, an analog circuit portion constituted by a CMOS and a microcomputer (CPU) are integrated into one chip.

More specifically, as shown in FIGS. 1A and 1B, the following components are integrated into one chip: a CPU 1 (μ-com core including a CPU and peripheral circuits), a booster circuit block 2, a remote control circuit block 3, a distance measuring circuit block 4, an NPN motor driver circuit block 5, a motor constant-voltage circuit block 18, a temperature (T) stable/temperature (T) proportional DAC circuit block 7, a comparator 8, a battery check (B.C.) circuit block 9, a temperature measuring circuit block 10, an electronic flash charging voltage detecting circuit block 14, a photointerrupter/photoreflector (PI/PR) detecting circuit block 15, a PLED driver circuit block 16, and a PNP pre-driver circuit block 17. An electrically writable/erasable nonvolatile memory such as an electrically erasable and programmable read-only memory (EEPROM) 22, an LCD 21, a switch 20, and an electronic flash circuit block 19 are arranged around this chip.

Figure 2:
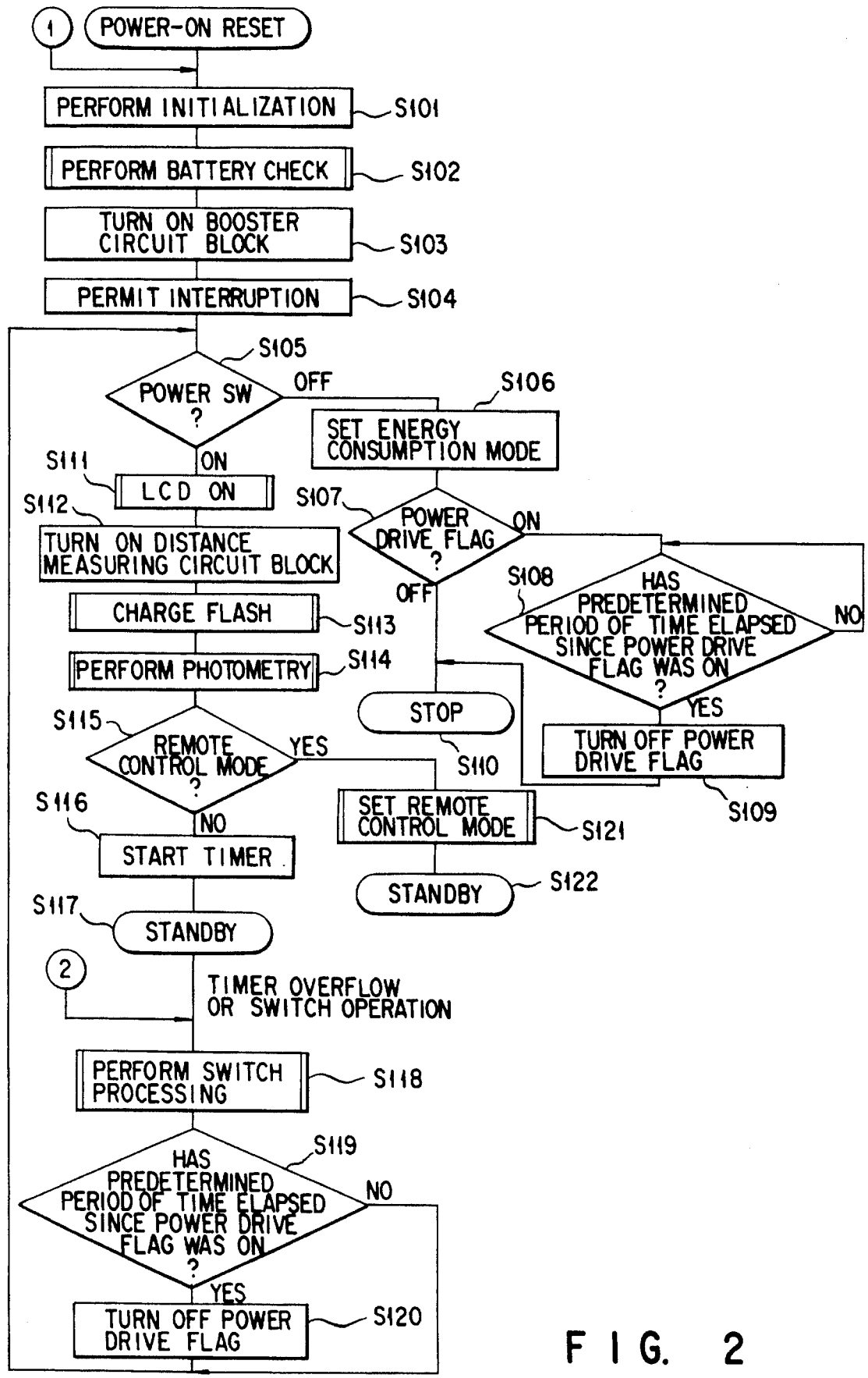
FIG. 2 is a flow chart showing the main sequence of the camera controller using the CMOS-analog IC according to the first embodiment.
Figure 3:
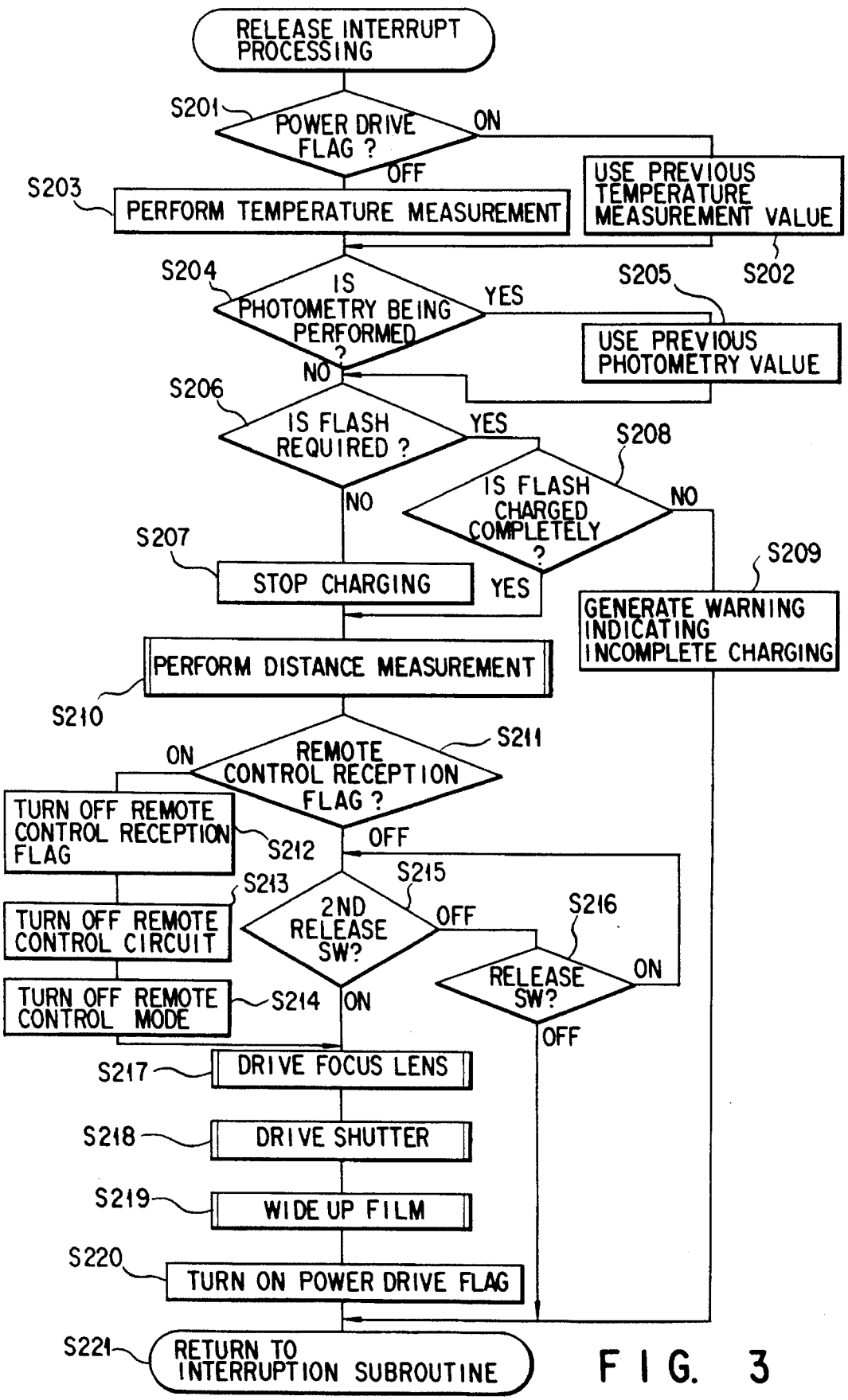
FIG. 3 is a flow chart showing the sequence of a subroutine "release interrupt processing" executed when the release switch is depressed or a remote control signal is received.
Figure 4:
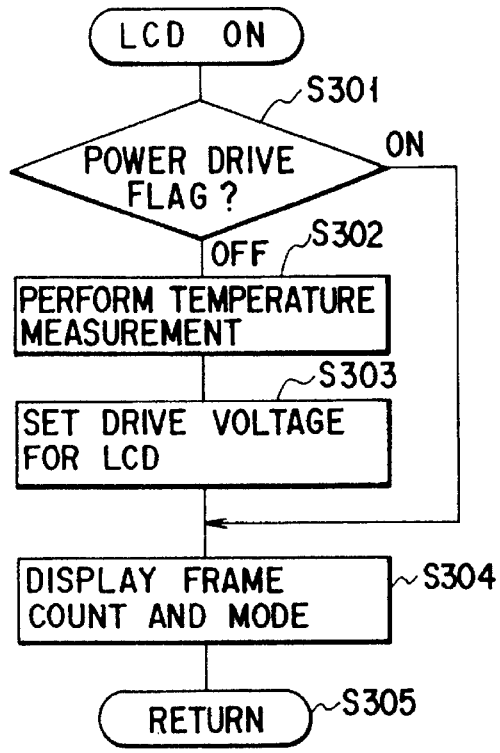
FIG. 4 is a flow chart showing the sequence of a subroutine "LCD ON"

The operation of the camera controller using the CMOS-analog IC according to the first embodiment will be described in detail below with reference to the flow charts of FIGS. 2 to 4.

The main sequence of the camera controller using the CMOS-analog IC according to the first embodiment will be described first with reference to the flow chart in FIG. 2.

When the battery power is supplied, a reset operation is performed by the reset circuit block 11, and the program of the CPU 1 is started. The flag, random access memory (RAM), and ports of the CPU 1 and the analog circuit portion are initialized (step S101). A battery check is performed by the B.C. circuit block 9. If the result indicates "OK", the flow advances to step S103 (step S102). The booster circuit block 2 is then turned on to ensure the voltage for the overall system (step S103).

In interrupt permission processing in step S104, the operations of a release switch and a power switch (neither is shown) in the block of the switch 20, a rear cover opening/closing detection switch of the camera body (not shown), a film rewind switch, and the like are permitted (step S104). If the power switch is ON (step S105), the flow advances to step S111. If the power switch is OFF (step S105), the flow advances to step S106.

In step S106, an energy saving mode is set. In this mode, for example, the AF circuit, the booster circuit, or the LCD 21 is turned off, or the port is set in a state wherein no current flows. If the power supply source drive flag is ON, the power drive flag is turned off after an elapse of a predetermined period of time (steps S108 and S109). The clock oscillator of the CPU 1 is then stopped (step S110). In this stop state, the switches whose operations are permitted are: the power switch (if the switch is turned on, the flow returns to ①), the rear cover opening/closing detection switch, the forcible film rewind switch (after processing, the flow returns to ①), and the like.

In contrast to this, if it is determined in step S105 that the power switch is turned on, the following processing is repeated. The LCD 21 is displayed (step S111), and power is supplied to the distance measuring circuit block 4 to allow the distance measuring circuit to start its operation at any time (step S112). In a Bip circuit, since a large current is required, the circuit cannot be kept on all the time but is turned on after the release button is depressed. For this reason, the time lag between the instant at which the release button is depressed and the instant at which measurement is performed is several 10 ms.

In an electronic flash charging operation, energy for emission of electronic flashlight is charged in a main capacitor in the electronic flash circuit block 19 (step S113). This charge level is detected by the electronic flash charging voltage detecting circuit block 14. If the charging operation is completed, the flow directly advances to step S114.

Subsequently, the brightness of an object to be photographed is measured by the photometric circuit block 13 (step S114). At this time, it is checked whether a remote control mode is set (step S115).

If it is determined that the remote control mode is set, the CPU 1 is set in a standby state (steps S121 and S122) to set the remote control circuit block 3 in an operative state by performing a remote control setting operation so as to remove the influence of noise produced by the clock oscillator.

In this standby state, the clock oscillator is in operation, unlike the stop state, but clocks are supplied to only minimum necessary portions such as the LCD 21. In the standby state, therefore, the influence of noise on the analog circuit portion is almost eliminated. In addition, in the standby state, as is apparent, when a remote control signal is input, a subroutine "remote control signal reception interrupt processing" is executed. If the release switch is depressed, a subroutine "release interrupt processing" (FIG. 3) to be described later is executed. The subroutine "release interrupt processing" is accepted at any time in states other than the standby state while the power switch is ON. If another operation switch is turned on, the flow shifts to ② in FIG. 2.

If it is determined that the remote control mode is not set, the timer is started, and the standby state is set (steps S116 and S117). This standby state is canceled when an operation switch is depressed or the timer causes an overflow. An interval at which the main routine is repeated is determined by the timer. If the standby state is canceled, a subroutine "switch processing" is executed (step S118) to perform mode switching in a case wherein a mode switch (not shown) is depressed or give a zoom drive instruction obtained upon depression of a zoom switch.

If the power drive flag is ON, it is checked whether a predetermined period of time has elapsed since the flag was turned on (step S119). If it is determined that the predetermined period of time has elapsed, the power supply source drive flag is turned off (step S120). Note that the power supply source drive flag is a determination flag indicating whether the temperature measuring circuit can be used or not. The predetermined period of time is the time required for the temperature of the chip to return to an ambient temperature. The above operation is repeated until the power switch is turned off.

In the present invention, since the entire chip is constituted by the CMOS-analog IC, the current consumption of each circuit is basically small. Therefore, the amount of heat generated by the chip itself is small. Unlike a bipolar structure, since the chip temperature does not increase, the temperature is kept almost equal to the ambient temperature regardless of temperature measurement at any time. When, however, a power supply source system which is driven by a large current such as a motor pre-driver is driven, a current equivalent to that required in the bipolar structure is required, and hence the chip temperature increases. For this reason, when a power supply source system is driven, the power supply source drive flag is turned on, and no temperature measurement is performed while the power supply source drive flag is ON.

The sequence of the subroutine "release interrupt processing" to be executed when the release switch is depressed or a remote control signal is received will be described in detail next with reference to the flow chart in FIG. 3.

At the start of this routine, the power supply source drive flag is checked. If the flag is OFF, temperature measurement is performed. If the flag is ON, no temperature measurement is performed, and the previous temperature measurement value is used because the temperature of the CMOS-analog circuit itself is still high. This temperature is used to correct the temperature coefficient of the lens and the like (steps S201 to S203).

Subsequently, it is checked in the next step whether a photometric operation is being performed. If YES in this step, the photometric operation is stopped, and the previous photometry value is used to prevent a release time lag. Since a photometric operation is performed all the time in the main flow, if photometry is completed, the corresponding value is used. That is, a pseudo photometry time is zero (steps S204 and S205).

It is then checked whether an electronic flash operation is necessary (step S206). If it is determined that no electronic flash operation is necessary, charging is stopped, and the flow advances to step S210. If an electronic flash operation is required, it is checked whether charging is completed (step S208). If charging is completed, the flow advances to step S210. Otherwise, a warning of incomplete charging is generated, and the flow leaves the interruption subroutine (step S209).

In addition, the distance measuring circuit block 4 is caused to measure the distance to the object (step S210). A remote control signal reception flag is then checked (step S211). If the remote control signal reception flag is ON, and the remote control signal reception flag is received, the flow shifts to a photographic sequence after the remote control signal reception flag, the remote control circuit, and the remote control mode are turned off (steps S212 to S217).

If the remote control signal reception flag is OFF, the ON/OFF operation of the 2nd release switch is checked (step S215), and a wait state is kept until the 2nd release switch is turned on. In this case, if the release switch is turned off while the 2nd release switch is kept OFF, the flow leaves the interruption subroutine (step S216).

In the photographic sequence in step S217, the focus lens is driven to a focus position. The shutter is then driven, a film is wound up, and the motor is driven. Therefore, the power supply source drive flag is turned on, and the flow returns from the interruption subroutine (steps S217 to S221) to the main routine.

The sequence of a subroutine "LCD ON" will be described in detail next with reference to FIG. 4.

At the start of this routine, the power supply source drive flag is checked (step S301). If the flag is OFF, the drive voltage of the LCD 21 is set after temperature measurement is performed (steps S302 and S303). In this embodiment, the drive voltage of the LCD 21 is set to be low if the ambient temperature is high, and vice versa, thereby keeping the display density unchanged even with changes in temperature. If the power supply source drive flag is ON, no drive voltage is set for the LCD 21, and the previously set voltage is maintained. After a film frame count, a camera mode, and the like are displayed (step S304), the flow returns to the main routine.

Each circuit block of the camera controller using the CMOS-analog IC according to the first embodiment will be described in detail below.

The present inventors have proposed a technique of using bipolar transistors, which parasitically exist in a CMOS device, or a technique of using weak inversion regions of a CMOS device for a CMOS-analog IC using only a CMOS device, in order to realize a wide dynamic range and a dividing function like a conventional analog circuit.

Figure 5A:
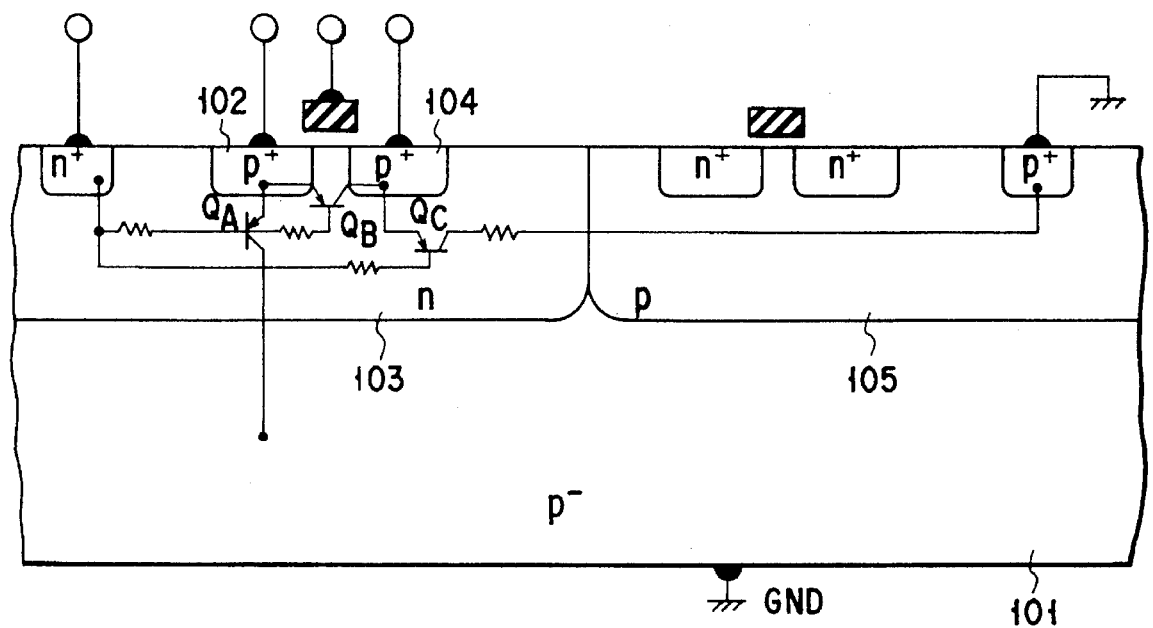
FIGS. 5A and 5B are sectional views for explaining the concepts of parasitic bipolar transistors used for a distance measuring unit having a MOS structure according to the present invention.
Figure 5B:
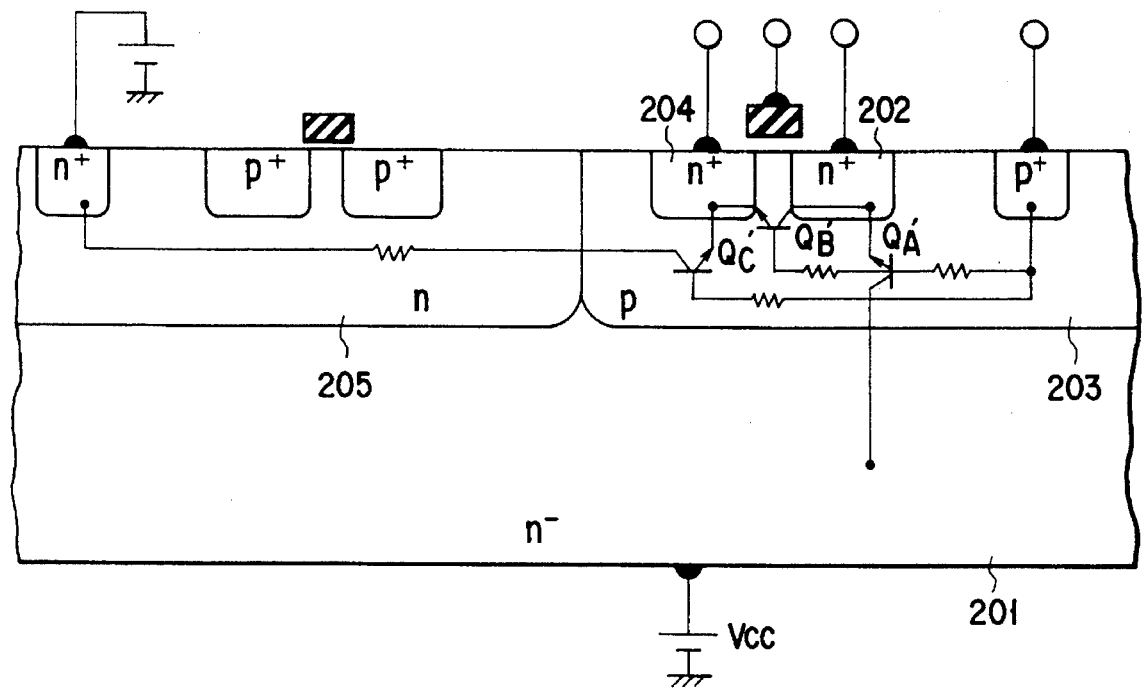

FIGS. 5A and 5B show NPN bipolar transistors parasitically existing in CMOS devices, and the arrangements of the NPN bipolar transistors. These transistors will be described below.

As shown in FIG. 5A (to be described later), a parasitic bipolar transistor $Q_A$ is present, provided that an $n^-$-type well is regarded as a base region; a $p^+$-type region in the $n^-$-type well, an emitter; and a $p^-$-type substrate, a collector. Note that since the collector of this transistor $Q_A$ is connected to a ground (GND) line, more limitations in use are imposed on the transistor than those on a general bipolar transistor.

In addition, as shown in FIG. 5B, a parasitic NPN bipolar transistor $Q_A'$ is present, provided that a p⁻-type well is regarded as a base region; an n⁺-type region in the p⁻-type well, an emitter; and an n⁻-type substrate, a collector. Note that since the collector of this transistor $Q_A'$ is connected to a power supply ($V_{CC}$) line, more limitations in use are imposed on the transistor than those on a general bipolar transistor.

With the use of such parasitic transistors in a CMOS device, a wide dynamic range and a dividing function can be realized in a CMOS-analog IC using only a CMOS device, similar to a conventional bipolar analog circuit.

A method of using parasitic bipolar transistors existing in a CMOS device will be described first with reference to a distance measuring unit.

FIGS. 5A and 5B show the concepts of parasitic bipolar transistors used for a distance measuring unit having a MOS structure of the present invention.

FIG. 5A shows parasitic bipolar transistors $Q_A$, $Q_B$, and $Q_C$ which exist when a field effect transistor (FET) having a CMOS device is formed on a p⁻-type silicon substrate 101. Referring to FIG. 5A, the parasitic bipolar transistor $Q_A$ is a vertical parasitic PNP bipolar transistor which has a p⁺-type diffusion layer 102 as an emitter, an n-type well region 103 as a base, and the p⁻-type silicon substrate 101 as a collector.

When a circuit element having a MOS structure is formed, in order to prevent the occurrence of latch-up of the element, the thickness (depth) of the layer of a well region is set to be large or the impurity concentration of the well region is set to be high to decrease a current amplification factor β. With this process, the current amplification factor β of the vertical parasitic PNP bipolar transistor is generally about 5 to 20. In addition, a p-type silicon substrate used as a collector is set at the ground (GND) potential and hence is fixed to the lowest potential all the time.

That is, a parasitic PNP bipolar transistor in a MOS structure is different from a bipolar transistor having a general bipolar structure in the following two points.

First, the current amplification factor β of the parasitic PNP bipolar transistor is very small.

Second, the collector potential (ground potential) of the parasitic PNP bipolar transistor is fixed, and the collector portion cannot be formed as a collector terminal.

The parasitic bipolar transistor $Q_B$ shown in FIG. 5A is a lateral parasitic PNP bipolar transistor having the p⁺-type diffusion layer 102 as an emitter, a p⁺-type diffusion layer 104 as a collector, and the n-type well region 103 as a base. The parasitic bipolar transistor $Q_C$ is a lateral parasitic PNP bipolar transistor having the p⁺-type diffusion layer 104 as an emitter, the n-type well region 103 as a base, and a p-type well region 105 as a collector.

Of these parasitic transistors, the vertical parasitic transistor can be generally considered as a dominant parasitic transistor, even though it depends on the impurity concentrations and structure (arrangement) of the transistors.

FIG. 5B shows parasitic NPN bipolar transistors $Q_A'$, QB', and $Q_C'$ which exist when a transistor (FET) having a CMOS device is formed on an n⁻-type silicon substrate 201.

The difference between the parasitic NPN bipolar transistor shown in FIG. 5B and the parasitic PNP bipolar transistor shown in FIG. 5A is that the n⁻-type silicon substrate 201 is biased to the highest power supply ($V_{CC}$) voltage. Since other structures of the transistor shown in FIG. 5B are similar those of the transistor shown in FIG. 5A, the same reference numerals in FIG. 5B denote the same parts as in FIG. 5A, and a description thereof will be omitted.

A distance measuring unit using parasitic PNP bipolar transistors in a CMOS structure according to the second embodiment of the present invention will be described next.

Figure 6:
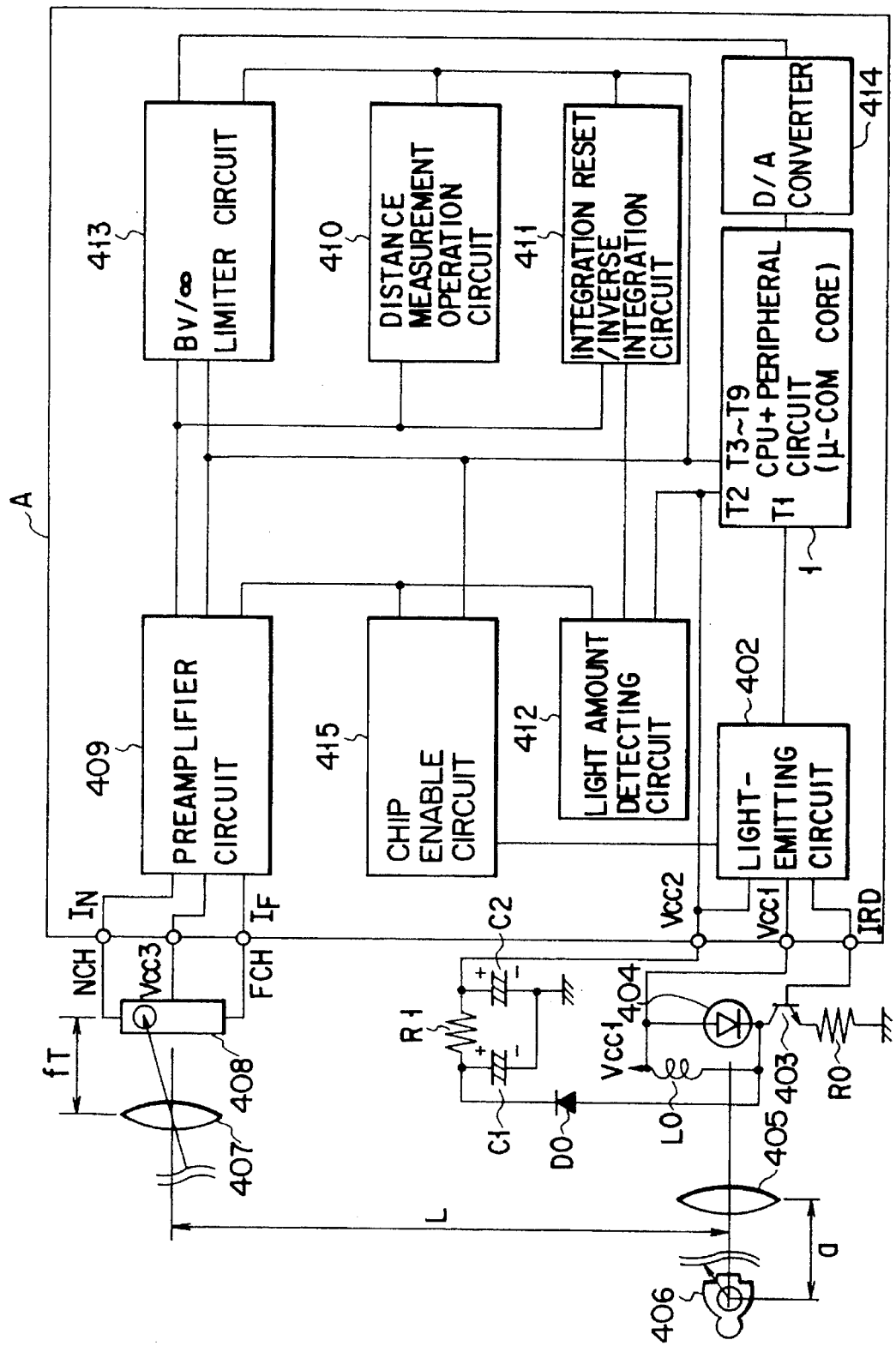
FIG. 6 is a schematic block diagram showing the overall arrangement of a distance measuring unit according to the second embodiment of the present invention.

FIG. 6 is a schematic block diagram showing the overall arrangement of a distance measuring unit according to the second embodiment of the present invention.

An NMOS transistor $Q_1$ (to be described later) in a light-emitting circuit 402 is turned on/off by an emission command signal from a terminal $T_1$ of a microcomputer (to be referred to as a CPU hereinafter) 1 constituted by a CPU and a peripheral device (μ-com core) and designed to control the overall distance measuring unit formed on a semiconductor substrate A. With this operation, an external power transistor 403 is turned on/off. With the operation of the power transistor 3, pulse light emitted from a distance measuring circuit block (IRED) 404 is focused by a light-emitting lens 405 and radiated on an object 406 located at an object distance a.

Light reflected by the object 406 is focused on the light-receiving surface of a semiconductor position detecting element (PSD) 408, located at the position of a focal distance fT, via a light-receiving lens 407 separated from the light-emitting lens 405 by a baseline length L. Signal photocurrents $I_N$ and $I_F$ output from terminals NCH and FCH of the PSD 408 are detected by the distance measuring unit, thus obtaining an object distance.

This distance measuring unit comprises the light-emitting circuit 402 for radiating optical pulses on an object to be photographed (object to be subjected to distance measurement), a preamplifier circuit 409 for receiving light reflected by the object and detecting a signal pulse photocurrent component, a distance measuring operation circuit 410 for obtaining distance information about the object from the detected photocurrent, an integration reset/inverse integration circuit 411 for A/D-converting the operation output from the distance measuring operation circuit 10, a light amount detecting circuit 412 for detecting the reflected light amount itself, a $B_V/\infty$ limiter circuit 413 for setting the distance measurement output to infinity (∞) when the brightness of an object is high or the object distance is too long, and a current type D/A converter 414 for setting the comparison level of the $B_V/\infty$ limiter circuit 413 by using a digital value from the CPU 1. This distance measuring unit is formed on one substrate A to have a CMOS device.

Each constituent circuit will be described in detail blow.

Figure 7:
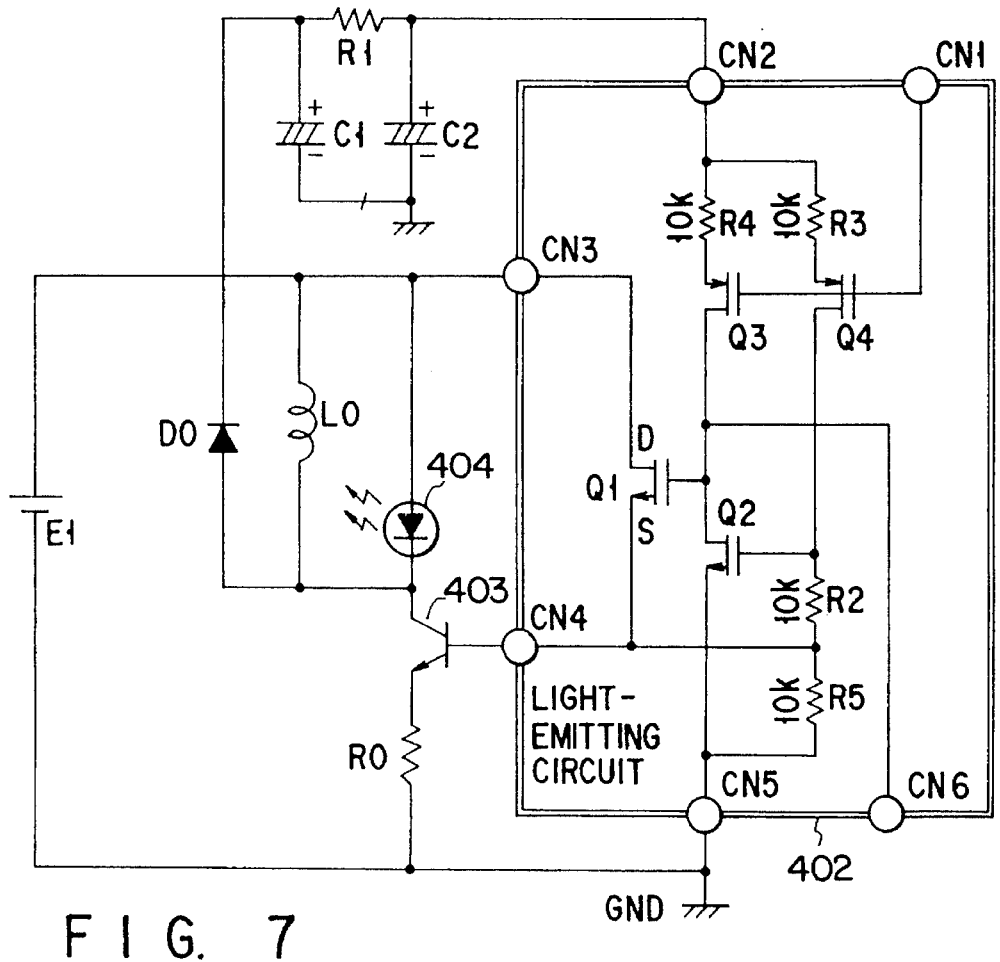
FIG. 7 is a circuit diagram showing the detailed arrangement of a light-emitting circuit in FIG. 6.

In the light-emitting circuit 402 shown in FIG. 7, the IRED 404 is driven by the external power transistor 3. The external power transistor 403 is ON/OFF-controlled by ON/OFF-controlling the NMOS transistor $Q_1$ in the light-emitting circuit 402. The NMOS transistor $Q_1$ is ON/OFF-controlled by ON/OFF-controlling the control terminal $T_1$ of the CPU 1. In this case, the control terminal $T_1$ has an open drain configuration.

The drain current of the NMOS transistor $Q_1$ is generally about 20 mA. For this reason, power for the drain current cannot be supplied to the NMOS transistor $Q_1$ from the same power supply source as that for a measuring circuit and a control circuit. This is because this drain current is large as a current load, and its ON/OFF operation causes a great variation in power supply source, adversely affecting the measurement/control system. In this embodiment, therefore, a drain terminal $CN_3$ of the NMOS transistor $Q_1$ is directly connected to an output terminal of a battery E1 so as to isolate the transistor from a power supply ($V_{CC2}$) for the measurement/control system (to be described later).

With this arrangement, a power supply source having no influence on the measurement/control system can be obtained.

PMOS transistors $Q_3$ and $Q_4$ in FIG. 7 are outputs of a reference current circuit in a chip enable circuit 15 (to be described later) and serve as a current source of $V_7 \ln 7$ (V)/5 (k$\Omega$), i.e., about 10 µA. Therefore, the voltage drop across a resistor $R_2$ is about 100 mV. A resistor $R_5$ is a shunt resistor which is generally used to shunt the external power transistor 403.

When the NMOS transistor $Q_1$ is turned on, a current of about 20 mA flows into the base of the external power transistor 403 to be multiplied by the DC amplification factor of the transistor 403, and the resultant current flows in a resistor $R_0$ and the IRED 4. At this time, if the sum of a voltage drop $V_{R0}$ across the resistor $R_0$, a base-emitter voltage $V_{BE}$ of the power transistor 403, and a voltage drop $V_{R2}$ across the resistor $R_2$ exceeds a voltage $V_t$ of an NMOS transistor $Q_2$, the NMOS transistor $Q_2$ is turned on to discharge the drain current of the PMOS transistor $Q_3$ to the ground GND. As a result, the gate potential of the NMOS transistor $Q_1$ decreases, and the source current of the NMOS transistor $Q_1$ decreases, thus reducing currents flowing in the external power transistor 403 and resistor $R_0$. With this negative feedback circuit configuration, a state represented by the following equation is stabilized:

$$V_{R0} + V_{BE} + V_{R2} = V_t$$

Therefore, a current presented by $V_{R0}/R_0$ flows in the IRED 4.

In the above-described manner, the constant-current drive operation of the IRED 404 is executed by the light-emitting circuit 402.

Figure 8:
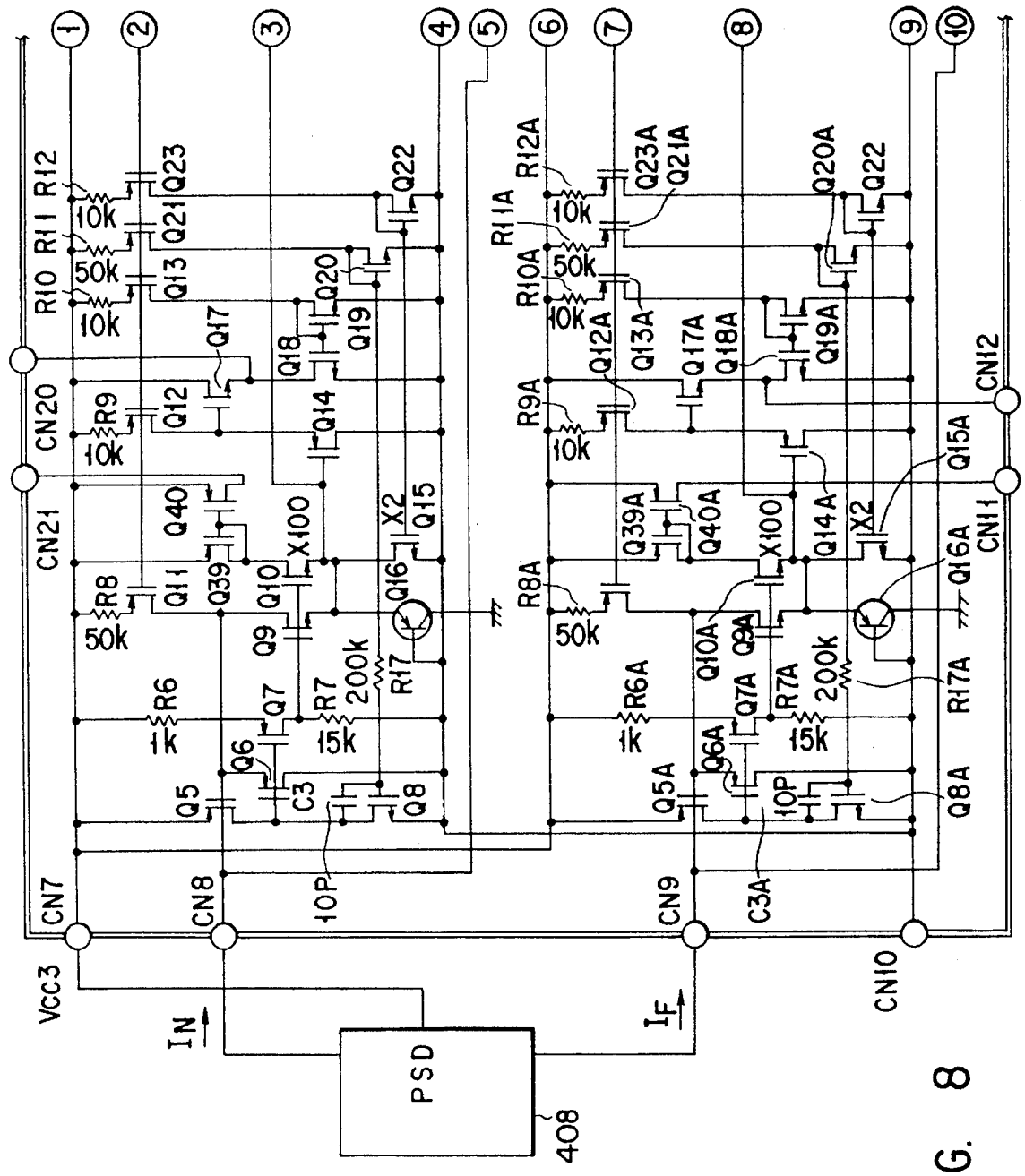
FIG. 8 is a circuit diagram showing the detailed arrangement of a preamplifier circuit in FIG. 6.
Figure 9:
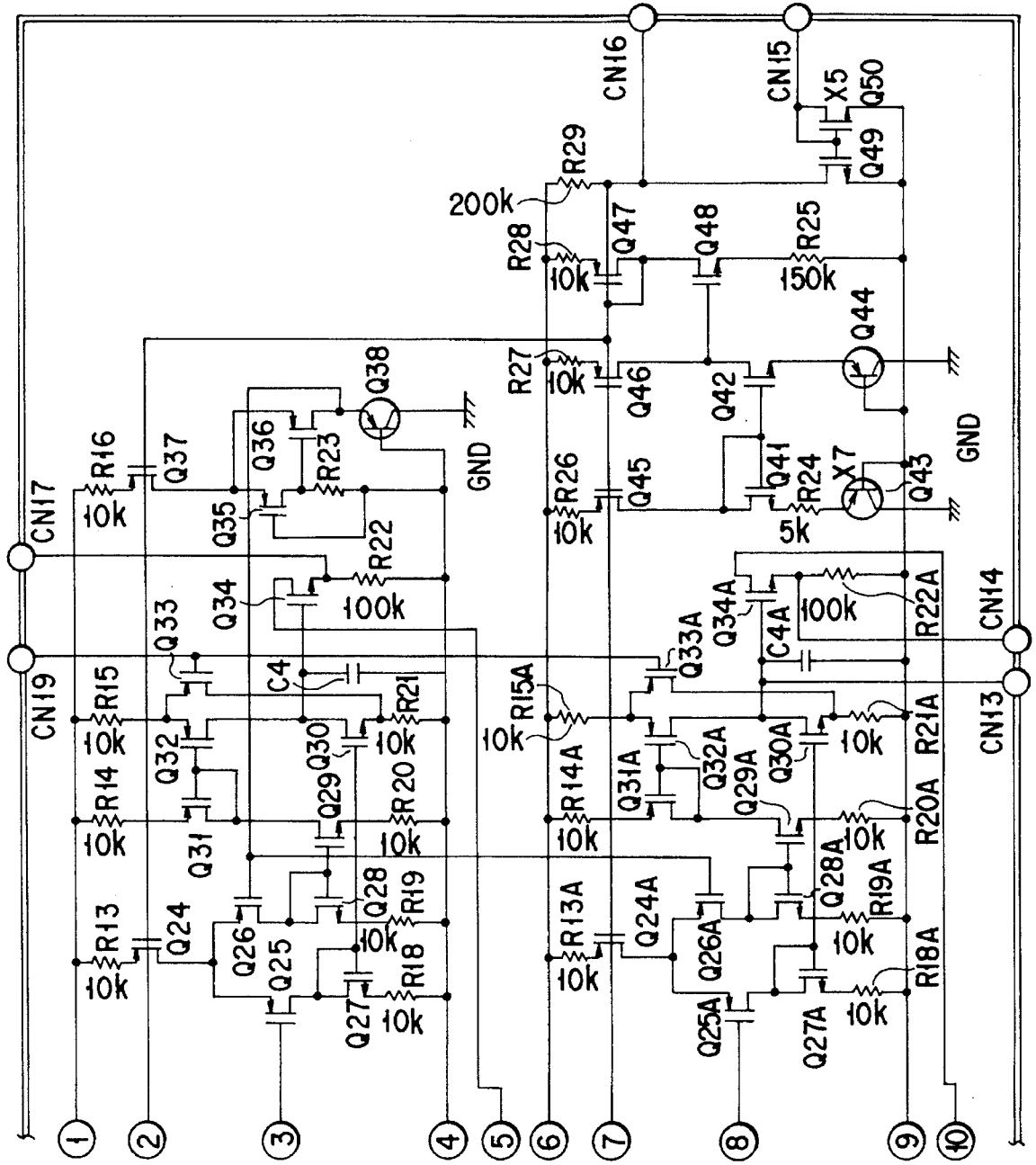
FIG. 9 is a circuit diagram showing part of the detailed arrangement of the preamplifier circuit in FIG. 6.

The preamplifier circuit 409 shown in FIGS. 8 and 9 will be described next.

In the preamplifier circuit 409, a 2-µA constant-current source is constituted by NMOS transistors $Q_9$ and $Q_{10}$ constituting a current mirror circuit for multiplying a photocurrent, a parasitic bipolar transistor $Q_{16}$ in a CMOS structure having a p-type substrate, a 2-µA constant current source constituted by a resistor $R_8$ and a PMOS transistor $Q_{11}$, and a 2-µA constant-current source constituted by a resistor $R_{11}$, a PMOS transistor $Q_{21}$, and NMOS transistor $Q_{20}$, a resistor $R_{17}$, and an NMOS transistor $Q_8$.

The preamplifier circuit 409 further includes a 2-µA constant-current source constituted by a resistor $R_{12}$, a PMOS transistor $Q_{23}$, and an NMOS transistors $Q_{22}$ and $Q_{15}$, and a photocurrent detecting circuit for detecting the photocurrent $I_N$ from the PSD 408, which circuit is constituted by a PMOS transistor $Q_5$, resistors $R_6$ and $R_7$, a PMOS transistor $Q_7$, and PMOS transistors $Q_{39}$ and $Q_{40}$ constituting a PMOS current mirror circuit. Note that "A" is affixed to each of the reference symbols of the circuit elements, of a photocurrent detecting circuit for detecting the photocurrent $I_F$ from the PSD 8, which correspond to the above-described circuit elements, and a repetitive description will be omitted.

Two source followers ("A" is affixed to each of the reference symbols of the circuit elements, of one source follower, which correspond to the circuit elements of the other source follower, and a repetitive description will be omitted) for transferring the emitter potential of the parasitic PNP bipolar transistor $Q_{16}$ to the next stage are constituted by resistors $R_9$ and $R_{10}$, PMOS transistors $Q_{12}$, $Q_{13}$, and $Q_{14}$, and NMOS transistors $Q_{17}$, $Q_{18}$, and $Q_{19}$.

Two background photocurrent removing circuits ("A" is affixed to each of the reference symbols of the circuit elements, of one circuit, which correspond to the circuit elements of the other circuit, and a repetitive description will be omitted) comprise operational amplifiers constituted by PMOS transistors $Q_{24}$, $Q_{25}$, $Q_{26}$, $Q_{31}$, $Q_{32}$, and $Q_{33}$ NMOS transistors $Q_{27}$, $Q_{28}$, $Q_{29}$, $Q_{30}$, and $Q_{34}$, and resistors $R_{13}$, $R_{14}$, $R_{15}$, $R_{18}$, $R_{19}$, $R_{20}$, $R_{21}$, and $R_{22}$, and a hold capacitor $C_4$ for holding a voltage value equivalent to a background photocurrent.

Furthermore, a comparison reference voltage circuit is constituted by a resistor $R_{16}$ for setting the background light removal level, PMOS transistors $Q_{37}$, $Q_{35}$, and $Q_{36}$, a resistor $R_{23}$, and a parasitic PNP bipolar transistor $Q_{38}$, and a reference current circuit is constituted by resistors $R_{26}$, $R_{27}$, $R_{28}$, and $R_{29}$, PMOS transistors $Q_{45}$, $Q_{46}$, and $Q_{47}$, NMOS transistors $Q_{41}$, $Q_{42}$, $Q_{42}$, $Q_{48}$, $Q_{49}$, and $Q_{50}$, resistors $R_{25}$ and $R_{24}$, and parasitic bipolar transistors $Q_{43}$ and $Q_{44}$ in a CMOS device.

The operation of the preamplifier circuit 409 will be described next.

In this preamplifier circuit 409, a power supply ($V_{CC3}$) line is fixed to a predetermined voltage (=1.9 V) via a node CN7. In general, the early voltage of a MOS transistor is about 5 to 20 V, and the early voltage of a bipolar transistor is about 50 to 100 V. For this reason, a MOS transistor integrated circuit is weaker with respect to power supply source voltage variations than a bipolar integrated circuit by about 1/5 to 1/10. This may pose no problem in a digital circuit but poses a serious problem in an analog circuit such as a distance measuring circuit for detecting a small signal with a high precision.

In general, an early voltage $V_A$ of a MOS transistor is expressed by $$V_A = L_{\mathit{eff}} \left( \frac{dX_d}{dX_{VS}} \right)^{-1}$$

where $L_{\mathit{eff}} = L - X_d$
where L is the channel length, $X_d$ is the depletion layer width, and $L_{\mathit{eff}}$ is the effective channel width. That is, the early voltage $V_A$ is determined by the channel length. Therefore, the early voltage of the MOS transistor can be set to be almost equal to that of a bipolar transistor by setting the effective channel length $L_{\mathit{eff}}$ to be about 10 µm.

The effective channel length $L_{\mathit{eff}}$ is generally set to be about 1 µm in a digital circuit. Therefore, an element performance equivalent to that of a bipolar transistor may be obtained at the cost of the merit of a MOS transistor 50 that a high packing density can be achieved.

For the above reason, in order to provide that a MOS-analog IC which ensures a high integration degree, is free from the influence of an early voltage, and can be operated at a low voltage, the voltage of a small signal detecting circuit is fixed to a predetermined voltage value to realize a distance measuring circuit which is not easily influenced by power supply source voltage variations. The present invention is not limited to this method. For example, since the channel length L can be arbitrarily set in a CMOS device, the channel length L of an element at a portion where the early voltage is effective may be set to be large, and the channel length L of an element at a portion where the early voltage is not effective much may be set to be small, thereby setting a proper circuit size.

When a voltage $V_{CC3}$ is applied to the node CN7, and a current is injected into a node CN15, the reference current circuit operates. The reference current circuit operates such that the source voltages of the NMOS transistors $Q_{41}$ and $Q_{42}$ become equal to each other, and their drain currents also become equal to each other. Letting $I_D$ be the drain current, $$R_{24} \cdot I_D + V_T \ln \frac{\frac{I_D}{7}}{I_S} = V_T \ln \frac{I_D}{I_S}$$

$$\therefore I_D = \frac{1}{R_{24}} V_T \ln 7 \approx 10 \mu A$$

This drain current flows, as a source current, in the transistors $Q_{45}$ and $Q_{46}$ and the transistors $Q_{12}$, $Q_{13}$, $Q_{24}$, $Q_{37}$, $Q_{23}$, $Q_{12A}$, $Q_{13A}$, $Q_{24A}$, and $Q_{23A}$ which constitute a current mirror. As a result, the operation of the overall preamplifier circuit 409 is started.

Since the drain resistance of the PMOS transistors $Q_{11}$, $Q_{21}$, $Q_{11A}$, and $Q_{21A}$ is 50 k$\Omega$ which is twice that of PMOS transistors $Q_{12}$, $Q_{13}$, $Q_{23}$, $Q_{12A}$, $Q_{13A}$, and $Q_{23A}$, the drain current of the former transistor group is ⅕ that of the latter transistor group, i.e., 2 $\mu$A.

In the above-described manner, the bias current is supplied to the preamplifier circuit 409.

The photocurrent detecting circuit portion is a feedback circuit having the gate of the PMOS transistor $Q_5$ as an input terminal. A gate voltage variation in the PMOS transistor $Q_5$ is amplified thereby to become a source voltage variation in the PMOS transistor $Q_5$.

The source voltage of the PMOS transistor $Q_5$ is applied to the gate of the PMOS transistor $Q_7$ to be inverted/multiplied by $R_7/R_6$. The resultant voltage is applied to the gate of the PMOS transistor $Q_9$. The drain of the PMOS transistor $Q_9$ is connected to the gate of the PMOS transistor $Q_5$ to operate and reduce the gate voltage variation in the PMOS transistor $Q_5$.

As a result, this photocurrent detecting circuit serves as a negative feedback circuit for holding the gate-source voltage of the PMOS transistor $Q_5$ to a predetermined value. When the signal pulse current $I_N$ from the PSD 408 is input to the gate of the PMOS transistor $Q_5$, all the current $I_N$ is received as the drain current of the PMOS transistor $Q_9$. Since the PMOS transistor $Q_9$ constitutes a ×100 current mirror circuit together with the PMOS transistor $Q_{10}$, a current represented by $101 \cdot I_N$ flows into the parasitic PNP bipolar transistor $Q_{16}$. In addition, a current represented by $100 \times I_N$ (drain current of the transistor $Q_{15}$) is output from a node CN21. The emitter potential of the parasitic PNP bipolar transistor $Q_{16}$ is transferred from a node CN20 to the distance measuring operation circuit 10 on the next stage via the source follower constituted by the PMOS transistor $Q_{14}$ and the NMOS transistor $Q_{17}$.

The emitter potential of the parasitic PNP bipolar transistor $Q_{16}$ is represented by $$V_T \ln \left( \frac{101 \times I_N}{I_S} \right)$$

The output terminal of the operational amplifier constituting the background photocurrent removing circuit is connected to the capacitor $C_4$ and the gate of the NMOS transistor $Q_{34}$ for extracting a photocurrent.

When an output signal from a terminal $T_8$ of the CPU 1 as the control circuit portion is set at "H" level during a non-emission period, the PMOS transistor $Q_{33}$ is turned off, and the operational amplifier operates such that an imaginary short circuit occurs between the inverting terminal (the gate of the PMOS transistor $Q_{26}$) and noninverting terminal (the gate of the transistor $Q_{25}$) of the operational amplifier. Charges corresponding to a waveform photocurrent in the non-emission period and a constant current generated by the PMOS transistor $Q_{11}$ are then stored in the capacitor $C_4$. As a result, the above-mentioned current flows, as the drain current of the NMOS transistor $Q_{34}$, to the ground GND side.

The potential of the inverting terminal of the above operational amplifier is a base-emitter voltage $V_{BE(ref)}$ of the parasitic PNP bipolar transistor $Q_{38}$. This parasitic PNP bipolar transistor $Q_{38}$ is similar to the parasitic PNP bipolar transistors $Q_{16}$ and $Q_{16A}$, and is set to have the same shape as that thereof in this case.

A current $I_{ref}$ flowing between the base and emitter of the parasitic PNP bipolar transistor $Q_{38}$ is supplied as the drain current of the PMOS transistor $Q_{36}$, and is set to be about 10 mA with the circuit configuration constituted by the PMOS transistors $Q_{35}$ and $Q_{36}$ and the resistors $R_{23}$, $R_{37}$, and $R_{16}$.

This set value may be set with reference to 1/10 or less of the minimum value of an input signal current as a criterion in terms of an input value. Therefore, the base-emitter voltage $V_{BE(ref)}$ of the parasitic PNP bipolar transistor $Q_{38}$ is given by:

$$\begin{aligned} V_{BE(ref)} &= V_T \ln \left( \frac{I_{ref}}{I_S} \right) \\ &\approx 26 \text{ mV} \times \ln \left( \frac{10 \times 10^{-9}}{1 \times 10^{-6}} \right) \\ &\approx 480 \text{ mV} \end{aligned}$$

When the imaginary short circuit is caused, since a voltage $V_{BE}(Q_{16})$ of the parasitic PNP bipolar transistor $Q_{16}$ becomes equal to the voltage $V_{BE(ref)}$, the emitter current flowing in the parasitic PNP bipolar transistor $Q_{16}$ becomes equal to the current $I_{ref}$. At this time, the current flowing in the NMOS transistor $Q_1$ of the light-emitting circuit 2 is 1/101 of the source current (20 $\mu$A) of the NMOS transistor $Q_{15}$, and hence is about 0.2 $\mu$A. This value is used as a bias current value for improving the pulse response characteristics of the current mirror multiplying circuit constituted by the NMOS transistors.

when an output from the terminal $T_8$ of the CPU 1 is set at "L" level to turn on the PMOS transistor $Q_{33}$ immediately before light emission, the voltages $V_{GS}$ of the PMOS transistors $Q_{32}$ and $Q_{30}$ decrease at the same time. As a result, the transistors $Q_{32}$ and $Q_{30}$ are turned off at once.

By using such a switching method of simultaneously switching the PMOS transistor $Q_{32}$ and the NMOS transistor $Q_{30}$ on the output stage to an OFF state, switching noise due to the turn-off delays of the NMOS and PMOS transistors can be eliminated, thereby allowing omission of the bias current source of the operational amplifier in the conventional system.

With this arrangement, a reduction in capacitance of the hold capacitor $C_4$, which cannot be achieved by the known switching method (Jpn. Pat. Appln. KOKAI Publication No. 4-339208), can be achieved. A reduction in capacitance of the hold capacitor is very important for the incorporation of the hold capacitor in the integrated circuit. Therefore, the above method of simultaneously turning off the PMOS and NMOS transistors on the output stage is of great significance.

The hold characteristics that a background photocurrent component and a constant current component generated by the PMOS transistor $Q_{11}$ are kept discharged by the hold capacitor $C_4$ are dependent on the capacitance of the hold capacitor $C_4$. In addition, the resistance to switching noise during a hold period (the magnitude of a voltage variation caused by switching noise) is dependent on the capacitance of the hold capacitor $C_4$.

In general, as a capacitor formed on an integrated circuit, a junction capacitor obtained by base diffusion or a capacitor obtained by sandwiching a silicon oxide film or a silicon nitride film between aluminum electrodes is used. Such a capacitor has a capacitance value of 2 fF/µm². That is, only a capacitor having a very small capacitance of several 10 pF can be formed in practice.

The integrated circuit of this embodiment, therefore, uses a large-capacitance capacitor for an integrated circuit, formed by using a ferroelectric thin film. A ferroelectric substance such as BST (barium strontium titanate) has a dielectric constant about 100 times as large as that of a silicon oxide film or a silicon nitride film which has been conventionally used. Even at present, a capacitor having a capacitance value of 32 fF/µm², which is 16 times as large as the capacitance value of a conventional capacitor, can be obtained.

A distance measurement output from a distance measuring unit is often adversely affected by external noise imposed on the hold capacitor. In many cases, the noise source is based on a small potential difference between the ground terminal GND of the background light removing circuit portion in the IC and the ground terminal GND of the hold capacitor mounted on the outside of the IC.

For this reason, the ground terminal GND for the IC of the distance measuring unit must be divided into two portions for the background light removing circuit portion and the other block, respectively, and the ground GND line needs to be made as thick as possible, so as not to have a common impedance. With this arrangement, the IC size increases. In addition, a lead frame for a ground GND pad formed for the background removing circuit is required as well as a lead frame for a hold capacitor connection pad, resulting in an increase in the number of IC pins and the size of an IC package. Furthermore, this structure becomes less resistant to other external noise components. For the above reasons, it is very important to form a hold capacitor in an IC. In addition, the mount area and cost of a hold capacitor itself interfere with a reduction in size and cost of a camera.

In consideration of the above points, according to this embodiment, a hold capacitor using a ferroelectric thin film is formed on an integrated circuit to improve the noise resistance of a distance measuring circuit and realize a reduction in size and cost of a distance measuring IC.

Figure 10:
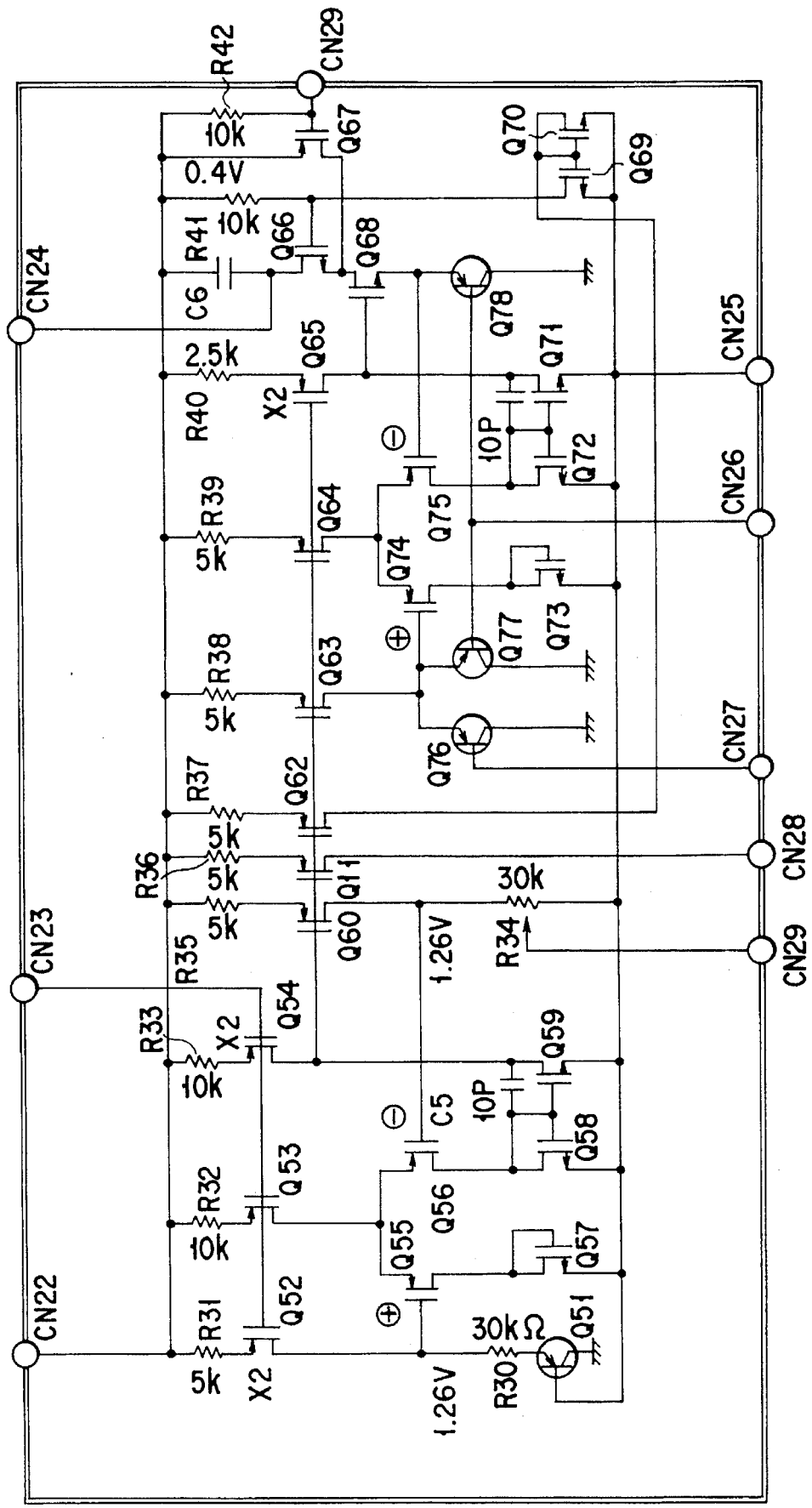
FIG. 10 is a circuit diagram showing the first arrangement of a distance measuring operation circuit in FIG. 6.
Figure 13A:
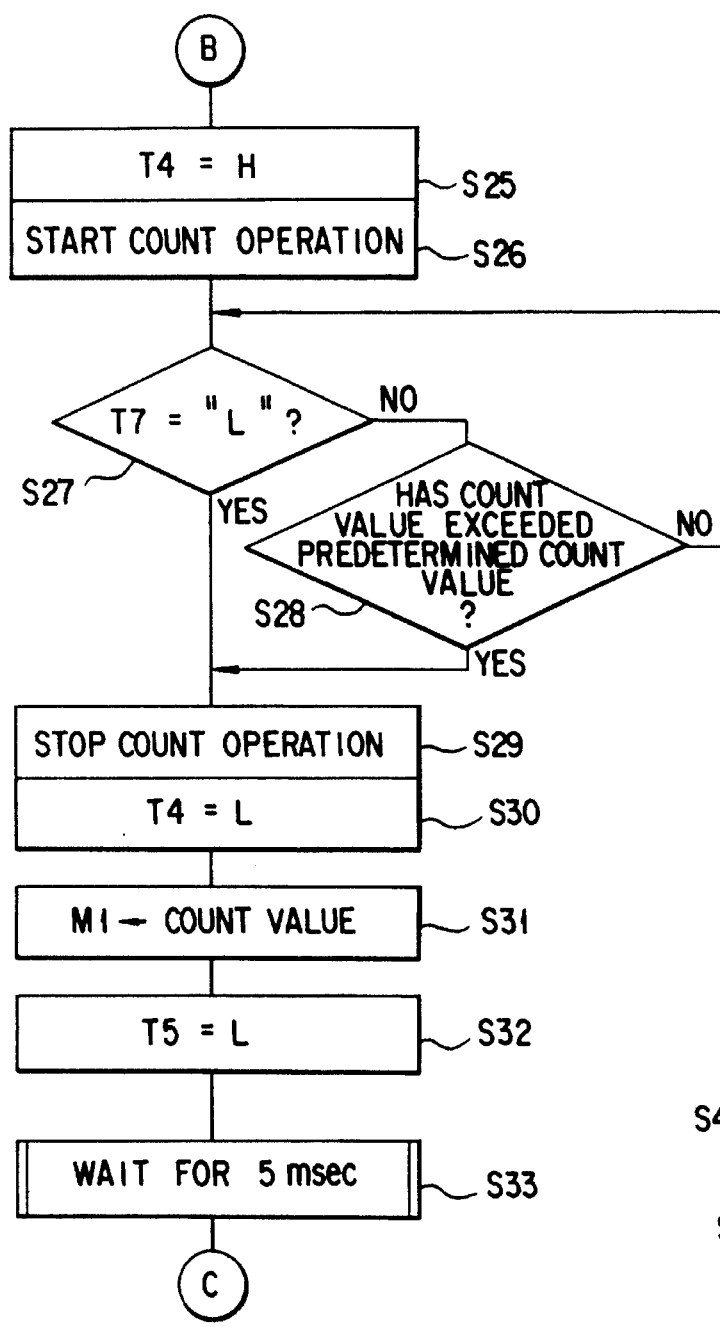
FIGS. 13A and 13B are flow charts showing the operation of the distance measuring unit according to the second embodiment.
Figure 13B:
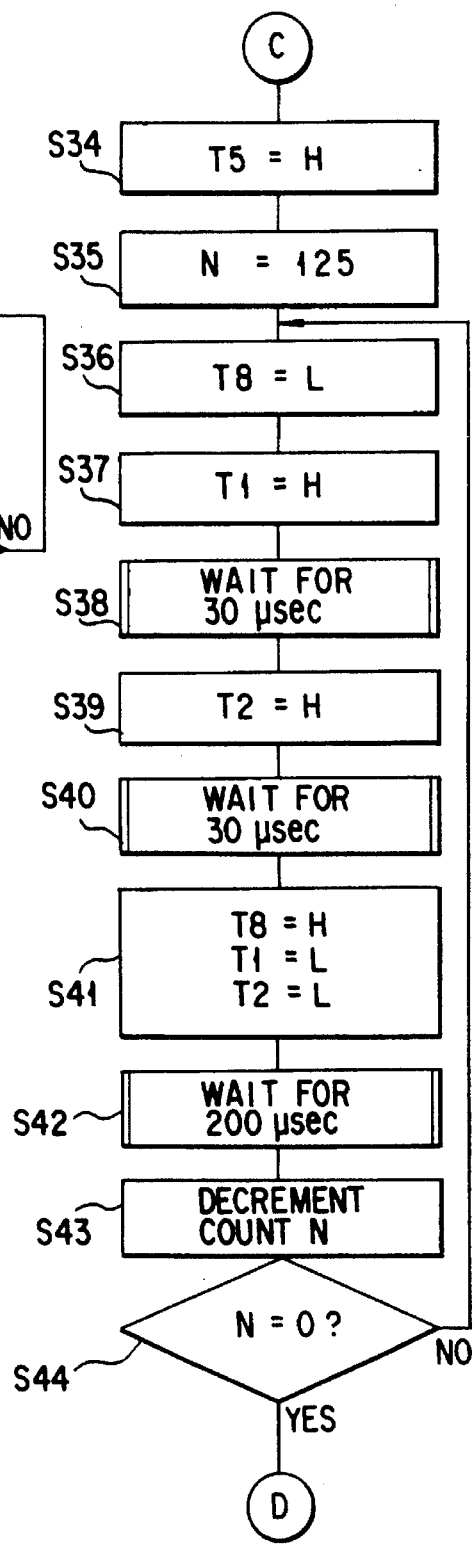
Figure 14:
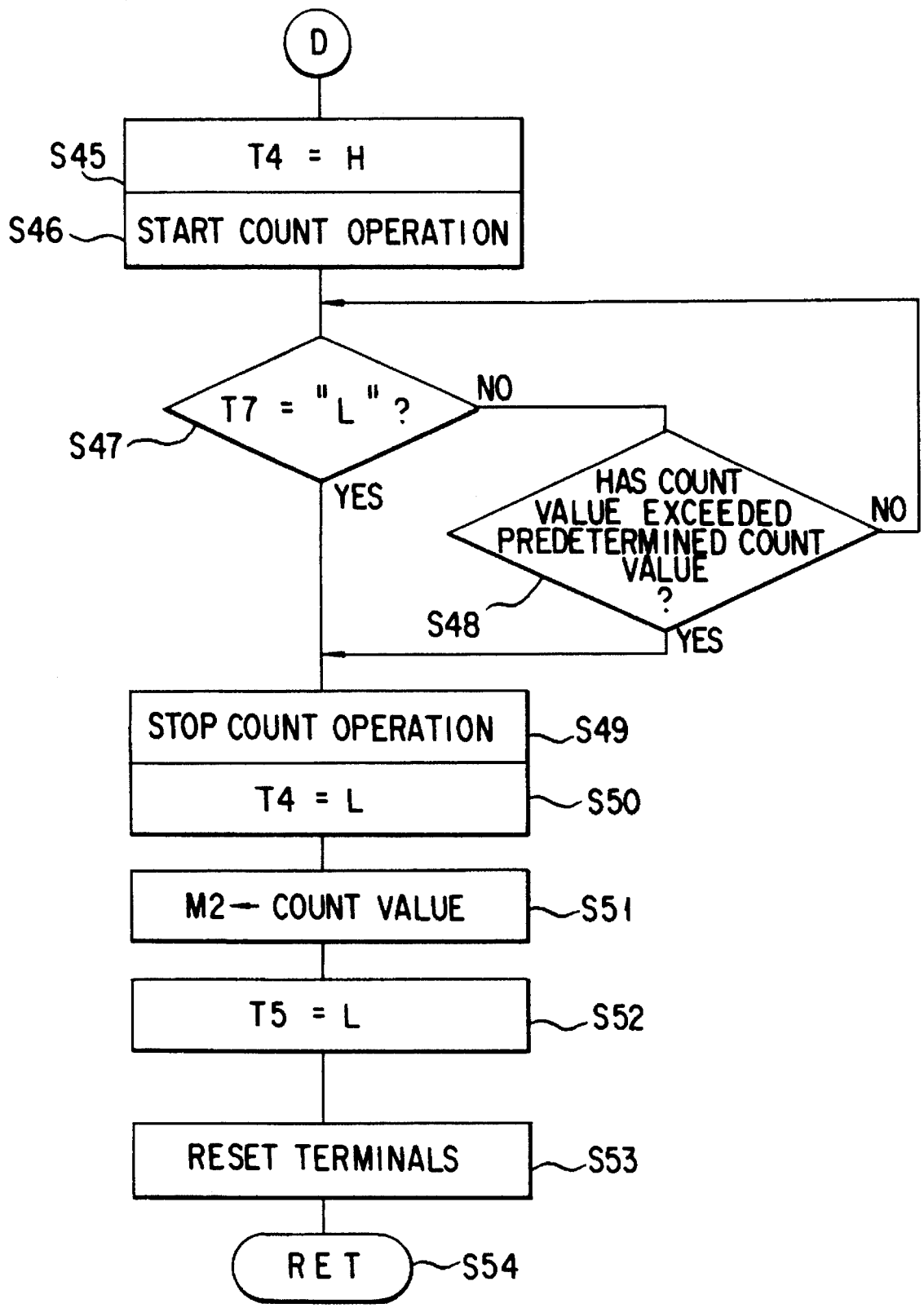
FIG. 14 is a flow chart showing the operation of the distance measuring unit according to the second embodiment.

The distance measuring operation circuit 410 shown in FIG. 10 comprises a reference current generating circuit portion, a logarithmic expansion circuit portion, an emitter current detecting circuit portion, and an integration switch circuit portion. The reference current generating circuit portion includes an operational amplifier constituted by PMOS transistors $Q_{55}$ and $Q_{56}$ and a constant-current source consisting of NMOS transistor NMOS transistors $Q_{57}$, $Q_{58}$, and $Q_{59}$, resistors $R_{32}$ and $R_{33}$ and PMOS transistors $Q_{53}$ and $Q_{54}$, which amplifier has the gate of the transistor $Q_{55}$ as a noninverting input terminal, and the gate of the transistor $Q_{56}$ as an inverting input terminal, a current mirror circuit constituted by resistors $R_{35}$, $R_{36}$, $R_{37}$, $R_{38}$, $R_{39}$, and $R_{40}$, and PMOS transistors $Q_{60}$, $Q_{61}$, $Q_{62}$, $Q_{63}$, $Q_{64}$, and $Q_{65}$, a constant-current source constituted by a resistor $R_{31}$ and a PMOS transistor $Q_{52}$, a band gap reference voltage (1.26 V) circuit constituted by a resistor $R_{30}$ and a parasitic PNP bipolar transistor $Q_{51}$, and a reference current setting resistor $R_{34}$. The logarithmic expansion circuit portion is constituted by a constant-current source consisting of a resistor $R_{38}$ and a PMOS transistor $Q_{63}$, and parasitic PNP bipolar transistors $Q_{76}$ and $Q_{77}$. The emitter current detecting circuit portion includes an operational amplifier constituted by a constant-current source consisting of the resistor $R_{39}$ and the PMOS transistor $Q_{64}$, a constant-current source consisting of the resistor $R_{40}$ and the PMOS transistor $Q_{65}$, PMOS transistors $Q_{74}$ and $Q_{75}$, and NMOS transistors $Q_{73}$, $Q_{72}$, $Q_{71}$, and $Q_{68}$, which amplifier has the gate of the PMOS transistor $Q_{74}$ as a noninverting input terminal, and the gate of the PMOS transistor $Q_{75}$ as an inverting input terminal, and a parasitic PNP bipolar transistor $Q_{78}$. The integration switch circuit portion is constituted by an NMOS transistor $Q_{66}$, a PMOS transistor $Q_{67}$, resistors $R_{41}$ and $R_{42}$, NMOS transistors $Q_{69}$, $Q_{70}$, and $Q_{62}$, and the resistor $R_{37}$ and designed to determine whether to integrate an output current value from the emitter current detecting circuit portion.

The source follower outputs from the preamplifier circuit 409 are respectively connected to the bases of the parasitic PNP bipolar transistors $Q_{76}$ and $Q_{77}$ of the logarithmic expansion circuit portion (CN27←CN20, CN26←CN12).

Letting $I_{76}$ and $I_{77}$ be the emitter currents of the parasitic PNP bipolar transistors $Q_{76}$ and $Q_{77}$ and $I_{63}$ be the source current of the PMOS transistor $Q_{63}$, $$I_{76}+I_{77}=I_{63}$$

According to the emitter potentials of the parasitic PNP bipolar transistors $Q_{76}$ and $Q_{77}$, $$V_{BE16}+V_{BE76}=V_{BE16A}+V_{BE77}$$

where $V_{BE16}$ is the emitter potential of the NMOS transistor $Q_{16}$, $V_{BE16A}$ is the emitter potential of the NMOS transistor $Q_{16A}$, $V_{BE76}$ is the emitter potential of the parasitic PNP bipolar transistor $Q_{76}$, and $V_{BE77}$ is the emitter potential of the parasitic PNP bipolar transistor $Q_{77}$. Therefore, $$V_{BE16}-V_{BE16A}=V_{BE77}-V_{BE76}$$

In this case, during an emission period, $$V_{BE16} = V_T \ln\left(\frac{I_N}{I_S}\right)$$

$$V_{BE16} = V_T \ln\left(\frac{I_F}{I_S}\right)$$

The above equations can be modified as follows:

$$V_T\ln\left(\frac{I_N}{I_S}\right) - V_T\ln\left(\frac{I_F}{I_S}\right) = V_T\ln\left(\frac{I_{77}}{I_S}\right) - V_T\ln\left(\frac{I_{76}}{I_S}\right)$$

Therefore, $$\frac{I_N}{I_F} = \frac{I_{77}}{I_{76}}$$

$$\therefore I_{77} = \frac{I_N}{I_F} \cdot I_{76} = \frac{I_N}{I_F}(I_{63} - I_{77})$$

$$\therefore I_{77} = \frac{I_F}{I_N+I_F} \cdot \frac{I_N}{I_F} \cdot I_{63} = \frac{I_N}{I_N+I_F} I_{63}$$

When the operational amplifier of the emitter current detecting circuit portion is operated, an imaginary short circuit is caused between the gate voltage (noninverting input terminal) of the PMOS transistor $Q_{74}$ and the gate voltage (inverting input terminal) of the PMOS transistor $Q_{75}$. As a result, the emitter potential of the parasitic PNP bipolar transistor $Q_{77}$ becomes equal to that of the transistor $Q_{78}$. In addition, since the parasitic PNP bipolar transistors $Q_{78}$ and $Q_{77}$ have the common base, the base-emitter voltages of the transistors $Q_{77}$ and $Q_{78}$ become equal to each other. Consequently, the emitter currents of the parasitic PNP bipolar transistors $Q_{77}$ and $Q_{78}$ become equal to each other.

The emitter current of the parasitic PNP bipolar transistor $Q_{78}$ is supplied, as a drain (source) current, to the NMOS transistor $Q_{68}$.

When a control terminal $T_6$ of the CPU 1 set at "H" level in synchronism with light emission, the MOS transistor (switch) $Q_{66}$ is turned on, and the distance measurement operation current $I_{EN}$ given by $$I_{EN} = \frac{I_N}{I_N + I_F} \cdot I_{63}$$

is charged into the integral capacitor $C_6$.

The MOS switch $Q_{66}$ is ON during an emission period, and OFF during a non-emission period, so that the distance measurement operation current is integrated.

The $B_V/\infty$ limiter circuit 413 will be described next. The $B_V/\infty$ limiter circuit 413 serves to permit/inhibit integration of the above-mentioned distance measurement operation current. The $B_V/\infty$ limiter circuit 413 inhibits integration of a distance measurement operation output when the brightness of an object is too high or a signal photocurrent is too small to perform a proper distance measurement operation. The signal light level as the limit of distance measurement integration is determined by the noise level of a distance measuring system including a sensor.

FIG. 11 is a timing chart showing the operation of this embodiment. FIGS. 12A to 14 are flow charts showing a program stored in the CPU 1 and designed to realize the timing chart in FIG. 11.

The operation will be described in detail below with reference to the timing chart and the flow charts.

Terminal reset processing is performed first, as indicated by Table 1 (step S1).

TABLE 1

| | |
|---|---|
| $T_1$ | L |
| $T_2$ | L |
| $T_3$ | L |
| $T_4$ | L |
| $T_5$ | L |
| $T_6$ | L |
| $T_7$ | L |
| $T_8$ | H |

A signal from the terminal $T_3$ of the CPU 1 is changed from "L" level to "H" level to supply power to each constituent circuit (step S2). The flow then waits for 10 msec during which each circuit is stabilized (step S3).

A count N is set to "5" (step S4). A signal from the terminal $T_8$ of the CPU 1 is changed from "H" level to "L" level to set the background light hold mode (step S5). A signal from the terminal $T_1$ is changed from "L" level to "H" level to cause the IRED 4 to emit light. In addition, an inductor $L_0$ is energized to store electric energy (step S6), while the flow waits for 60 μsec (step S7).

Subsequently, a signal from the terminal $T_8$ is changed from "L" level to "H" level to cancel the background light hold mode, and a signal from the terminal $T_1$ is changed from "H" level to "L" level (step S8) to stop the emission of the IRED 4 and also stop energizing the inductor $L_0$. The energy stored in the inductor $L_0$ at this time is applied, as a flyback voltage, to a capacitor $C_1$ via a diode $D_0$ or to a capacitor $C_2$ via a resistor $R_1$, thus boosting/charging the capacitor $C_1$ or $C_2$.

The count N is decremented (step S9). It is then checked whether the count N is "0" (step S10). With this operation, boosting is repeated a predetermined number of times (for a predetermined period of time). As a result, the voltage of the capacitor $C_2$ is boosted to such an extent that the low voltage source $V_{CC3}$ for the distance measuring circuit can be held, as shown in FIG. 11.

When boosting is performed the predetermined number of times (YES), the CPU 1 sets a digital value as the ∞ limiter level of the distance measuring unit, which is read from an EEPROM (not shown), in the current type D/A converter 414, and the ∞ limiter level is set by the output current from the current type D/A converter 414 (step S11).

Prior to distance measurement, the CPU 1 A/D-converts an output from the temperature measuring circuit 10 (FIG. 1) formed on the same chip as that of the distance measuring circuit and designed to measure the temperature of the distance measuring unit (circuit board) itself, and stores data indicating the temperature of the circuit board itself, measured in a distance measuring operation, in a storage means such as a RAM in the CPU 1 (step S12). This processing routine may be performed after the distance measuring operation is completed. That is, since the circuit board temperature greatly changes depending on whether other circuits formed on the same board are operated (according to the camera sequence), the temperature of the distance measuring unit in operation must be recognized.

After the flow waits for 10 msec during which the distance measuring unit is stabilized (step S13), a signal from the terminal $T_5$ of the CPU 1 is changed from "L" level to "H" level to cancel the integration reset mode (step S14). With this operation, a distance measurement operation output power supply can charge the integral capacitor $C_6$.

The distance measurement count N is set to "125" (step S15), and the terminal $T_8$ is changed from "H" level to "L" level to set the background light hold mode (step S16). A signal from the terminal $T_1$ is changed from "L" level to "H" level to set the light emission mode (step S17), and the flow waits for 30 μsec (step S18). Thereafter, a signal from the terminal $T_6$ is changed from "L" level to "H" level to set the integration mode (step S19). While the potential of the terminal $T_6$ is at "H" level, a distance measurement operation output is integrated.

The flow waits for 30 μsec (step S20). Thereafter, a signal from the terminal $T_8$ is set at "H" level; a signal from the terminal $T_1$, at "L" level; and a signal from the terminal $T_6$, at "L" level (step S21). With this operation, the background light hold mode is canceled, and a feedback loop for bypassing a background photocurrent can be operated. As a result, the background photocurrent is kept discharged to the GND in accordance with changes in background light.

The light emission and the distance measurement integration are then stopped, and the flow waits for 200 μsec (step S22). Thereafter, the count N is decremented (step S23).

It is checked whether the count N becomes 0 (step S24). If NO in step S24, the flow returns to step S16. If YES in step S24, the flow advances to step S25 in FIG. 13A.

A signal from the terminal $T_4$ is changed from "L" level to "H" level to start inverse integration (step S25), and a count operation is started (step S26).

It is then checked whether a signal from the terminal $T_7$ is at "L" level (step S27). If NO in step S27, it is checked whether the count value exceeds a count limit (step S28). If the potential of the terminal $T_7$ is at "L" level, or the count value exceeds the count limit (YES in step S28), the counter is stopped (step S29).

Subsequently, a signal from the terminal $T_4$ is set at "L" level to stop the inverse integration (step S30). The count value is stored in a memory $M_1$ (step S31). A signal from the terminal $T_5$ is set at "L" level to reset the integral capacitor $C_6$ (step S32), and the flow waits for 5 msec (step S33).

The signal from the terminal $T_5$ is then set at "H" level to cancel the integration reset mode. The light emission count N is set to "125" (step S35). The potential of the terminal $T_8$ is set at "L" level to set the background light hold mode (step S36). A signal from the terminal $T_1$ is set at "H" level to set the light emission mode (step S37).

The flow waits for 30 μsec (step S38). A signal from the terminal $T_2$ is set at "H" level to set the light amount integration mode (step S39). In this case, an incident light amount component from the PSD is integrated while the potential of the terminal $T_2$ is at "H" level. After the flow waits for 30 μsec (step S40), a signal from the terminal $T_8$ is set at "H" level; a signal from the terminal $T_1$, at "L" level; and a signal from the terminal $T_2$, at "L" level, thereby canceling the background light hold mode and stopping the light emission and the light amount integration (step S41).

After the flow waits for 200 μsec (step S42), the light emission count N is decremented (step S43). Light emission is performed the number of times corresponding to the set count N. It is then checked whether the count N is "0" (step S44). If the count N is not "0" (NO), the flow returns to step S36. If the count N is "0" (YES), the flow advances to step S45 in FIG. 14. In step S45, a signal from the terminal $T_4$ is set at "H" level to start inverse integration and start a count operation (step S46).

It is checked whether the potential of the terminal $T_7$ is at "L" level (step S47). If the potential of the terminal $T_7$ is not at "L" level (NO), the flow waits until the count value exceeds the count limit value (step S48). If the potential of the terminal $T_7$ is set at "L" level or the count value exceeds the limit value (YES), the count operation is stopped (step S49).

A signal from the terminal $T_4$ is then set at "L" level to stop the inverse integration (step S50), and the count value is stored in a memory $M_2$ (step S51). A signal from the terminal $T_5$ is set at "L" level (step S52), and the signal from each terminal is reset (step S54). Thereafter, the flow returns to step S54.

In the above-described manner, a series of distance measuring operations are completed. As a result, the distance measurement operation (comparison operation) output is stored in the memory $M_1$, and data corresponding to the incident light amount is stored in the memory $M_2$.

Figure 15:
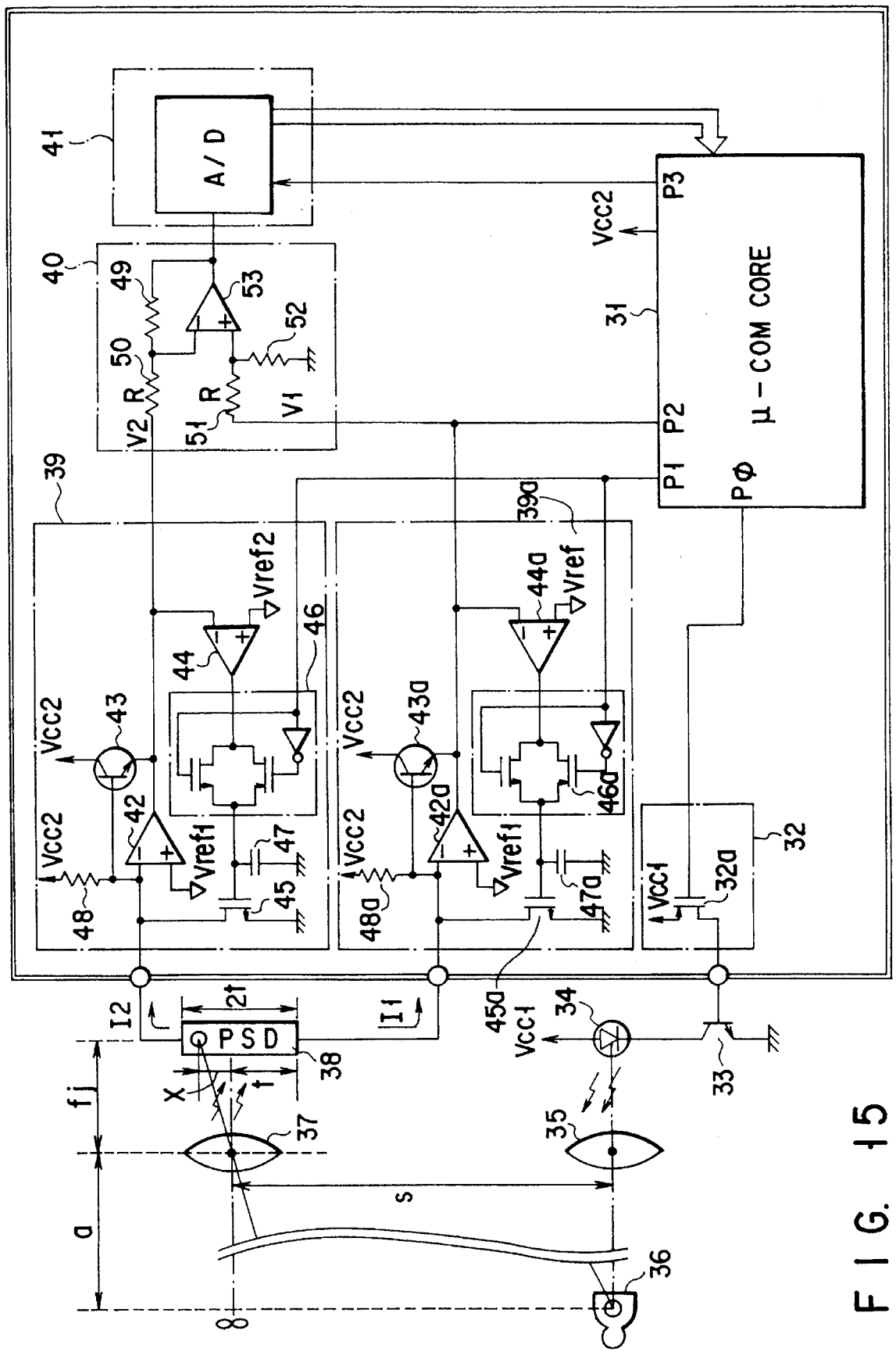
FIG. 15 is a circuit diagram showing the detailed arrangement of a distance measuring circuit using parasitic NPN bipolar transistors in a CMOS device according to the third embodiment of the present invention.

FIG. 15 shows the detailed arrangement of a distance measuring circuit block 4 using parasitic NPN bipolar transistors in a CMOS device as the second embodiment of the distance measuring unit.

Referring to FIG. 15, a PMOS transistor 32 of a light-emitting circuit portion is turned on by a light emission signal $P_0$ from a μ-com core 31, thus turning on an external power transistor 33. As a result, pulse light emitted from a light-emitting element (IRED) 34 is focused by a light-emitting lens 35 and is radiated onto an object 36 (to be photographed) located at an object distance a.

Light reflected by the object 36 is focused on a semiconductor position detecting element (to be referred to as a PSD hereinafter) 38, located at a focal distance fΩ, via a light-receiving lens 37 spaced apart from the light-emitting lens 35 by a baseline length S.

Signal photocurrents $I_1$ and $I_2$ output from the two terminals of the PSD 38 are detected by signal photocurrent detecting circuits 39 and 39a (to be described later).

As described above, the distance measuring unit block 4 comprises the light-emitting circuit 32 for radiating pulse light onto an object (subjected to distance measurement), the signal photocurrent detecting circuits 39 and 39a for receiving light reflected by the object and detecting/amplifying signal pulse photocurrent components, an operation circuit 40 for obtaining distance information of the object from the detected photocurrents, and a count circuit 41 for A/D-converting an output from the operation circuit 40. The signal photocurrent detecting circuits 39 and 39a use the same constituent members and have the same arrangement. Therefore, only the signal photocurrent detecting circuit 39 will be described below. Note that "a" is affixed to each of the reference symbols of the components, of the signal photocurrent detecting circuit 39a, which correspond to the components of the circuit 39, and a repetitive description will be omitted.

The IRED 34 of the light-emitting circuit is driven by the transistor 33. The external power transistor 33 is ON/OFF-controlled by a PMOS transistor 32a as the light-emitting circuit 32 arranged in the same chip as that of the μ-com core 31.

Note that since the PMOS transistor 32a requires a drive current of about 10 to 20 mA, it uses a power supply $V_{CC2}$ as a source power supply, which is a power system different from the system of a power supply $V_{CC1}$ for other circuit blocks including the μ-com core 31. As described above, at least two power systems, i.e., the power supply $V_{CC1}$ as the power system and the power supply $V_{CC2}$ as the stabilized power supply are arranged in the chip to prevent power supply variations during a large-current drive period from adversely affecting the measurement/control circuit block. In addition, the PMOS transistor 32a is ON/OFF-controlled by the control terminal $P_0$ of the μ-com core 31, and infrared radiation having a pulse waveform and emitted from the IRED 34 is ON/OFF-controlled by an output signal from the terminal $P_0$.

The signal photocurrent detecting circuit 39 comprises a preamplifier circuit constituted by a CMOS operational amplifier 42 and a parasitic NPN bipolar transistor 43 existing in a CMOS device and having a P-type well as a base, an $n^+$-type region in the p-type well as an emitter, and an $n^-$-type substrate as a collector, and a background light removing circuit constituted by a CMOS operational amplifier 44, an NMOS transistor 45, and their peripheral circuits.

The signal pulse current $I_2$ obtained from one channel of the PSD 38 is supplied to the operational amplifier 42 constituting the preamplifier circuit. In order to allow the operational amplifier 42 to receive feedback from the parasitic NPN bipolar transistor 43, the output terminal and inverting input terminal of the operational amplifier 42 are respectively connected to the emitter and base of the parasitic NPN bipolar transistor 43, and the noninverting input terminal of the operational amplifier 42 is connected to a reference power supply voltage $V_{ref1}$. With this arrangement, the base input resistance of the parasitic NPN bipolar transistor 43 is equivalently reduced to several kΩ.

The output terminal of the operational amplifier 44 constituting the background light removing circuit is connected to a capacitor 47 formed in the chip and the gate of the background extraction NMOS transistor 45 via a CMOS transmission gate 46. When a high-level "H" signal from the terminal $P_1$ of the μ-com core 31 as the control circuit portion is supplied to the transmission gate 46 during a non-emission period, the operational amplifier 44 operates such that its inverting input terminal is set to a reference power supply voltage $V_{ref2}$ upon an imaginary short circuit in accordance with the feedback loop constituted by the operational amplifier 42, the parasitic NPN bipolar transistor 43, the operational amplifier 44, the transmission gate 46, and the NMOS transistor 45. As a result, charges corresponding to background light at this time are stored in the capacitor 47, and only a background photocurrent component is extracted to the ground line by the NMOS transistor 45.

With the above feedback loop, the emitter potential $V_{BE}$ of the parasitic NPN bipolar transistor 43 is given by the following equation. The reference power supply voltages $V_{ref1}$ and $V_{ref2}$ are generally set such that the emitter potential $V_{BE}$ becomes close to 0.55 V.

$$V_{BE} = V_{ref1} - V_{ref2} \tag{1}$$

In this state, the emitter current must be set to be sufficiently smaller than a value βN times the minimum value of the obtained signal photocurrent $I_1$, thus suppressing errors in distance measurement to a low level. Note that if the emitter current is set to be too small, a problem is posed in terms of response characteristics. A technique of preventing such an inconvenience will be described later.

During an emission period, the transmission gate 46 is turned off, and hence the above feedback loop is broken. However, the NMOS transistor 45 keeps discharging a photocurrent corresponding to background light to the GND line owing to the charges stored in the capacitor 47. Therefore, only the pulse light component obtained by removing the photocurrent corresponding to the background light from the photocurrent obtained from one channel of the PSD 38 is multiplied by DN in the parasitic NPN bipolar transistor 43 and flows as an emitter current βN×$I_2$. The emitter current obtained at this time is expressed by the following formula:

$$V_{ref} - V_T \ln\left(\frac{\beta N \cdot I_2}{I_s}\right) \tag{2}$$

Similarly, an output from an operational amplifier 42a, i.e., the emitter potential of a parasitic NPN bipolar transistor 43a, during an emission period is expressed by the following formula:

$$V_{ref} - V_T \ln\left(\frac{\beta N \cdot I_1}{I_s}\right) \tag{3}$$

The operation circuit 40 serves as a subtraction circuit constituted by resistors 49, 50, 51, and 52 and a CMOS operational amplifier 53. This subtraction circuit performs subtraction of voltages expressed by formulae (2) and (3). As a result, a voltage value represented by the following formula is obtained as an output.

$$10 V_T \ln\left(\frac{I_2}{I_1}\right) \tag{4}$$

This output voltage value is a voltage proportional to the reciprocal number "1/a" of the object distance a. Therefore, the distance to the object can be obtained by obtaining the output voltage value.

The sequence of distance measurement performed by the distance measuring circuit block 4 will be described below with reference to the flow chart in FIG. 16. In this case, an output voltage is represented by S, which is obtained by calculating the average of outputs measured 36 times to increase the S/N ratio. In addition, a P1 ON time is set to be 400 μsec; a P0 ON time, 200 μsec (steps S401 to S412). Note that the set values "36 times", "400 μsec", and "200 μsec" in this sequence are only examples, and the present invention is not limited to these values.

Figure 17:
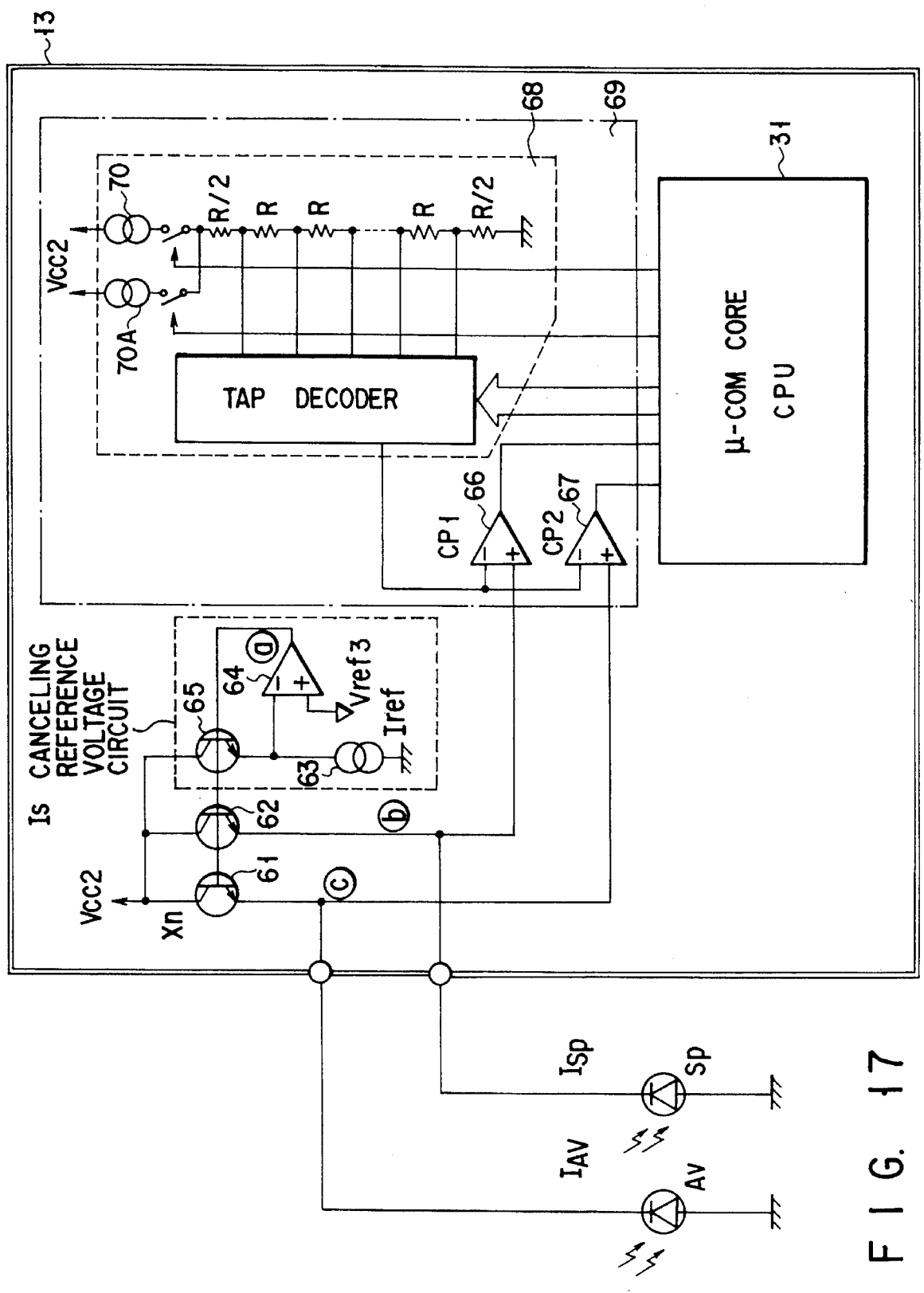
FIG. 17 is a circuit diagram showing the arrangement of a photometric circuit block 13 using parasitic NPN bipolar transistors in a CMOS device.

FIG. 17 shows the detailed arrangement of a photometric circuit block 13 using parasitic NPN bipolar transistors in a CMOS device.

As shown in FIG. 17, as photometric elements, a spot photometric light-receiving element Sp and an average photometric element Av are used. The spot photometric light-receiving element Sp serves to measure the object brightness in a narrow range on the central portion of the photographic frame. The average photometric element Av serves to measure the object brightness in a wide range on the photographic frame. Photocurrents $I_{Av}$ and $I_{Sp}$ from these photometric elements are detected by the photometric circuit block 13 (to be describe later).

A photometric circuit comprises an $I_S$ (the saturation current of a transistor) canceling reference voltage circuit constituted by a parasitic NPN bipolar transistor 61 in a CMOS device in which the current $I_{Av}$ flows as an emitter current, a parasitic NPN bipolar transistor 62 in a CMOS device in which the current $I_{Sp}$ flows an emitter current, a constant-current source 63, a CMOS operational amplifier 64, a parasitic NPN bipolar transistor 65 in a CMOS device, and a reference voltage source $V_{ref3}$ for outputting a voltage proportional to a temperature, and a T proportional A/D converter 69 constituted by comparators 66 and 67 and a T proportional DAC 68 for outputting a voltage proportional to a temperature. In this arrangement, an output voltage a from the operational amplifier 64, i.e., an $I_S$ canceling reference voltage, is expressed by the following formula:

$$V_{ref3} + V_T \ln \frac{I_{ref}}{I_s} \tag{5}$$

Therefore, the potential at a point b is expressed by $$V_{ref3} + V_T \ln \frac{I_{ref}}{I_s} - V_T \ln \frac{I_{Sp}}{I_s} = V_{ref3} - V_T \ln \frac{I_{Sp}}{I_{ref}} \tag{6}$$

Similarly, the potential at a point c is expressed by $$V_{ref3} + V_T \ln \frac{I_{ref}}{I_s} - VT \ln \frac{I_{Av/n}}{I_s} = \tag{7}$$

$$V_{ref3} - V_T \ln \frac{I_{Av}}{I_{ref}} + VT \ln(n)$$

In this case, if $I_{Av} = 2^m \cdot I_{ref}$ and $I_{Sp} = 2^l \cdot I_{ref}$, the potentials at the points b and c are expressed by the following formulae, respectively. Note that VTln(2) is a voltage proportional to a temperature, which is about 18 mV at a temperature of 30° C.

$$V_{ref3} - V_T \ln(2) \cdot l \tag{8}$$

$$V_{ref3} - V_T \ln(2) \cdot m + V_T \ln(n) \tag{9}$$

The manner of determining the input range of the T proportional A/D converter will be described next with reference to a detailed example of design. Assume that the photocurrent $I_{Sp}$ obtained by the spot photometric element changes in the range of 100 pA to 1 μA in accordance with the brightness of an object to be photographed.

If $I_{ref} = 10$ μA and $V_{ref3} = 180$ mA (30° C.), the potential at the point b becomes 480 mV (30° C.) when the photocurrent $I_{Sp}$ is 100 pA, and becomes 240 mV (30° C.) when the photocurrent $I_{Sp}$ is 1 μA.

Assume that a count value of eight corresponds to one brightness level, and the A/D converter is an 8-bit converter to simplify the subsequent operation processing and maximize the precision by reducing photometry errors due to quantization errors. Since the change amount of a photometric circuit output per level is 18 mV (30° C.), a voltage value per count is 255×2.25 mV=573.75 mV (30° C.) when the full bits set to 18 mV/8=2.25 mV (30° C.) are enabled.

The photometric range area of the average photometric element is about 16 times that of the spot photometric element, and the photocurrent $I_{Av}$ obtained by the average photometric element changes in the range of 1,600 pA to 16 μA. Therefore, when a count n of NPN transistors is "n–1", the potential at a point a becomes 408 mV (30° C.) when the photocurrent $I_{Av}$ is 1,600 pA, and becomes 168 mV (30° C.) when the photocurrent is 16 μA.

As described above, the photocurrents $I_{Sp}$ and $I_{Av}$ exhibit different photocurrent amounts with respect to the same brightness. If the average and spot photometric elements are incorporated in the same photometric circuit, different output voltage are generated, and the input range of the A/D converter on the output stage must be broadened. For this reason, in this embodiment, the value n is set to "16" to make average and spot photometric circuit output voltages have the same voltage value at the same brightness.

As described above, by setting the emitter size ratio between NPN transistors to be equal to the ratio between average and spot photocurrent at the same brightness, the respective photometric output voltage values can be made equal to each other at the same brightness. Since the respective photometric output voltage values can be made almost equal to each other, if not perfectly equal to each other, a photometric circuit can be designed without excessively broadening the input voltage range of the A/D converter on the output stage. Therefore, an increase in circuit size can be suppressed.

In addition, photometric output voltages from photometric elements having different photocurrent ratios at the same brightness can be made equal to each other by arranging the operational amplifier 64 and the reference voltage circuit output $V_{ref3}$ for each of the average and spot photometric elements Av and Sp and setting different values as the reference voltage circuit outputs $V_{ref3}$ for the average and spot photometric elements Av and Sp in advance.

If, for example, $I_{Av}/I_{Sp}=16$, reference voltage circuit outputs may be set according to equation (10) or (11):

$$V_{ref3A}=V_{ref3}+18\ mA\ (30°\ C.)\times\ln(16)/\ln(2) \quad (10)$$

$$I_{refA}=I_{ref}\times 16 \quad (11)$$

In addition to the above technique, a level shift circuit may be added to the photometric circuit to adjust the above values. Furthermore, an adjustment amount may be set to be 18 mV (30° C.)×ln $(I_{Av}/I_{Sp})$/ln(2).

The obtained photometric voltage values, i.e., the potentials at the points b and c, are converted into digital amounts by the T proportional ADC 69, and are loaded into the μ-com core to be operated/converted into object brightness information. The information is then stored in a memory.

The T proportional ADC 69 comprises a D/A converter constituted by a shunt resistor and a tap decoder and the comparators 66 and 67. When a command is output from the μ-com core to the tap decoder, the potential at one of the taps of the shunt resistor is input to one terminal of each of the comparators 66 and 67. The μ-com core A/D-converts each photometric output voltage value by repeatedly comparing each set voltage of the D/A converter with the photometric output voltage.

In addition, a current proportional to a temperature T, represented by Vtln(N/R₀) (where N is a positive integer, and R₀ is a resistance inside the circuit), is supplied from a constant-current source 70 to the shunt resistor, thus generating a voltage proportional to the temperature T. In addition, a constant-current source 70A, which is stable with respect to the temperature T, and the above T proportional constant-current source are switched from each other by a switching operation of the μ-com core. Furthermore, the A/D converter 69 is designed to be used as a T stable/T proportional A/D converter. The T stable A/D converter is used to A/D-convert other information amounts about the camera (e.g., temperature and electronic flash charge voltage).

The overall circuit size is reduced in the above-described manner.

A photometric value may be A/D-converted and loaded into the μ-com core. If, however, a CMOS operational amplifier is used, its offset voltage poses a problem, unlike a conventional bipolar operational amplifier. More specifically, the offset voltage of the CMOS operational amplifier is as high as about 20 mV, compared to an offset voltage of about 2 to 3 mV in the conventional operational amplifier. Since 18 mV (30° C.) is set per brightness level, the offset voltage of the CMOS operational amplifier cannot be neglected.

In order to solve this problem, according to this embodiment, the CMOS operational amplifier 64 and the CMOS comparator 66 are made to have almost the same arrangement and are arranged in the same chip to be located as close as possible so as to produce offset voltages in the same direction, thereby canceling the offset voltages of each other.

A photometric sequence performed by the photometric circuit block 13 will be described in detail below with reference to the flow chart in FIG. 18.

In this sequence, spot and average photometric operations are performed by measuring the potentials at the points b and c, respectively. These potentials are then A/D-converted. This method will be described hereinafter as an A/D scheme using an A/D converter using a comparator and a tap decoder. Furthermore, since spot and average photometric operations are performed through the same process, only one of the operations will be described below.

First, values corresponding to $V_{CC2}$ and GND are set to VH and VL, respectively, and an output from the comparator is checked. If the value of the comparator is at "H" level, since it indicates that the value of the tap decoder is lower, (VH+VL)/2 is substituted into VL. In contrast to this, if the output from the comparator is at "L" level, since it indicates that the value of the tap decoder is higher, (VH+VL)/2 is substituted into VH. Subsequently, when this operation is repeated eight times, A/D conversion of eight bits is performed, and hence the photometric output is A/D-converted (steps S501 to S508).

Figures 19, 21:
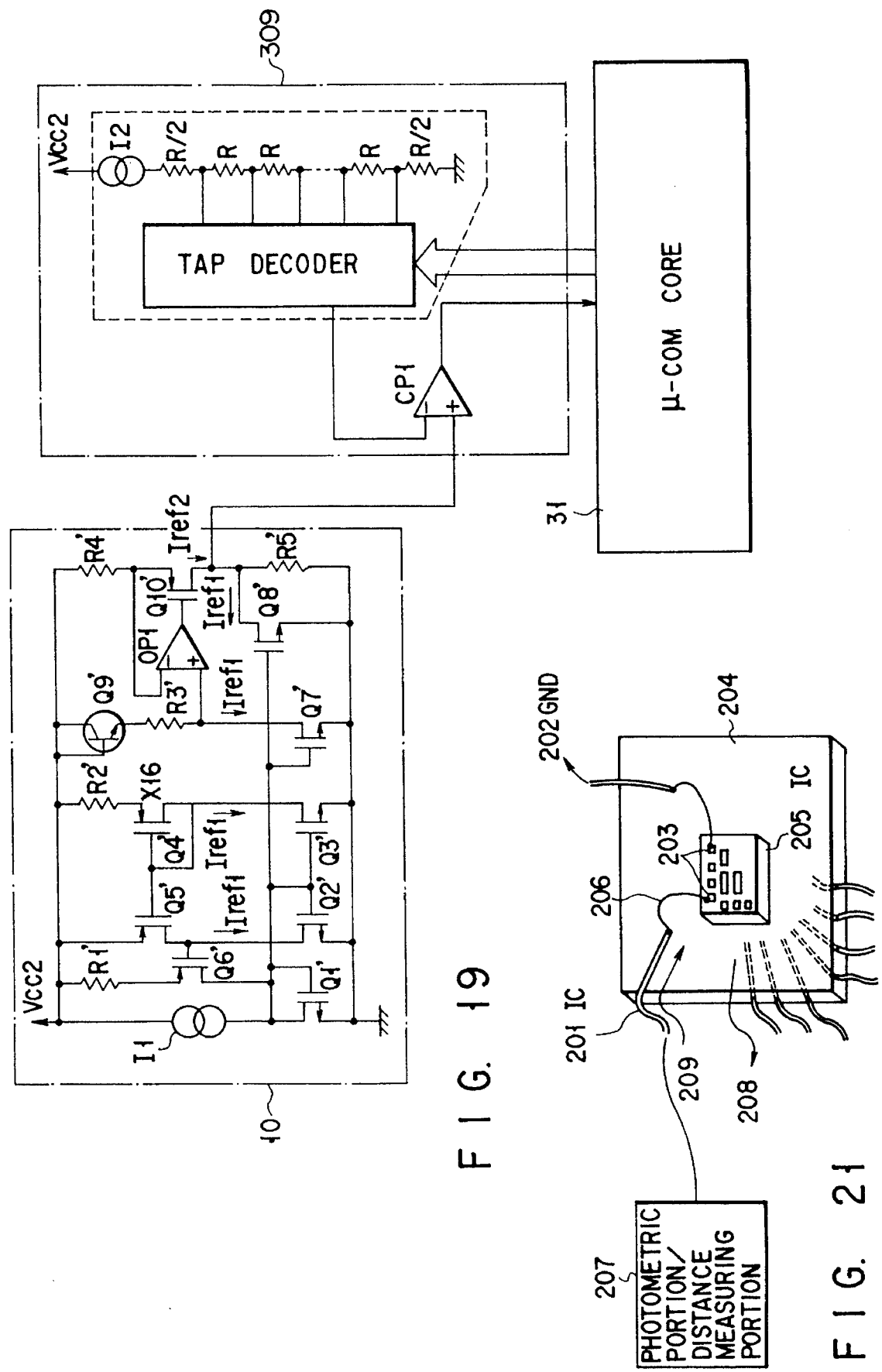
FIG. 19 is a circuit diagram showing the arrangement of a temperature measuring circuit block 10 in a CMOS device.
FIG. 21 is a perspective view showing an IC package including a CPU.

FIG. 19 shows the arrangement of a temperature measuring circuit block 10 in a CMOS device. The temperature measuring circuit block 10 is designed to measure the temperature of a chip on which a CMOS-analog IC is formed. With the use of this CMOS-analog IC, all camera measuring circuits such as a photometric circuit and a distance measuring circuit for a CPU portion and its peripheral circuit can be operated with very low power consumption. For this reason, the power consumption of the chip itself is very low as compared with a bipolar integrated circuit.

In general, when a bipolar integrated circuit is operated, the temperature of the chip itself rises owing to its power consumption to exceed the ambient temperature by about 3° C. The degree of temperature rise varies depending on the timing at which temperature measurement is performed after power is supplied to the IC. That is, the temperature of the chip varies up to ±3° C. depending on the timing of temperature measurement. For this reason, high-precision camera temperature correction cannot be performed. In contrast to this, with the use of a CMOS, since a low-power-consumption operation is allowed, the difference between the temperature of the chip itself and the ambient temperature is small.

In addition, in the above-described conventional bipolar integrated circuit, in consideration of heat generation due to the power consumption of the chip itself, a temperature measuring circuit is incorporated in a camera measuring circuit with a single function, such as a photometric circuit chip, a distance measuring circuit chip, or a remote control reception circuit chip, or in an IC chip with two or three functions so as to measure the IC chip temperature.

In contrast to this, with the use of a CMOS, a temperature measuring circuit can be incorporated in an IC chip such as a large-scale IC chip obtained by integrating various camera measuring circuits. Therefore, an all-in-one IC suitable for a camera can be designed. Such a CMOS-analog IC also contributes to a further reduction in size and cost of a camera.

As shown in FIG. 19, the temperature measuring circuit block 10 of this embodiment comprises a temperature proportional type reference current circuit constituted by MOS transistors $Q_1'$ to $Q_8'$, resistors $R_1'$ and $R_2'$, and a circuit starting constant-current source $I_1$, a temperature stable type reference current circuit constituted by a parasitic NPN bipolar transistor $Q_9'$ existing in a CMOS device, a resistor $R_3'$, a CMOS operational amplifier $OP_1$, a CMOS transistor $Q_{10}'$, and a resistor $R_4$, and a resistor $R_5'$.

In the temperature proportional type reference current circuit, the area ratio between PMOS transistors $Q_5$ and $Q_4$ is set to be 1:16, and a current value $I_{ref1}$ is given by the following equation owing to this area ratio:

$$I_{ref1} = (V_T \ln 16)/R2' \quad (12)$$

In this equation, VT is a thermal voltage which is proportional to a temperature and is 26 mV (30° C.). The resistance value of the resistor $R_3'$ is set such that when the current $I_{ref1}$ is supplied to the parasitic NPN bipolar transistor $Q_9'$ and the resistor $R_3'$, the positive terminal potential of the operational amplifier becomes 1.26 V with reference to $V_{CC2}$. In addition, this voltage, 1.26 V, is called a band gap reference voltage, which exhibits excellent temperature stability.

A temperature stable reference current $I_{ref2}$ output from the source of the transistor $Q_{10}'$ with this voltage being used as a reference voltage is given by the following equation:

$$I_{ref2} = 1.26 \ V/R_4' \quad (13)$$

Therefore, a voltage $V_{TEMP}$ generated across the resistor $R_5'$ is expressed by $$\begin{aligned} V_{TEMP} &= R5' \times (I_{ref2} - I_{ref1}) \quad (14) \\ &= R5' \times \frac{1.26}{R4'} - \frac{V_T \ln(16)}{R2'} \end{aligned}$$

In this case, if $R_2' = 1$ kΩ, $R_4' = 15$ kΩ, and $R_5' = 28$ kΩ, then $$V_{TEMP} = 2352 \text{ mV} - 2016 \text{ mV} \times \frac{T_{EMP}}{300} \quad (15)$$

The voltage $V_{TEMP}$ is 269 mV at a temperature of 40° C.; and 605 mV at −10° C.

The amount of voltage change for 1° C. is 6.72 mV.

In contrast to this, if the input voltage range of an A/D converter portion 309 is set to be 0 to 856.8 mV, and 3.36 mV is set per count, a temperature measurement voltage value can be A/D-converted with a temperature measurement precision of 0.5° C. per count. In this case, as is apparent, the A/D converter is stable with respect to temperatures. In addition, the relationship between the obtained A/D-converted digital values and the temperatures is obtained by comparing reference values corresponding to the temperatures after the μ-com core corrects digital values stored as amounts corresponding to the differences between the logical values of A/D-converted values obtained in advance at reference temperatures and actual values.

FIGS. 1A and 1B show the detailed arrangement of a structure incorporating not only various camera measuring circuits which are made of CMOS to be basically operated with low power consumption, but also circuit blocks which cannot be basically operated with low power consumption because of an external drive, such as a motor drive circuit, a booster circuit, and a plunger drive circuit.

Assume that a power supply source system control circuit is incorporated in an IC chip, as shown in FIGS. 1A and 1B. In this case, in a camera, when a motor is driven to perform a film wind or rewind operation, a current of several tens to several hundreds mA flows for 1 to 30 sec. As a result, the temperature of the IC chip rises up to near 60° to 70° C. It takes several minutes for the chip temperature to decrease to the ambient temperature. For this reason, if temperature correction is performed with respect to the operation of the camera on the basis of the temperature of the IC chip itself, inaccurate temperature correction is performed.

In order to solve the above problem, the IC chip may incorporate a timer circuit (CPU 1) as well as a temperature measuring circuit 10. With this arrangement, after a power system control circuit such as a motor drive circuit 5, 17, or 18 or a booster circuit 2 is operated, temperature data obtained by the temperature measuring circuit 10 is not used as temperature correction data until the IC temperature increased by the operation decreases to the ambient temperature. This method has already been explained above in the description of the method of using the power drive flag in the main flow chart and the like. Note that two or more types of power drive flags MTFLG, such as flags MTFLG1 and MTFLG2, may be set in accordance with load and drive conditions.

Figure 20:
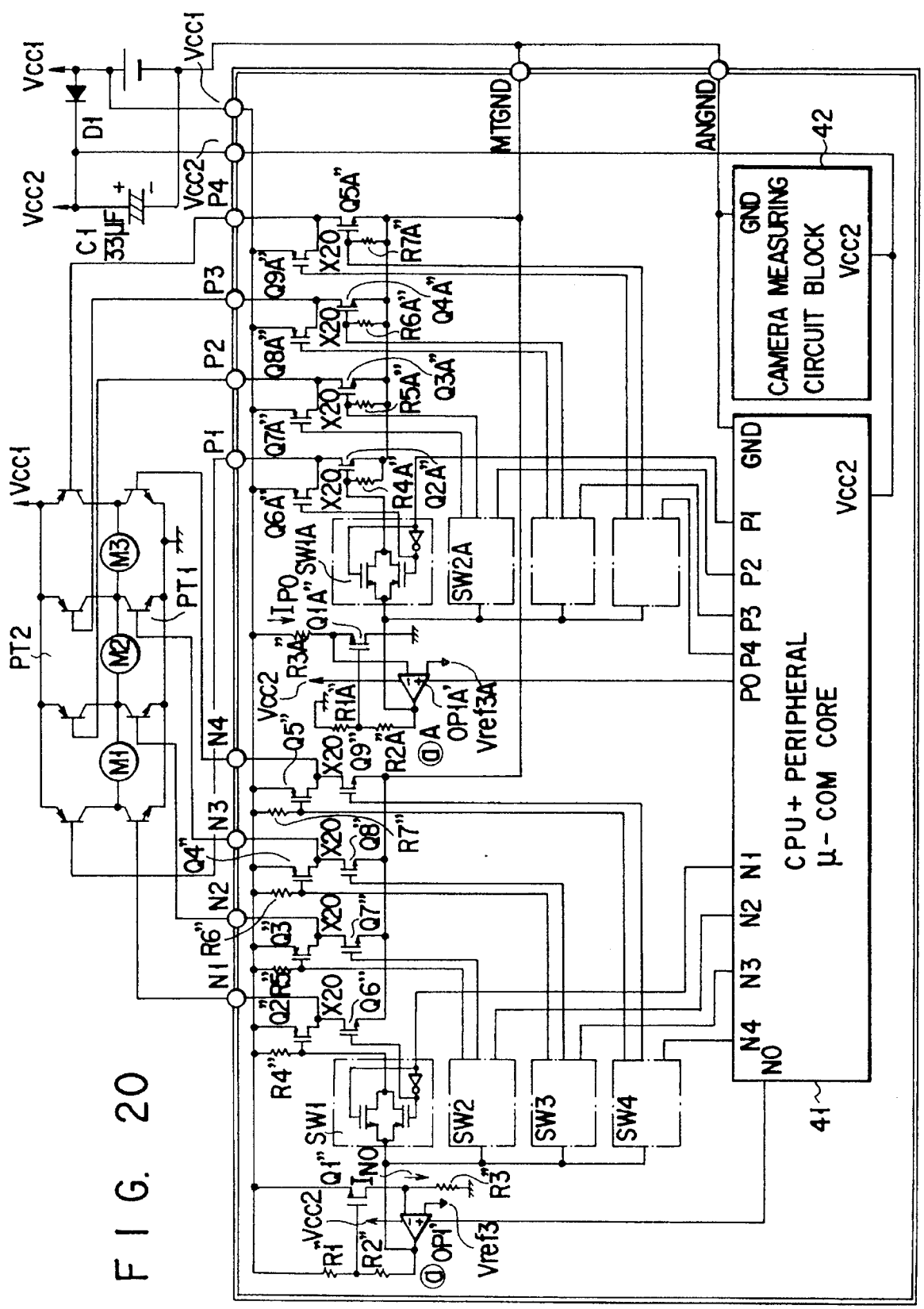
FIG. 20 is a circuit diagram showing the detailed arrangement of an NPN motor pre-driver circuit block 5 obtained by arranging a pre-driver circuit for driving a motor on the same chip as that of a CPU and a camera measuring circuit block.

FIG. 20 shows the detailed arrangement of an NPN motor pre-driver circuit block 5 in which a pre-driver circuit for driving a motor is arranged on the chip mounted with a CPU 41 and a camera measuring circuit block 42.

In general, as a power supply source for the CPU 41 and the camera measuring circuit block 42, a power supply source $V_{CC2}$ is used. The power supply source $V_{CC2}$ is obtained by stabilizing power from a battery by using a diode filter (D1 and C1) constituted by a Schottky diode and a tantalum capacitor having a capacitance of about 33 μF.

Such a power supply source is used for the following reason. A battery voltage abruptly and greatly drops upon driving of a heavy load such as a motor, a plunger, a booster coil, or an electric flash charger, so that a value dv/dt becomes larger than a value (dv/dt)0 at which the proper sequence of the CPU or proper measurement by the measuring circuit block cannot be ensured.

The capacitance of a backup capacitor $C_1$ is set to a value represented by the following relation, provided that a current consumed in the power supply $V_{CC2}$ is represented by $I_{di}$.

$$\frac{Idi}{C_1} < \left(\frac{dv}{dt}\right)_0 \quad (16)$$

A more serious problem posed in a camera as a portable device is that a battery may be separated from a battery contact owing to vibrations, resulting in temporal disconnection of power. Assume that the above problem occurs during an operation of the camera, and the voltage from the power supply source $V_{CC2}$ drops to become lower than a voltage at which the camera cannot be operated. In this case, proper camera control cannot be performed by the CPU. In the worst case, the camera may be broken. This chattering of a battery is considered to continue for about 10 msec, although it depends on the shape of a battery contact and a pressured applied thereto. Therefore, the capacitance of the capacitor C1 is set such that the voltage from the power supply source $V_{CC2}$ is prevented, for this period, from dropping to become lower than the voltage at which the CPU cannot be properly operated.

The dominant parameter for determining the capacitance of the capacitor is generally to hold the voltage in the power supply source $V_{CC2}$ during battery chattering. As the capacitor $C_1$, a tantalum capacitor is used because it has good frequency characteristics and allows a relatively large capacitance. However, this capacitor is expensive and large in volume for the mount space of a compact camera. Therefore, design must be made to obtain a low IC current Idi consumed in the power supply source $V_{CC2}$.

In order to achieve this object, a camera measuring circuit block needs to be designed to have minimum current consumption. In contrast to this, a circuit for driving an external power transistor, such as a motor pre-driver, requires a current of several 10 mA to be supplied as a base current. Assume that such a circuit is formed on the same chip as that of a CPU chip, similar to the camera measuring circuit block. In this case, if this circuit block uses the same power supply source $V_{CC2}$ as that for the CPU and the measuring circuit, a $V_{CC2}$ holding capacitor needs to have a very large capacitance for the above reason. In practice, however, the above arrangement cannot be employed in terms of cost and space.

In this embodiment, therefore, a source current source $V_{CC1}$ is used independently of the power supply source $V_{CC2}$, and a large current supply terminal and line are provided for an IC to prevent a large current from being discharged from the power supply stabilizing capacitor $C_1$ to the outside of the IC. As shown in FIG. 21, an IC package including a microcomputer is designed such that an IC lead 201 for connecting an IC 205 to a battery extends from the IC, and the IC lead 201 is connected to a pad 203 on the IC 205 via a gold wire 206.

Assume that a large current flows through a GND line 202 of the IC 205. In this case, since the aluminum wire of the GND line 202 of the IC 205 has a resistance of 0.2 to 3Ω, and the contact resistance between the pad 203 and the n⁻-type silicon substrate 201 is 0.2 to 3Ω, a potential difference of about 50 to 100 mV is produced along the path of the large current. For this reason, if the ground GND line 202 in the IC chip is commonly arranged for the above circuit block, the CPU, and the camera measuring circuit block, a normal sequence and accurate measurement cannot be performed.

This embodiment includes at least two ground GND lines, i.e., an MTGND line for discharging a large current to the ground GND, and a camera measuring circuit block ground GND line. In addition, to avoid the influence of the contact resistance between a pad and a line, the embodiment includes an MTGND terminal and an ANGND terminal constituted by at least two ground GND pads.

As described above, by forming at least two GND systems, i.e., the ground GND lines and ground GND terminals, the above large-current drive circuit block can be formed on one chip. Ideally, the digital ground GND for the CPU 41 and the analog ground GND for the camera measuring circuit block 42 are separately arranged. In practice, however, such an arrangement undesirably increases the number of terminals. Therefore, in this embodiment, the digital ground GND and the analog ground GND constitute common GND. As is apparent, in this case, wiring needs to be devised to realize a one-point ground structure.

The arrangement of a pre-drive circuit will be described in detail next.

An N ($N_1$ to $N_4$) terminal constant-current drive circuit for driving an external NPN power transistor group PT1 for driving motors $M_1$, $M_2$, and $M_3$ will be described first.

This N terminal constant-current drive circuit comprises a PMOS transistor constant-current drive voltage generating circuit and an output portion. The PMOS transistor constant-current drive voltage generating circuit is constituted by a CMOS operational amplifier OP1', resistors $R_1"$, $R_2"$, and $R_3"$, a reference voltage $V_{ref3}$, and a PMOS transistor $Q_1"$. The output portion is constituted by transfer gate switches SW1, SW2, SW3, and SW4 for guiding the above voltage to PMOS transistors $Q_2"$, $Q_3"$, $Q_4"$, and $Q_5"$, the PMOS transistors $Q_2"$, $Q_3"$, $Q_4"$, and $Q_5"$, each having a source connected to $V_{CC1}$ and a drain connected to each base of the external NPN power transistor group PT1, shunt resistors $R_4"$, $R_5"$, $R_6"$, and $R_7"$ for shunting the gate-source paths of the PMOS transistors, and NMOS transistors $Q_6"$, $Q_7"$, $Q_8"$, and $Q_9"$ for shunting the respective base-emitter paths of the external PNP power transistor group PT1.

When a power supply signal is input from a port $N_0$ of the CPU 41 to the operational amplifier OP1', the operational amplifier OP1' operates, and a current $I_{N0}$ of 100 μA flows in the resistor $R_3"$. This current $I_{N0}$ is represented by the following equation:

$$I_{N0} = V_{ref3}/R3" \tag{17}$$

The relationship between a voltage $V_{GS}$ of the transistor $Q_1"$ and the current $I_{N0}$ is expressed as follows:

$$I_{N0} = A \cdot (V_{GS} - Vth)^2 \tag{18}$$

where A is the proportional constant, and Vth is the threshold voltage.

Therefore, a potential Va at a point a with reference to $V_{CC1}$ is represented by $$Va = \frac{R1" + R2"}{R2"} \cdot VGS \tag{19}$$

In addition, when an output port $N_1$ of the μ-com core is set at "H" level, and the transfer gate switch SW1 is turned on, the potential va is applied to turn on the transistor $Q_2"$ and turn off the transistor $Q_6"$. Before this operation, the transistor $Q_2'$ was in an OFF state with the G-S voltage being set to 0 V, and the transistor $Q_6"$ was in an ON state. At this time, an output current $I_{N1}$ is represented by the following equation:

$$I_{N1} = A \cdot (V_{GS1} - Vth)^2 \tag{20}$$

To obtain a voltage $V_{GS1}$ to set $I_{N1}$=20 mA, $(R_1"+R_2")/R_2"$ is set according to the following equation:

$$V_{GS1}(ID = 1 \text{ mA}) = \frac{R1" + R2"}{R2"} V_{GS}(ID = 100 \text{ μA}) \ldots \tag{21}$$

$$\frac{R1" + R2"}{R2"} = \frac{V_{GS}(I_D = 1 \text{ mA})}{V_{GS}(I_D = 100 \text{ μA})}$$

With the above-described circuit arrangement, a constant current of 20 mA can be output from each of the output ports $N_1$, $N_2$, $N_3$, and $N_4$, and no base limiting resistor need to be used, unlike the prior art. Therefore, a pre-drive circuit having a small mount area can be obtained. In addition, since variations in $V_{CC1}$ are fed back, 20-mA drive can always be performed regardless of variations in the voltage $V_{CC1}$, thereby allowing stable actuator control without being influenced by power supply voltages.

A P terminal constant-current drive circuit for driving external PNP power transistors will be described next. The operation principle of this drive circuit is the same as that of the N terminal constant-current drive circuit described above. The only difference between the N and P terminal constant-current drive circuits is that one circuit uses a source current, and the other circuit uses a sink current.

The P terminal constant-current drive circuit comprises a NMOS transistor constant-current drive voltage generating circuit and an output portion. The NMOS transistor constant-current drive voltage generating circuit is constituted by a CMOS operational amplifier OP1A', resistors $R_{1A}"$, $R_{2A}"$, and $R_{3A}"$, a reference voltage $V_{ref3A}$, and an NMOS transistor $Q_{1A}"$. The output portion is constituted by NMOS transistors $Q_{2A}"$, $Q_{3A}"$, $Q_{4A}"$, and $Q_{5A}"$, shunt resistors $R_{4A}"$, $R_{5A}"$, $R_{6A}"$, and $R_{7A}"$ for shunting the gate-source paths of the NMOS transistors, and PMOS transistors $Q_{6A}"$, $Q_{7A}"$, $Q_{8A}"$, and $Q_{9A}"$ for shunting the respective base-emitter paths of an external PNP power transistor ground PT2.

When a power supply signal is input from a port $P_0$ of the CPU 41 to the operational amplifier OP1A', the operational amplifier OP1A' operates, and a current $I_{P0}$ of 100 μA flows in the resistor $R_{3A}"$.

This current $I_{P0}$ is represented by $$I_{p0}=(V_{ref3A}-V_{CC1})/R3A" \quad (22)$$

In addition, the relationship between the voltage $V_{GS}$ of the NMOS transistor $Q_1"$ and the current $I_{P0}$ can be expressed by the following equation:

$$I_{p0}=B\cdot(V_{GS}-Vth)^2 \quad (23)$$

where B is the proportional constant, and $V_{th}$ is the threshold voltage.

Therefore, a potential VaA at a point a with reference to GND is represented by $$VaA = \frac{R1" + R2"}{R2"} \cdot VGS \quad (24)$$

In addition, when an output port $P_1$ of the μ-com core is set at "H" level, and a transfer gate switch SW1A is turned on, the potential VaA is applied to turn on the NMOS transistor $Q_{2A}"$ and turn off the PMOS transistor $Q_{6A}"$. Before this operation, the NMOS transistor $Q_{2A}"$ was in an OFF state with the G-S voltage being set to 0 V, and the PMOS transistor $Q_{6A}"$ was in an ON state.

At this time, an output current $I_{P1}$ is represented by the following equation:

$$I_{P1}=B\cdot(V_{GS1}-Vth)^2 \quad (25)$$

To obtain a voltage $V_{GS1}$ to set $I_{P1}=20$ mA, $(R_{1A}"+R_{2A}")/R_{2A}"$ is set according to the following equation:

$$V_{GS1} (ID = 1 \text{ mA}) = \frac{R_{1A}" + R_{2A}"}{R_{2A}"} V_{GS} (ID = 100 \text{ μA}) \quad (26)$$

$$\therefore \frac{R_{1A}" + R_{2A}"}{R_{2A}"} = \frac{V_{GS} (ID = 1 \text{ mA})}{V_{GS} (ID = 100 \text{ μA})}$$

With the above-described circuit arrangement, a constant current of 20 mA from each of the terminals $P_1$, $P_2$, $P_3$, and $P_4$ can be sunk.

Figure 22:
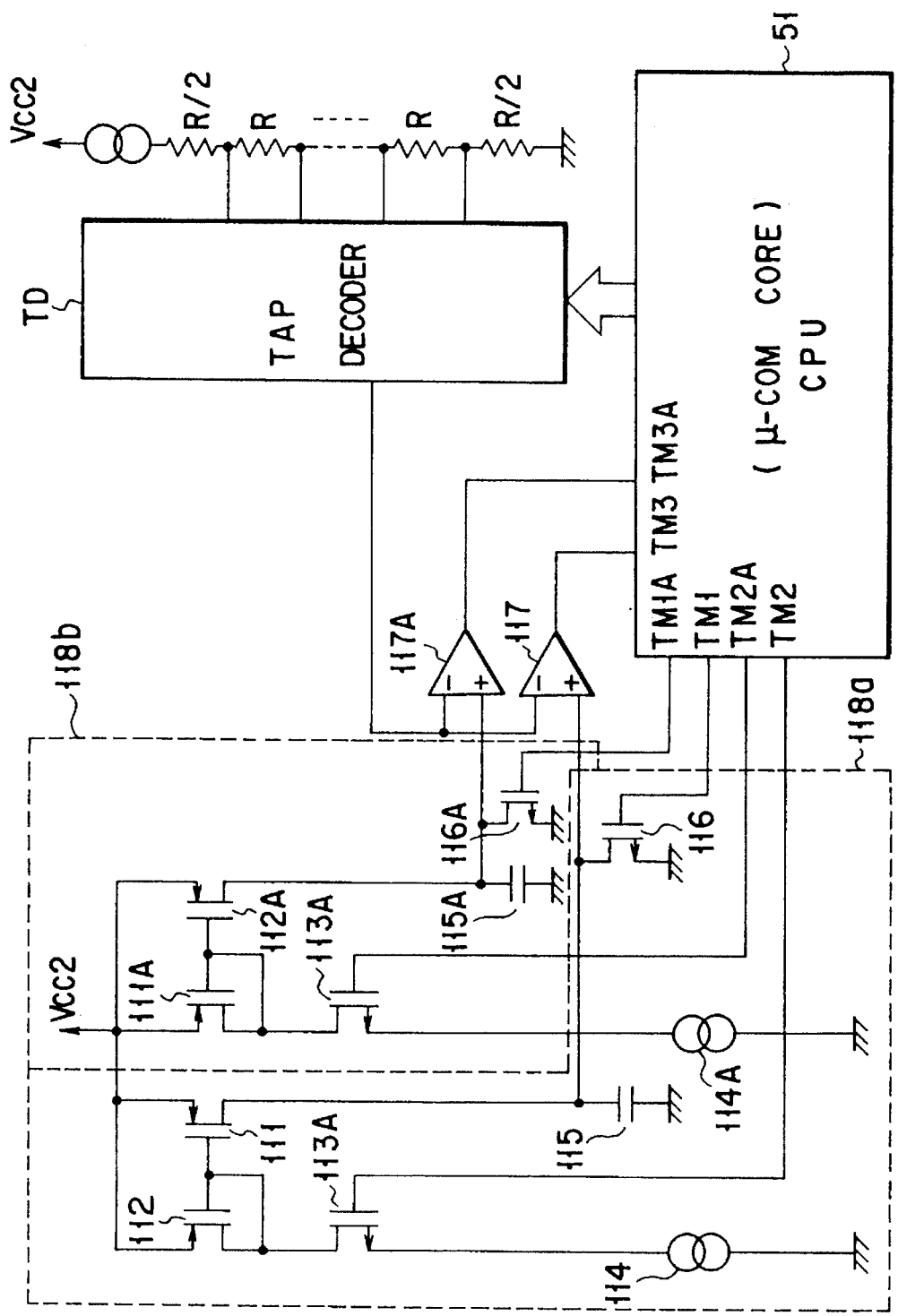
FIG. 22 is a circuit diagram showing the detailed arrangement of an analog timer circuit using no clock.

FIG. 22 shows the detailed arrangement of an analog timer circuit using no clock. As shown in FIG. 22, a timer 118a comprises MOS transistors 111 and 112 constituting a current mirror circuit, a constant-current source 114, the MOS transistor 113 for switching a current from the constant-current source 114, an integral capacitor 115 for integrating a current from the constant-current source 114, a MOS transistor 116 for removing charges stored in the capacitor 115, and a comparator 117 for comparing the amount of charges stored in the capacitor 115 with a DAC output.

A timer 118b has the same arrangement as that of the timer 118a. By changing the value of a tap decoder, two timer values can be set, or the timers can be continuously used. In addition, by changing the value of each constant-current source, a long- or short-term timer can be formed.

The operation of such an analog timer circuit will be described below with reference to the flow chart in FIG. 23. Note that a timer value is set on the basis of the graph shown in FIG. 24. If a capacitor in an integrated circuit is used, variations in temperature characteristics are small. If, however, there are variations in temperature characteristics, a characteristic curve may be selected in accordance with a temperature. Assume, in this case, that there are variations in temperature characteristics.

Temperature measurement is performed first (step S801). Before calling the analog timer, a CPU 51 sets an output (D/A value) of a tap decoder TD by referring to FIG. 24 to set a timer value T or TA (step S802). The CPU 51 then turns on TM1 or TM1A to cause the capacitor 115 or 115A to discharge. At the same time, the CPU 51 turns on TM2 or TM2A to set the capacitor 115 or 115A in a chargeable state, and turns off TM1 or TM1A to start the timer. Thereafter, the CPU 51 stops a clock oscillator (steps S803 and S804).

Subsequently, when the level of the capacitor 115 or 115A exceeds the output of the tap decoder, TM3 or TM3A is enabled, and the μ-com core is woken up by the resultant signal to start the clock oscillator again (return from the clock stop mode to the oscillation mode). The CPU 51 turns off TM2 or TM2A immediately after the oscillator starts to operate, thereby stopping the charge operation. The flow then returns to the main routine (steps S805 to S808).

As is apparent from the above description, since the clock oscillator of the μ-com core can be stopped during an operation of the analog timer, this circuit arrangement can be applied to measurement of small currents and low voltages, time measurement of a signal susceptible to noise, and the like.

Figure 25:
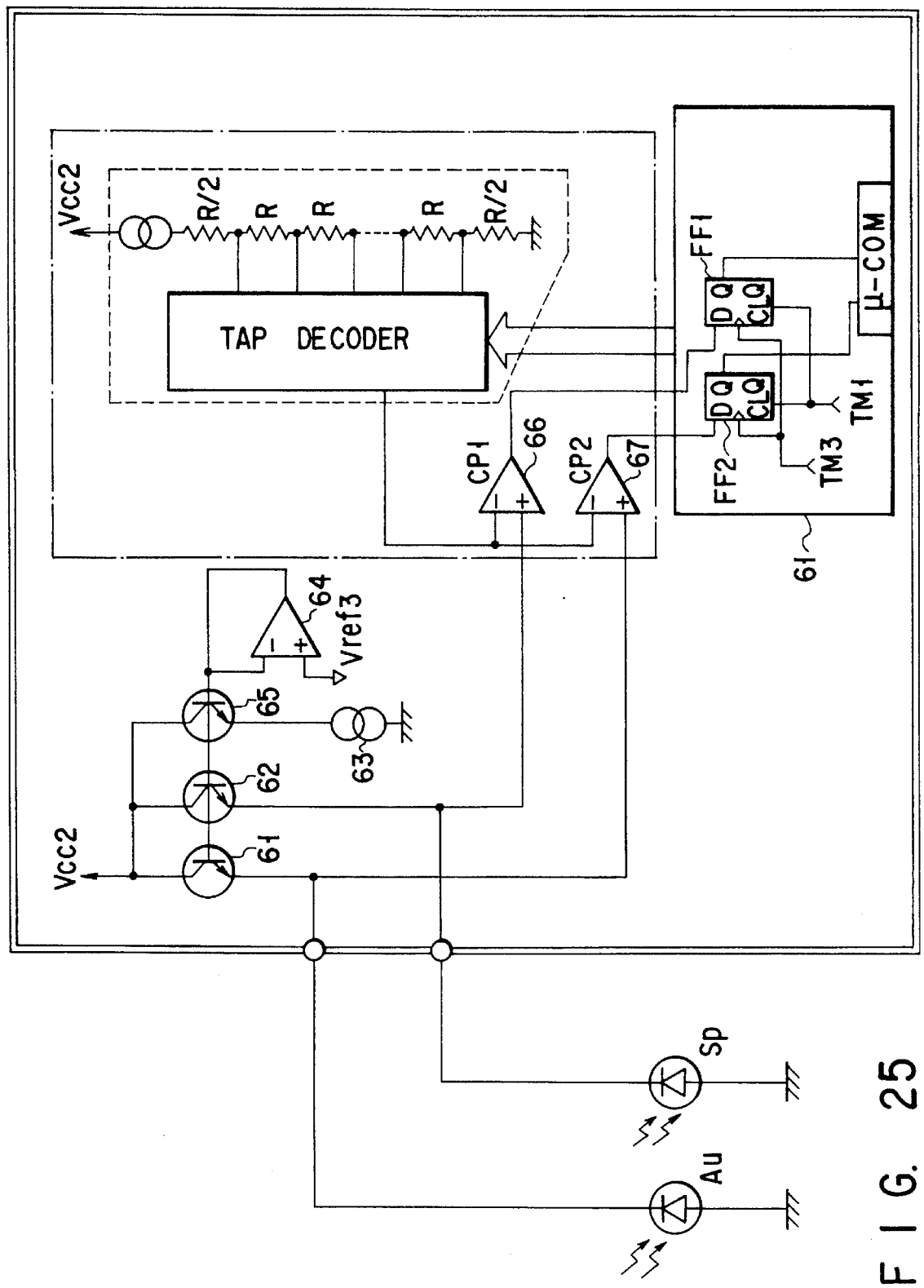
FIG. 25 is a circuit diagram showing the detailed arrangement of a photometric circuit using an analog timer.

FIG. 25 shows the detailed arrangement of a photometric circuit using an analog timer. This photometric circuit is different from that shown in FIG. 17 in that flip-flops FF1 and FF2 are connected to the outputs of comparators 66 and 67 in a CPU 61. In response to an analog timer stop signal, the flip-flops FF1 and FF2 latch the levels of the comparators 66 and 67, respectively.

Figure 26:
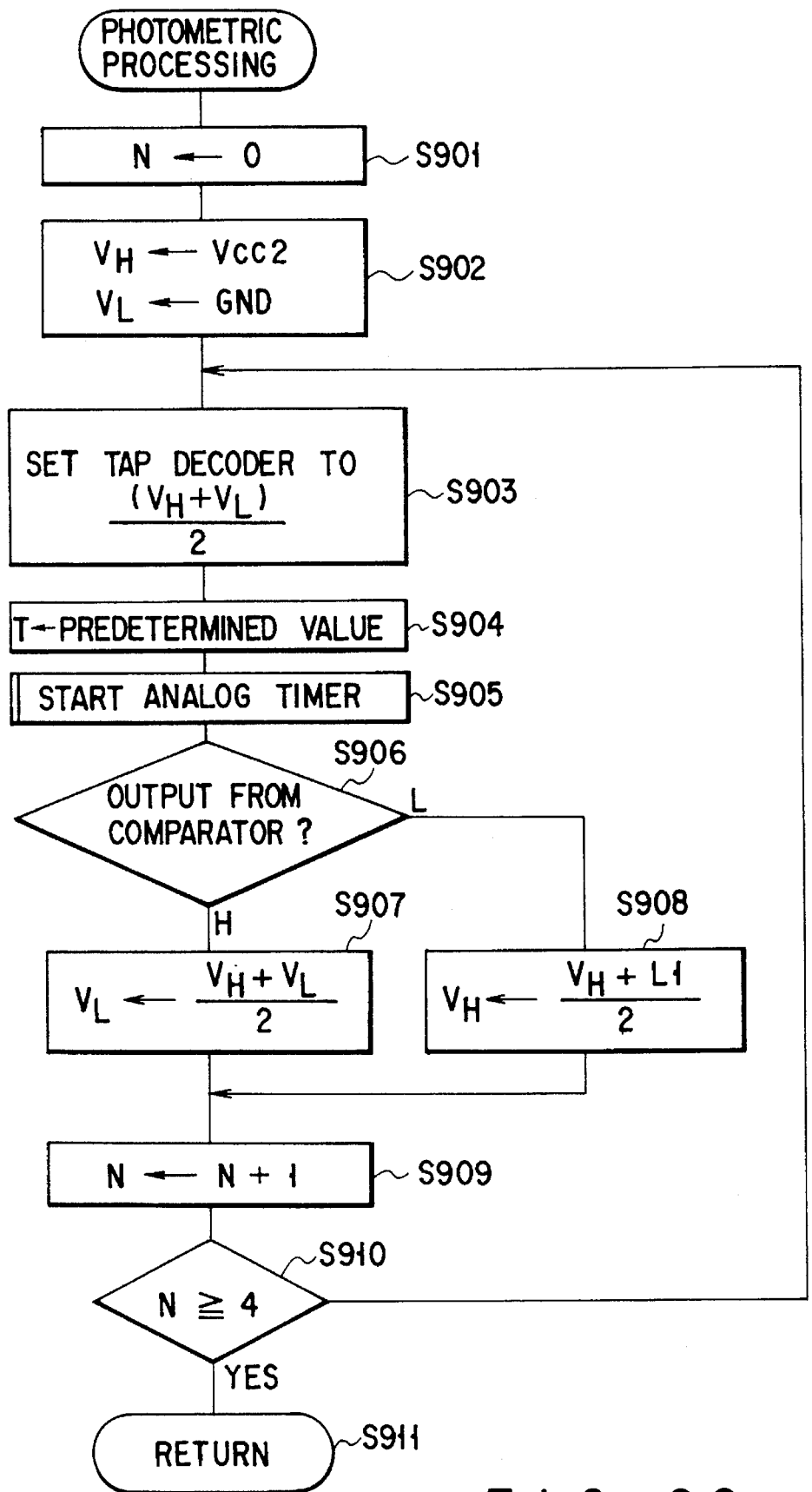
FIG. 26 is a flow chart showing the operation of the photometric circuit using the analog timer.

FIG. 26 is a flow chart showing the operation of this photometric circuit.

Figure 18:
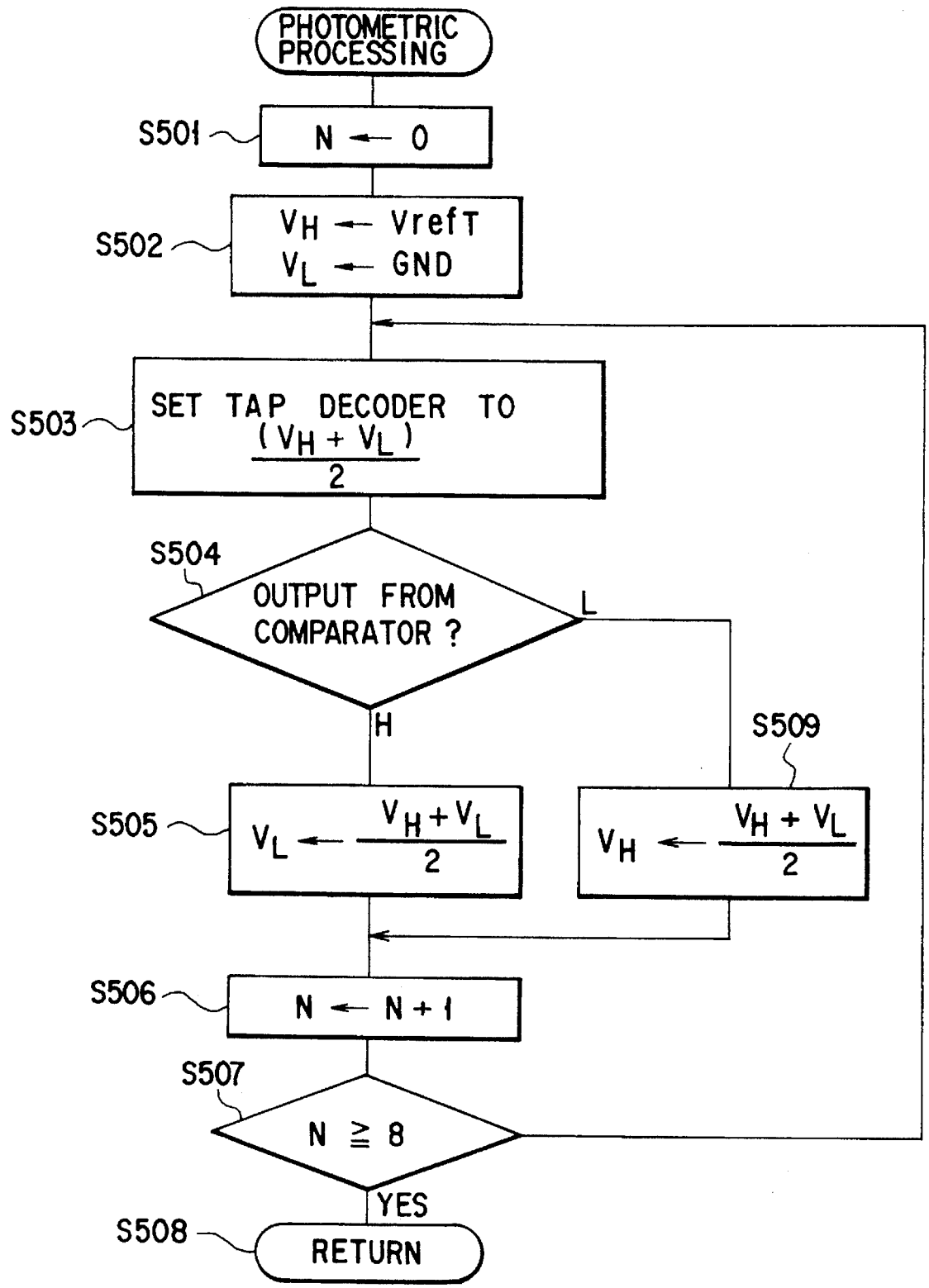
FIG. 18 is a flow chart showing the sequence of a photometric operation performed by the photometric circuit block 13.

This operation is different from that shown in FIG. 18 in that steps S904 and S905 are added to use the analog timer. If a photometric voltage is too low, accurate A/D conversion cannot be performed because of noise produced by a clock oscillator. In this case, therefore, when outputs from the comparators are to be checked, the clock oscillator is stopped, and measurement is performed in the absence of noise. Note that since outputs from the comparators are latched in response to an analog timer stop signal, the levels of the comparators will have been latched in the absence of noise when the oscillator starts oscillation. Other operations are the same as those described with reference to FIG. 18, and hence a repetitive description will be omitted.

Figure 27:
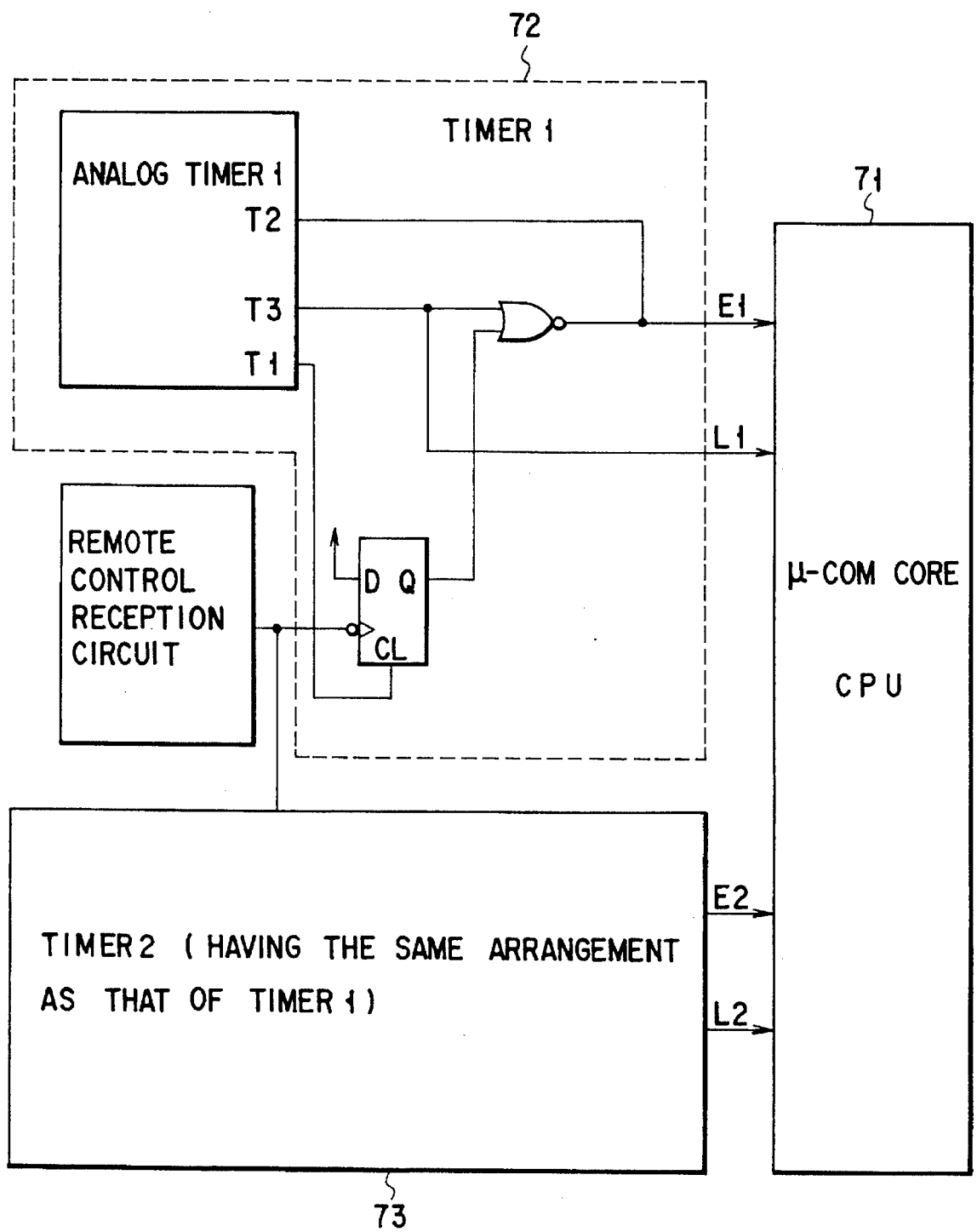
FIG. 27 is a block diagram showing the detailed arrangement of a circuit using analog timers to evaluate a remote control reception signal.

FIG. 27 shows the detailed arrangement of a circuit using an analog timer to evaluate a remote control reception signal. The purpose of this circuit is also to remove noise produced by a clock oscillator. In this case, two timers 72 and 73 are used.

FIG. 28 is a flow chart showing the operation of this circuit. Assume that a proper remote control signal has three pulses in a predetermined time interval T1. Note that the time interval T1 is allowed to have an error represented by T1±α. This circuit generates a signal T2 for stopping an analog timer when the timer reaches a set timer value or a remote control reception signal falls. The first time interval T1 is measured by an analog timer 1. Immediately after this operation, an analog timer 2 is set to measure the second time interval T1.

When the reception timing of a remote control signal is early, the timer value is set to T1+α. That is, if T3 is set at "H" level before a remote control signal is received, T≧T1 +α, and it is determined that the signal is not proper.

When a set time has elapsed first, since an analog timer is at rest, the elapsed time can be known by A/D conversion. Therefore, a CPU 71 determines the properness of the signal by checking whether the time is longer than T1−α. This determination is performed after the timer 2 is stopped, which is started immediately after the timer 1 is stopped. If it is determined that the signal is proper, the CPU 71 sets the remote control signal reception flag. The flow then leaves the interrupt subroutine.

Figure 29:
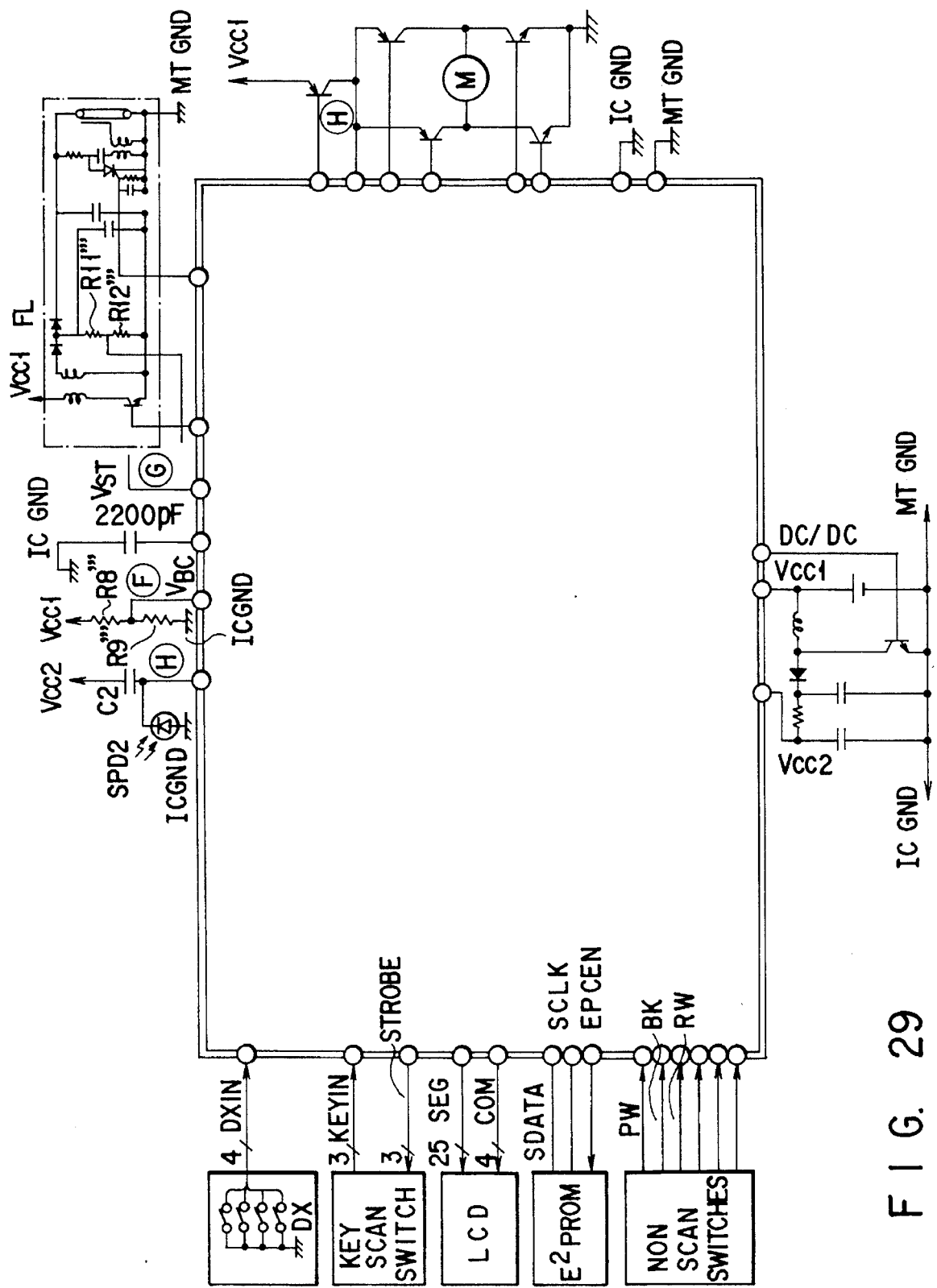
FIG. 29 is a circuit diagram showing the overall arrangement of a camera controller using a CMOS-analog IC according to the fourth embodiment of the present invention.
Figure 30:
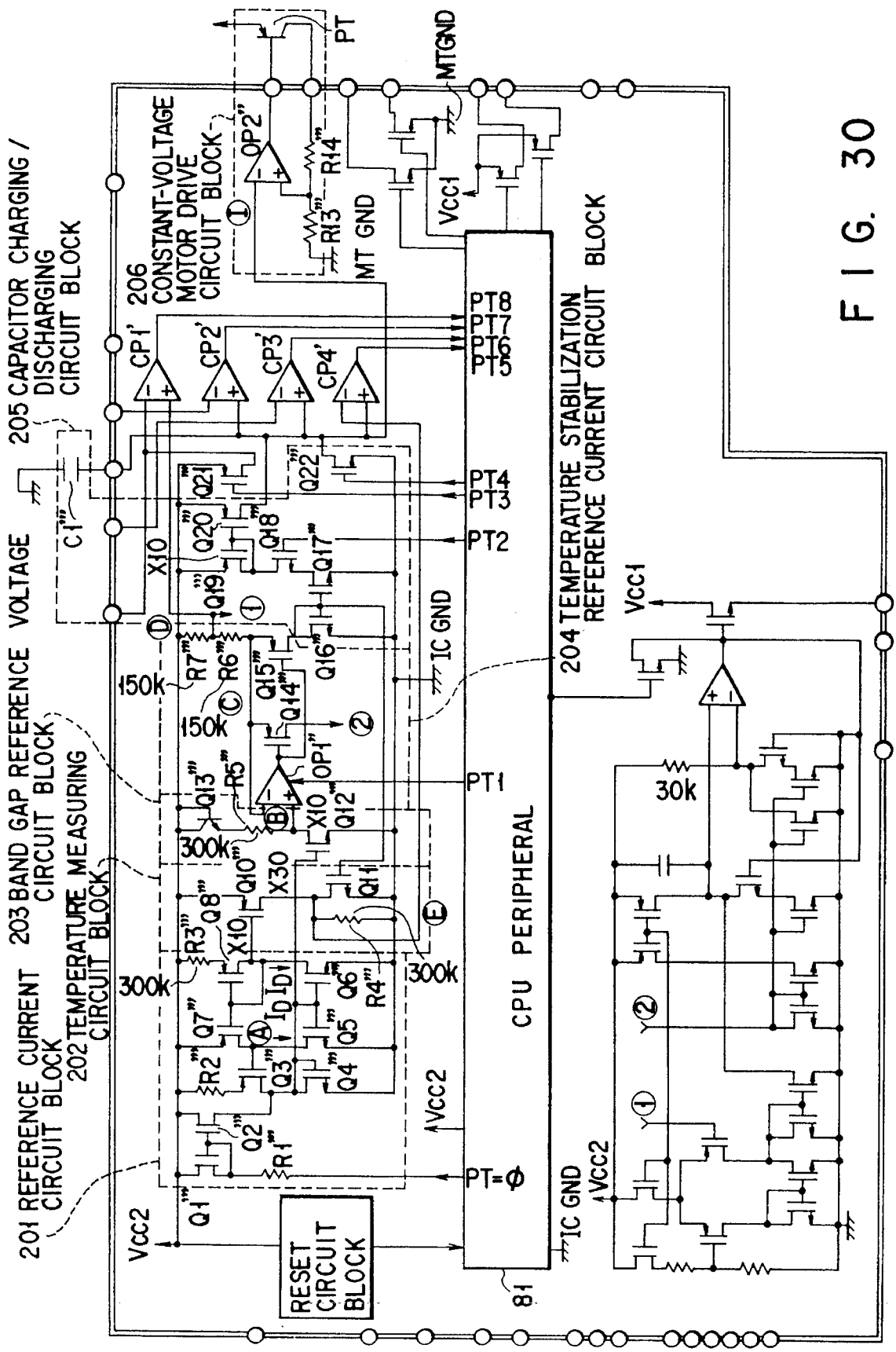
FIG. 30 is a circuit diagram showing the arrangement of an IC portion of the camera controller using the CMOS-analog IC according to the fourth embodiment of the present invention.

A camera controller using a CMOS-analog IC according to the second embodiment of the present invention will be described next. FIGS. 29 and 30 show the arrangement of the camera controller.

A reference current circuit block 201 in FIG. 30 will be described first.

The reference current circuit block 201 is constituted by PMOS transistors $Q_1'''$, $Q_2'''$, $Q_3'''$, $Q_7'''$, and $Q_8'''$, NMOS transistors $Q_4'''$, $Q_5'''$, and $Q_6'''$, and resistors $R_1'''$, $R_2'''$, and $R_3'''$. When a CPU 81 sets PT0="0", a current of several µA, which is limited by the resistor $R_1'''$, flows in the transistor $Q_1'''$. Since the transistors $Q_1'''$ and $Q_2'''$ constitute a current mirror circuit, the drain current of the transistor $Q_2'''$ flows into the D-G short circuit of the transistor $Q_4'''$. Since the transistors $Q_4'''$, $Q_5'''$, and $Q_6'''$ constitute current mirror circuits, respectively, the same drain current flows in the transistors $Q_5'''$ and $Q_6'''$.

In the small-current region, the transistors $Q_8'''$ and $Q_8'''$ operate like a current mirror circuit of 10:1 (because the voltage drop across the resistor $R_3'''$ is small), and the drain current of the transistor $Q_7'''$ is 1/10 that of the transistor $Q_6'''$. The potential at a point A is set at "L" level, and the PMOS transistor $Q_3'''$ is turned on to flow the drain current. Therefore, the drain current of the transistor $Q_4'''$ increases, and the drain currents of the transistors $Q_5'''$ and $Q_6'''$ increase owing to the current mirror effect.

With this increase in drain current, the ratio of the drain current of the transistor $Q_7'''$ to that of the transistor $Q_8'''$ changes from "1/10" to near "1" owing to the voltage drop across the resistor $R_3'''$.

With the above cycle, the operation converges on a point where the drain currents of the transistors $Q_5'''$ and $Q_7'''$ become equal to each other. As a result, the voltage drop across the resistor $R_3'''$ is expressed by the following equation:

$$V_{R3} = V_T \ln(10) = 60 \text{ mV } (27° \text{ C.}) \tag{27}$$

where $V_T$ is the thermal voltage.

Note that MOS is used with $I_D$ of about 200 nA to form a weak inversion region.

A band gap reference voltage circuit block 203 will be described next.

The circuit block 203 is a 1.26-V constant-voltage circuit which is stable with respect to temperatures. A band gap reference voltage is obtained with reference to a potential $V_{CC2}$ by a parasitic NPN bipolar transistor $Q_{13}'''$ having a p-type well in a CMOS device as a base, an NMOS transistor $Q_{12}'''$, and a resistor $R_5'''$. In addition, this transistor $Q_{13}'''$ has a diode characteristic represented by −2 mV/° C. A voltage across the resistor $R_5'''$ generates a voltage which changes in the positive direction with a change in temperature according to the following formula:

$$V_T \ln(10) \times (R_5'''/R_3''') \times 10 \tag{28}$$

If $(R_5'''/R_3''')$ in formula (28) is designed to substantially equalize positive (+) and negative (−) change amounts to cancel each other, the $V_{CC2}$-B voltage is stabilized with respect to temperatures. The voltage value as a criterion is 1.26 V. In contrast to this, if a parasitic PNP transistor having an n-type well as a base is used, a reference voltage of 1.26 can be generated with reference to the GND potential.

A temperature stable reference current circuit block 204 will be described next.

The circuit block 204 is constituted by an operational amplifier OP1'', PMOS transistors $Q_{14}'''$ and $Q_{15}'''$, and resistors $R_6'''$ and $R_7'''$. The transistors $Q_{14}'''$ and $Q_{15}'''$ are turned on by the operational amplifier OP1'', and source currents flow in the resistors $R_6'''$ and $R_7'''$. As a result, the potential at a point C becomes equal to the potential at a point B owing to an imaginary short circuit. Therefore, a current represented by $1.26/(R_6'''+R_7''')$ flows in the resistors $R_6'''$ and $R_7'''$, and a drain current ½ the above current flows in the transistors $Q_{15}'''$ and $Q_{14}'''$. A temperature measuring circuit block 202 will be described next.

The temperature measuring circuit 202 is constituted by a PMOS transistor $Q_{10}'''$, a resistor $R_4'''$, and an NMOS transistor $Q_{11}'''$.

The drain current of the transistor $Q_{10}'''$ is given by the following formula:

$$V_T \ln(10)/R_3''' \times 40 \tag{29}$$

Therefore, a voltage $V_T$ is given by $$V_T = ((273+T)/300) \times 26 \text{ mV} \tag{30}$$

where T is the temperature (° C.).

The transistor $Q_{11}'''$ constitutes a current mirror circuit together with transistors $Q_{16}'''$ and $Q_{17}'''$. A current represented by the following formula is supplied from the temperature stable reference current circuit block 204 to this current mirror circuit.

$$1.26 \text{ V}/(R_6'''+R_7''')/2 \tag{31}$$

The drain current of the transistor $Q_{11}'''$ is equal to the above current value. A current obtained by subtracting a T stable current from this T proportional current value flows in the resistor $R_4'''$.

Therefore, a potential $V_E$ of E point is represented by the following equation:

$$V_E = R_4''' \times \frac{273+T}{300} \times \frac{26 \text{ mV}}{R_3'''} \times 40 - \frac{1.26}{2(R_6'''+R_7''')} \tag{32}$$

In this case, if $R_4'''=R_3'''=(R_6'''+R_7''')$, then $$V_E = \frac{273+T}{300} \times 1040 \text{ mV} - 630 \text{ mV} = 3.5 \text{ mV} \times T + 316 \text{ mV} \tag{33}$$

Therefore, VE=281 mV for −10° C., and VE=456 mV for +40° C.

A capacitor charging/discharging circuit block 205 will be described next.

This circuit block 205 is used for A/D conversion of the voltage of an electric flash main capacitor, a battery voltage, a voltage associated with a temperature, and the like. The circuit block 205 is constituted by PMOS transistors $Q_{16}'''$, $Q_{17}'''$, $Q_{18}'''$, and $Q_{22}'''$, PMOS transistors $Q_{19}'''$ and $Q_{20}'''$, and a capacitor $C_1'''$. When CPU port PT2="H", the transistor $Q_{18}'''$ is turned on. Since the transistors $Q_{16}'''$, $Q_{17}'''$, $Q_{19}'''$, and $Q_{20}'''$ constitute current mirrors, respectively, the drain current of the transistor $Q_{20}'''$ is represented by the following formula:

$$1.26 \, V/(R6+R7)/20 \tag{34}$$

When a port PT4 of the CPU 81 is at "H" level, the transistor $Q_{22}'''$ is turned on, and the capacitor $C_1'''$ is discharged. As a result, the potential at a point F becomes 0 V.

When the ports PT4 and PT2 of the CPU 81 are at "L" level and "H" level, respectively, the capacitor $C_1'''$ is charged by the drain current of the transistor $Q_{20}'''$, and the potential at the point F increases with time. When PT4="L" and PT2="L" at a proper timing, the potential at the point F is fixed to the potential set at this timing.

Figure 31:
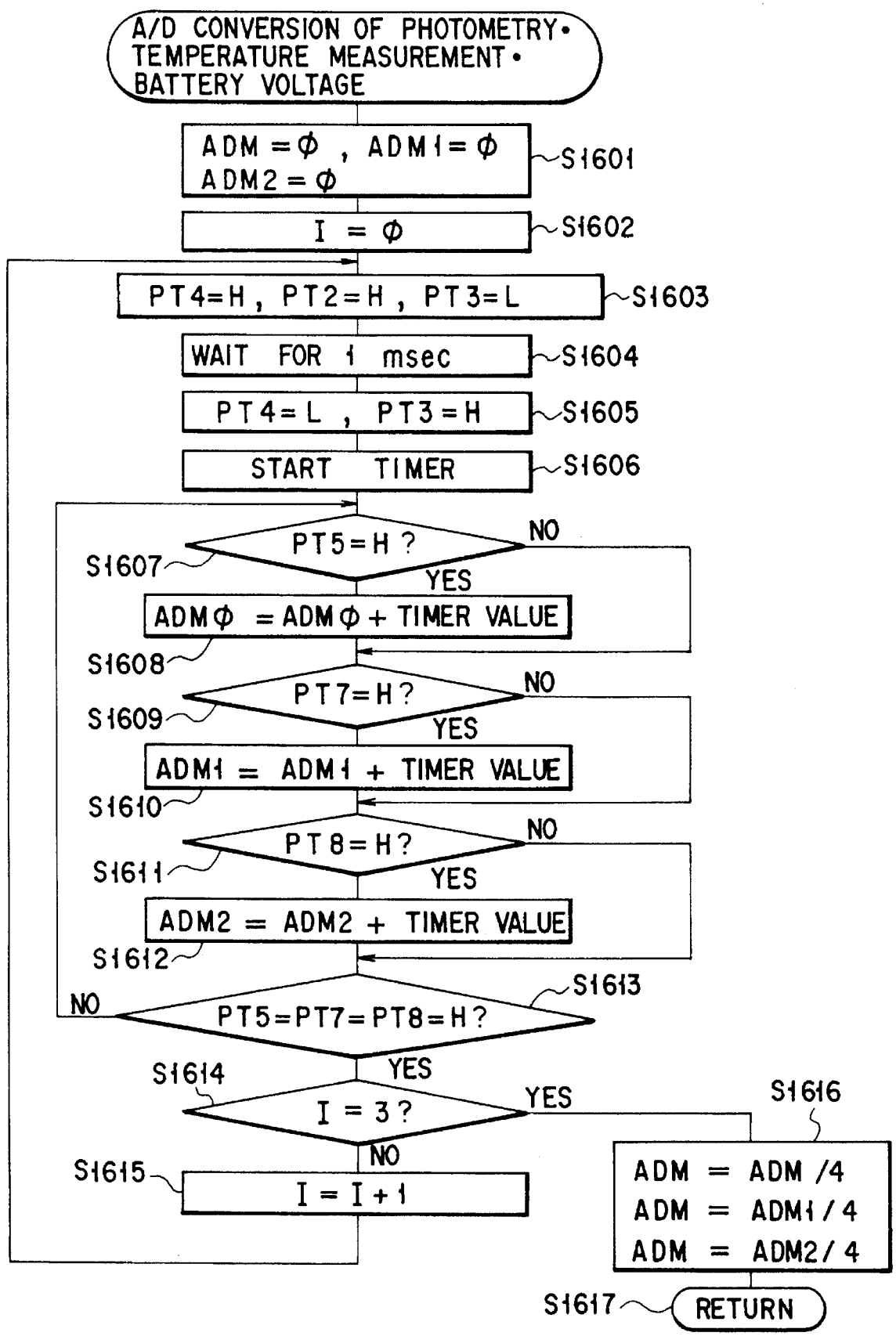
FIG. 31 is a flow chart showing a sequence of simultaneously performing A/D conversion of photometry, temperature measurement, and battery voltage.

FIG. 31 is a flow chart showing the A/D-converting operation of each portion of this embodiment.

A constant-voltage motor drive circuit block 206 will be described next.

The constant-voltage motor drive circuit block 206 is constituted by an operational amplifier OP2''', resistors $R_{13}'''$ and $R_{14}'''$, and an external PNP power transistor PT.

This circuit block 206 is a noninverting type amplifier, and the relationship between the potential at a high level "H" point and a potential $V_I$ at a point I is expressed by the following formula:

$$\frac{(R_{13}''' + R_{14}''')}{R_{14}'''} \times V_I \tag{35}$$

In this case, as the potential $V_I$, an arbitrary voltage value can be generated and held by charging the capacitor $C_1'''$ from the GND level for a predetermined period of time by means of time control of the switching transistors $Q_{18}'''$ and $Q_{22}'''$. With this operation, the CPU 81 can perform fine control, e.g., driving a motor with a low voltage at the start of a film wind operation and driving the motor with a high voltage when the speed of the motor increases to a certain degree.

As a method of using logarithmic compression characteristics in a CMOS device, in addition to the above-described method of using parasitic bipolar transistors, a method of using the MOS transistor in a weak inversion region is available.

Figure 32:
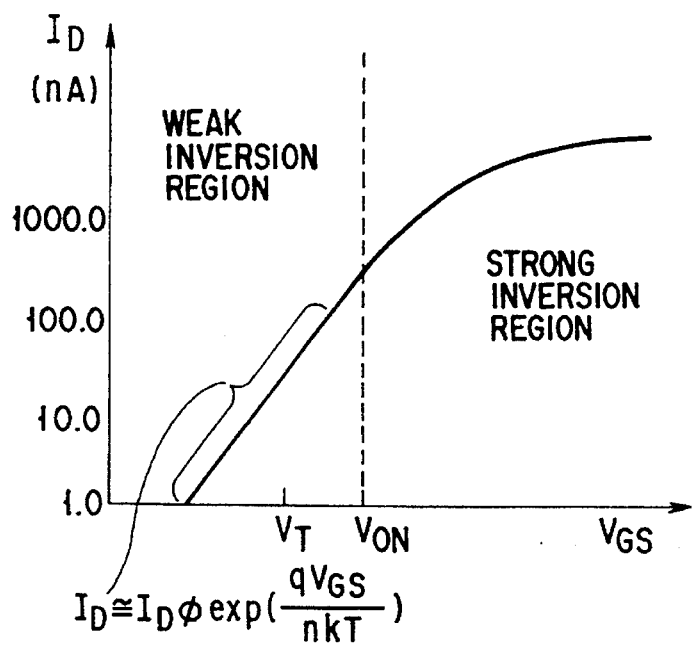
FIG. 32 is a graph showing the relationship between a drain current $I_D$ and a gate-source voltage $V_{GS}$ to explain a weak inversion region of a MOS device used in the present invention.

More specifically, as shown in FIG. 32, in a region in which a drain current is several 100 nA or less, the relationship between the drain current $I_D$ and the gate-source voltage $V_{GS}$ can be expressed by $$I_D \approx I_{D0} \exp\left(\frac{gV_{GS}}{nkT}\right) \tag{36}$$

Figure 33:
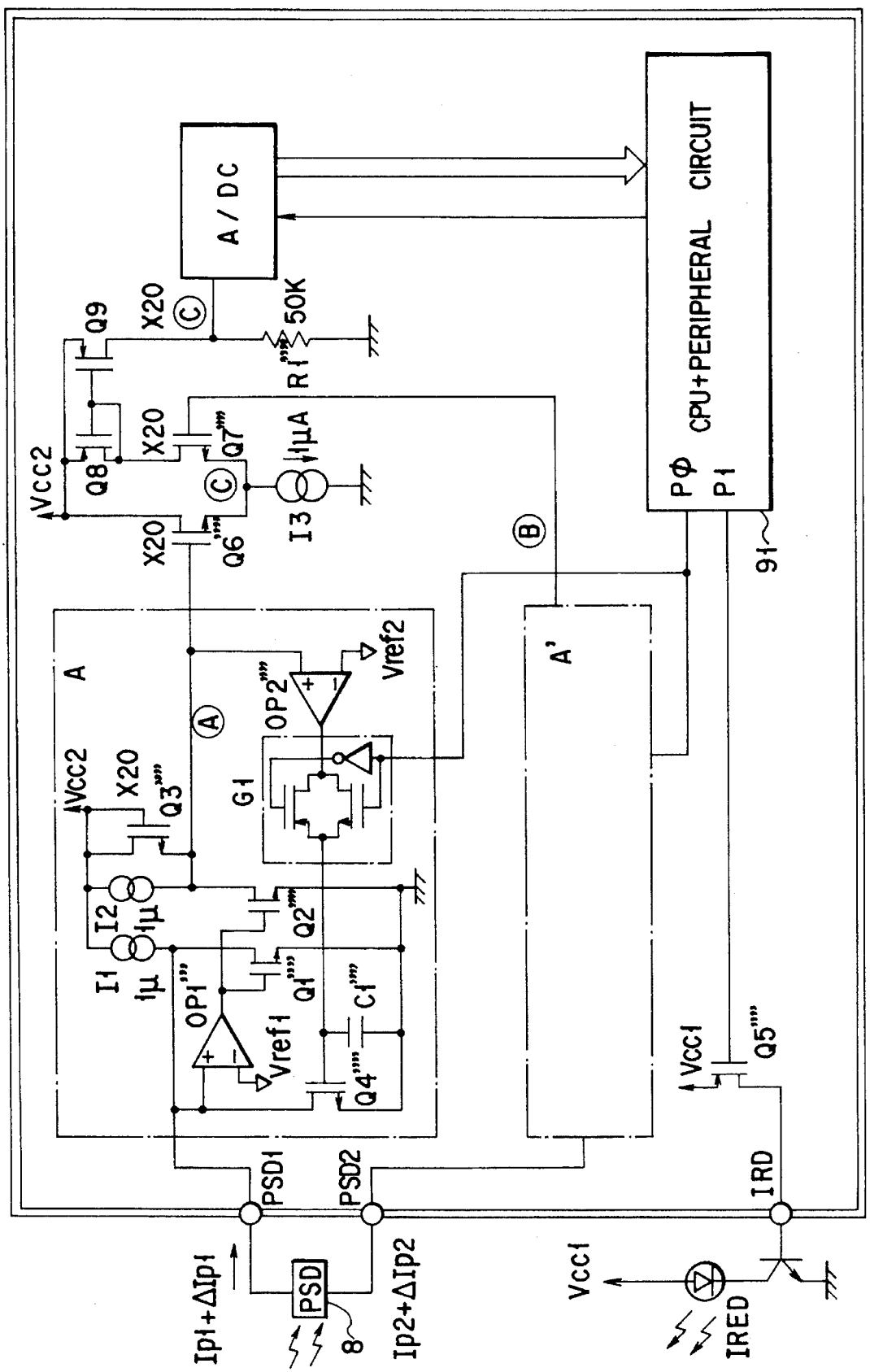
FIG. 33 is a circuit diagram showing the detailed arrangement of a photometric circuit to which a method of using a drain current region of several 100 nA or less is applied.

FIG. 33 shows the detailed arrangement of a distance measuring circuit to which a method of operating a MOS transistor in a drain current region of several 100 nA or less is applied.

Referring to FIG. 33, a pulse photocurrent detecting circuit block comprises a preamplifier portion constituted by a CMOS operational amplifier OP1''', NMOS transistors $Q_1''''$, $Q_2''''$, and $Q_3''''$, and constant-current sources $I_1$ and $I_2$, and a background light extracting circuit constituted by a CMOS operational amplifier OP2''', a transfer gate G1, a capacitor $C_1''''$, and an NMOS transistor $Q_4''''$. A reference voltage $V_{ref2}$ is set to $V_{CC2}-100$ mV. When the transfer gate G1 is ON, the operational amplifier OP2'''' constitutes a feedback loop together with the preamplifier portion, and discharges all constant current of 1μ from the constant-current source $I_1$ and a background light component $I_{P1}$ from a PSD 8 to GND via the transistor $Q_4''''$. The potential set at this time is stored in the capacitor $C_1''''$. In this state, the drain-source voltage of the transistor $Q_3''''$ becomes 100 mV, and almost no current flows therein. Even if the transfer gate G1 is turned off, and the feedback loop is disconnected, the previous potential is held in the capacitor $C_1''''$. Therefore, the transistor $Q_4''''$ keeps discharging the constant current from the constant-current source $I_1$ and the background light component from the PSD 8. At this time, when an "L"-level pulse is output from a port $P_1$ of a CPU 91 to turn on a transistor $Q_5''''$ so as to radiate infrared pulses from the IRED onto an object to be photographed, and a photocurrent component $\Delta I_{P1}$ generated by the reflected light is input from the PSD 8 to a terminal PSD1, all the current then flows into the transistor $Q_3''''$.

In this case, an amplification factor of ×20 is set in the transistor $Q_3''''$, and the transistor $Q_3''''$ operates with respect to the flowing current in the weak inversion region. Hence, the potential at a point A is obtained by the following equation:

$$V_{CC2} - V_{GS1} = V_{CC2} - \frac{nkT}{q} \ln\left(\frac{\Delta I_{P1}/20}{I_{D0}}\right) \tag{37}$$

Similarly, the potential at a point B is obtained by the following equation:

$$V_{CC2} - V_{GS2} = V_{CC2} - \frac{nkT}{q} \ln\left(\frac{\Delta I_{P2}/20}{I_{D0}}\right) \tag{38}$$

This circuit is designed such that amplification factors of ×20 are also set in the transistors $Q_6''''$ and $Q_7''''$, and these transistors operate with respect to a constant current from the constant-current source $I_3$ in the weak inversion region. In addition, if the drain current of the transistor $Q_6''''$ is represented by $I_{D1}$, the following formula can be established.

$$V_{CC2} - \frac{nkT}{q} \ln\left(\frac{\Delta I_{P1}/20}{I_{D0}}\right) - \frac{nkT}{q} \ln\left(\frac{I_{D1}/20}{I_{D0}}\right) \tag{39}$$

If the drain current of the transistor $Q_7''''$ is represented by $I_{D2}$, the following formula can be established.

$$V_{CC2} - \frac{nkT}{q} \ln\left(\frac{\Delta I_{P2}/20}{I_{D0}}\right) - \frac{nkT}{q} \ln\left(\frac{I_{D2}/20}{I_{D0}}\right) \tag{40}$$

Since the above two formulae are equivalent to each other, the following equation can be established.

$$\therefore \frac{nkT}{q} \ln\left(\frac{I_{P2}/20}{I_{P1}/20}\right) = \frac{nkT}{q} \ln\left(\frac{I_{D1}/20}{I_{D2}/20}\right) \tag{41}$$

Therefore, $$\frac{\Delta I_{P2}}{\Delta I_{P1}} = \frac{\Delta I_{D1}}{\Delta I_{D2}} \tag{42}$$

In this case, since $I_{D1}+I_{D2}=1$ μA, the following equation can be established.

$$I_{D2} = \frac{\Delta I_{P1}}{\Delta I_{P2}} \cdot I_{D1} = \frac{\Delta I_{P1}}{\Delta I_{P2}} \cdot (1 \, \mu A - I_{D2}) \tag{43}$$

$$= \frac{\Delta I_{P2}}{\Delta I_{P1} + \Delta I_{P2}} \times (1 \, \mu A)$$

Accordingly, the potential at a point C of a resistor $R_1''''$ is expressed by $$\frac{\Delta I_{P2}}{\Delta I_{P1} + \Delta I_{P2}} \times 1 \text{ V} \tag{44}$$

Since $\Delta I_{P2}/(\Delta I_{P1}+\Delta I_{P2})$ represents the barycentric position of a spot light image incident on the PSD 108 the object distance can be obtained by measuring the potential at the point C.

In addition, the CPU performs A/D conversion at the point C in synchronism with an emitted light pulse, and fetches the resultant digital value. The CPU performs light emission a plurality of times, and obtains the distance to the object from the average value of the fetched digital values.

Figure 34:
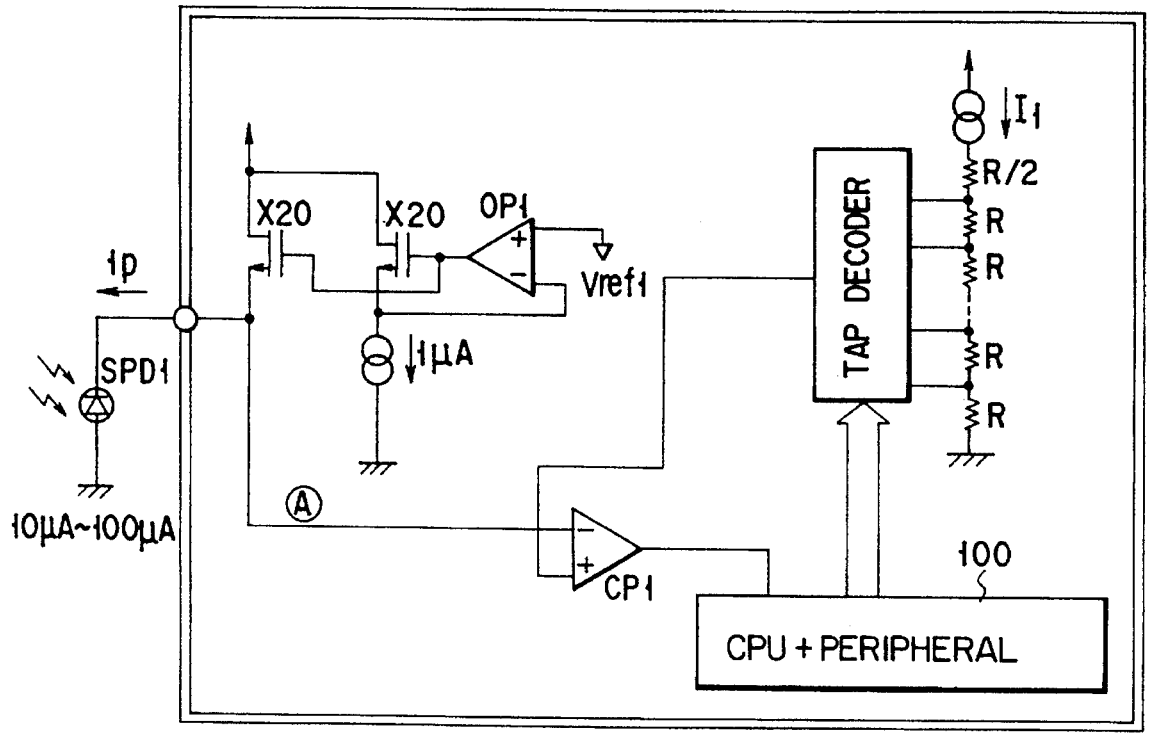
FIG. 34 is a circuit diagram showing the detailed arrangement of a photometric circuit to which the method of using a drain current region of several 100 nA or less is applied.

FIG. 34 shows the detailed arrangement of a photometric circuit to which the above method is applied.

Referring to FIG. 34, the potential at a point A is represented by $$V_{ref1} + \frac{nkT}{q} \ln\left(\frac{1 \, \mu A}{I_{D0}}\right) - \frac{nkT}{q} \ln\left(\frac{I_P/20}{I_{D0}}\right) = V_{ref1} - \frac{nkT}{q} \ln\left(\frac{I_P}{1 \, \mu A}\right) \tag{45}$$

where $V_{ref1}$ is the voltage at one of the taps of a tap decoder.

A current $I_1$ flowing in a tap resistor R is represented by the following equation:

$$I_1 = \frac{nkT}{q} \ln\left(\frac{10}{8R}\right) \tag{46}$$

Therefore, when a CPU 100 and the tap decoder sequentially perform comparison and A/D conversion, the CPU 100 can obtain an A/D value corresponding to the brightness of an object.

As has been described in detail above, in the camera controller using the CMOS-analog circuit according to the present invention, since an analog circuit can be formed by a CMOS process, AF and AE circuits can be formed with substantially the same lead time and cost as those of a microcomputer. In addition, the AF and AE circuits and the microcomputer can be integrated into one chip, thereby realizing a reduction in size of a camera.

Furthermore, although the chip generates heat, which is a drawback accompanying the formation of a chip, temperature correction can be performed with respect to an LCD drive voltage without any determination error.

According to the present invention, the following circuits and devices are provided: first, AE and AF circuits based on a CMOS device, which can be manufactured with substantially the same lead time and cost as those of a general CPU; second, a CPU which can be manufactured at a low cost within a short term of delivery and includes an analog circuit with low current consumption; third, a logarithmic compression type distance measuring circuit which can be formed in a CMOS device of a general CPU; fourth, a logarithmic compression type photometric circuit which can be formed in a CMOS device of a general CPU; fifth, a CPU capable of eliminating the influence of clock noise produced by a clock oscillator for driving a CPU; and sixth, an LCD drive temperature correcting circuit which can obtain a clear display even if the temperature of an integrated circuit increases owing to heat generated by itself.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera control IC having a CMOS structure, comprising:

an analog signal processing circuit for processing a photoelectric current analog signal obtained from an object to be photographed, said analog signal processing circuit including a circuit for logarithmically compressing the photoelectric current analog signal by transmitting the photoelectric current analog signal to a position between base and emitter electrodes of a parasitic bipolar transistor formed in the CMOS structure; and a CPU core for controlling a camera sequence in response to an output from said analog signal processing circuit, wherein said analog signal processing circuit and said CPU core are arranged on one chip with the CMOS structure, without using a Bi-CMOS process.

2. An IC according to claim 1, wherein said logarithmic compression circuit performs logarithmic compression by using a parasitic bipolar transistor having one of the following:

a base electrode in a p-type well, and an $n^+$-type layer in the p-type layer well as an emitter electrode, and a base electrode in an n-type well, and a $p^+$-type layer in the n-type well as an emitter electrode.

3. An IC according to claim 1, wherein said logarithmic compression circuit arrangement logarithmically compresses the analog signal by using a CMOS transistor in a weak inversion region.

4. An IC according to claim 1, wherein said analog signal processing circuit is a photometric circuit.

5. An IC according to claim 1, wherein said analog signal processing circuit is a distance measuring circuit.

6. A camera IC having a CMOS structure, comprising:

a signal processing circuit for processing at least one of an analog object distance signal from a distance measuring unit and an analog object brightness signal from a photometric unit, said signal processing circuit including a circuit for logarithmically compressing the analog signal by using at least one of a parasitic bipolar transistor in a CMOS structure and a CMOS transistor in a weak inversion region; and a calculating circuit for calculating at least one of object distance information and object brightness information on the basis of an output from said signal processing circuit.

7. An IC according to claim 6, wherein said calculating circuit is a CPU core.

8. An IC according to claim 6, wherein said calculating circuit is an analog calculating circuit.

* * * * *